(12) United States Patent
Al-Herz et al.

(10) Patent No.: US 9,406,054 B2
(45) Date of Patent: *Aug. 2, 2016

(54) VIRTUAL ACCOUNT BASED NEW DIGITAL CASH PROTOCOLS

(71) Applicant: King Fahd University of Petroleum and Minerals, Dhahran (SA)

(72) Inventors: Ahmed Ibrahim Al-Herz, Dhahran (SA); Mohammad K. Ibrahim, Leicester (GB)

(73) Assignee: King Fahd University of Petroleum and Minerals, Dhahran (SA)

(*) Notice: Subject to any disclaimer, the term of this patent is extended or adjusted under 35 U.S.C. 154(b) by 71 days.

This patent is subject to a terminal disclaimer.

(21) Appl. No.: 14/170,761

(22) Filed: Feb. 3, 2014

(65) Prior Publication Data

US 2014/0195440 A1    Jul. 10, 2014

Related U.S. Application Data

(62) Division of application No. 13/050,295, filed on Mar. 17, 2011, now Pat. No. 8,738,539, which is a division of application No. 12/031,071, filed on Feb. 14, 2008, now abandoned.

(51) Int. Cl.
| | |
|---|---|
| *G06Q 20/00* | (2012.01) |
| *G06Q 20/06* | (2012.01) |
| *H04L 9/32* | (2006.01) |
| *G06Q 20/20* | (2012.01) |
| *G06Q 20/32* | (2012.01) |
| *G06Q 20/38* | (2012.01) |

(52) U.S. Cl.
CPC ............ *G06Q 20/0655* (2013.01); *G06Q 20/20* (2013.01); *G06Q 20/32* (2013.01); *G06Q 20/3829* (2013.01); *G06Q 20/38215* (2013.01); *H04L 9/321* (2013.01); *H04L 9/3247* (2013.01); *H04L 9/3263* (2013.01); *H04L 2209/42* (2013.01); *H04L 2209/56* (2013.01)

(58) Field of Classification Search
CPC .................................................. G06Q 20/00
USPC ................................................... 705/75, 71
See application file for complete search history.

(56) References Cited

U.S. PATENT DOCUMENTS

| | | | | |
|---|---|---|---|---|
| 8,738,539 B2* | 5/2014 | Al-Herz | ................. | H04L 9/321 705/24 |
| 2001/0049667 A1* | 12/2001 | Moribatake | ............ | G06Q 20/02 705/69 |
| 2008/0154782 A1* | 6/2008 | Kang | .................... | G06Q 20/04 705/74 |

FOREIGN PATENT DOCUMENTS

JP    2002073973 A  *  3/2002  ............. G06F 17/60

*Primary Examiner* — James A Reagan

(74) *Attorney, Agent, or Firm* — Hauptman Ham, LLP

(57) ABSTRACT

Virtual account based digital cash protocols employ two pairs of private and public keys. Each public key is certified separately and the protocols do not use any blind signature schemes. As a result, the virtual account based digital cash protocols provide strong protection of the user privacy by using two certified public keys instead of a blind signature. One pair of certified keys consists of one master user private key and one master user public key. A second pair of certified keys consists of one pseudonym user private key and one pseudonym user public key. The use of a master key pair and a pseudonym key pair circumvents the need for blind signatures. As a result, the proposed protocols do not require blind signatures and do not add additional overhead and security requirements necessitated by conventional blind signature schemes. The protocols use public key protocols, digital signatures and symmetric key protocols, which may be readily implemented in standard information security based systems based on cryptographic constructs. In addition, the protocols may be deployed in mobile, off-line, and on-line settings.

9 Claims, 55 Drawing Sheets

VIRTUAL ACCOUNT BASED NEW DIGITAL CASH PROTOCOLS

CROSS REFERENCE TO RELATED APPLICATIONS

The present application is a divisional of U.S. patent application Ser. No. 13/050,295, filed Mar. 17, 2011, which is a divisional of U.S. patent application Ser. No. 12/031,071, filed Feb. 14, 2008, now abandoned, the disclosures of which are hereby incorporated herein by reference in their entirety.

TECHNICAL FIELD

This invention relates to digital cash, and more specifically to digital cash based on virtual accounts using more than one user public key.

BACKGROUND

In the near future digital cash will come into wider use and it is expected that people will use the Internet to make digital cash payments for their purchases. Electronic transactions should be convenient, reliable, accurate, and resistant to fraud. Certain electronic transactions also should protect the privacy of payees. For example, a customer purchasing a service from a vendor over a network should be able to pay for the service in an electronic transaction without revealing their identity.

Some schemes using on-line banking may prevent double spending by checking each coin against reuse during the time of payment on-line rather than detecting double spending afterwards. However, on-line banking is obviously not suitable for micro-payments of the average consumer. Banks are too few compared with the vast number of small cash transactions that would need to be processed if average consumer transactions were to be supported. Processing on-line requests for such transactions will result in banks becoming serious bottlenecks to handle these transactions.

Blind signature systems that use off-line digital cash techniques have high system complexity. In some other conventional techniques, a coin has a data size that is too big to be economically used since the coin contains a large number of challenge terms to detect cheating. In addition, some techniques also require using complex challenge-response interactions between the payer and payee for each coin spent. Again, such complex schemes are also not suitable for micro payments.

Some systems have implemented digital coins that are both secure (in the bank's interest) and afford a heightened assurance of consumer privacy by providing some anonymity to users with respect to both merchants and banks. Informally, a digital cash scheme is referred to as unconditionally blind or anonymous if the bank that issues a coin is unable to determine, either at the time of withdrawal or later upon examining circulating or deposited coins, which coin was withdrawn by which user. In a unconditionally blind scheme, the user can withdraw money from the bank, spend it at a merchant, and be confident that when the merchant deposits the money at the bank, the bank will not be able to recognize the money as the same cash given to the user.

However, researchers have observed that unconditional anonymity in payment systems might be exploited to facilitate crimes like blackmail. In addition, there is a fear that such schemes of unconditional anonymity may be abused to perfect crimes of money laundering and kidnapping because this system can make the flow of cash completely untraceable. This observation has spurred research into the idea of making anonymity in payment systems conditional, and, in particular, revocable by a third party. This notion is referred to as a trustee-based coin tracing.

One trustee-based tracing scheme is based on a blind Schnorr-like signature scheme that involves use of interactive proofs between trustees and the bank. Another trustee-based tracing scheme is based on blind RSA signatures, but makes use of a cut-and-choose protocol that results in a scheme that is flexible. Although this scheme may be somewhat flexible, it has rather large coin sizes and computational requirements.

According to another scheme that makes use of a blind signature, a user requests a pseudonym and registration information from a trustee. The user presents this registration information to the bank, and incorporates the information into the coins that are withdrawn.

Another scheme makes use of blind DSS signatures. In this scheme, signing and anonymity revocation may be conducted by differing quorums of trustees. However, the scheme is implemented on-line only and is rather computationally intensive for most operations.

A slightly different approach to trustee-based tracing is a system based on blind Schnorr signatures in which a user transfers funds from a non-anonymous to an anonymous account where a trustee is capable of linking the two accounts. The chief disadvantage of this approach is that once the two accounts are linked, anonymity is eliminated.

Another approach is based on blind Schnorr signatures in which the trustee is off-line. This system is complex and involves well over a dozen modular exponentiations by the user at each coin withdrawal. Later developments have reduced the computational required in the withdrawal protocol, as well as the database search requirements in owner tracing. However, the withdrawal protocol still requires over a dozen modular exponentiations on the part of the user.

The use of blinding alone that protects the anonymity of the customer is not sufficient to safeguard against certain types of fraud. For example, a customer can submit a blinded nonce (a nonce is a piece of data that, for practical purposes, is used only once, for example, a random number) to the certification authority along with $20, receive the blinded certificate, unblind it, and then submit the un-blinded certificate as being worth $100. This is possible because the certification authority never really sees the actual certificate it is signing because of the blinding factor. Thus, although blinding alone protects privacy, it does not by itself provide adequate reliability against fraud and misuse.

Another problem of blind signature it is a homomorphism, i.e., $Sign(kx)=Sign(k)Sign(x)$. It is possible to create pairs r, $Sign(r)$ for a random message r. More precisely, anyone can choose $Sign(r)$ at random and then compute r as the function Sign-1 which is known publicly. The basic idea is as follows. Customer C chooses a message x which is going to be the coin. C also generates a pair, k and $Sign(k)$, for a random number k. C sends the product kx to a bank B which computes $Sign(kx)$. B then sends $Sign(kx)$ to C, using, for instance, a public encryption scheme provided by C (using some session key exchanged between C and B using a Diffie-Hellman session) or some other form of communication (e.g., delivery on a diskette transported by an armored carrier). C may then compute $Sign(x)$ by dividing $Sign(kx)$ by $Sign(k)$. The pair $(x, Sign(x))$ is now redeemable by B at a value usually determined by the signature being used, and B cannot recognize C when some payee P presents $(x, Sign(x))$ (since the knowledge of kx does not allow practical recognition of x nor of $Sign(x)$).

A problem with this approach is that a signature scheme with such properties is not secure. This scheme provides that (1) it is easy to forge signatures on random messages, and (2) after seeing the signatures on two messages x1 and x2, it is easy to compute the signature on the message x=x1x2. In order to overcome this problem, valid messages are required to have a special "structure" (e.g., the message x must be encoded using the PKCS#1 standard for digital signature). The hope is that messages with this structure are sparse and hard to forge even given properties (1) and (2) (since messages with that structure will not appear with a significant probability). However, this is simply a hope and is not a proven mathematical property of the signature scheme or of the encoding. The drawback is that it may be possible to discover an algorithm to forge messages even when we restrict them to this structured sparse set.

Schemes that use virtual accounts have several problems. For example, some virtual accounts do not provide adequate privacy of the user, while others are complex requiring a blind signature to protect the privacy of the user. Still other embodiments have the bank storing encrypted pseudonym corresponding to the user identification which makes linking identity to the pseudonym easy either by cooperation or leakage of the secret key of the issuer. Accordingly, the privacy of all users can be catastrophically destroyed. In addition, there is a problem of proving the ownership of the user identity between the user and the bank.

SUMMARY

In one general aspect, a system for implementing a digital cash protocol includes a user having two pairs of user keys, one pair linked to the real identity of the user, and a second pair linked to the pseudonym identity of the user, a bank of the user having a user account; an issuer of digital cash virtual accounts to issue digital cash virtual accounts in response to a request from the bank, and a shop to sell goods or services, where the first pair of keys is used to authenticate the user with the bank and to encrypt information sent to the user from the bank and the second pair of keys is used to authenticate the user with the issuer of digital cash virtual accounts and to encrypt information sent to the user from the issuer of digital cash. The first pair may include a master public key and a master secret key and the second pair includes a pseudonym public key and a pseudonym secret key. No link is provided between the master public key and the pseudonym public key of the same user to determine the real identity of a user associated with a pseudonym.

The system also may include a certificate authority to certify the pseudonym public key of a user given the master public key of the user and a user identification. Each public key is certified by the certificate authority using a separate certificate.

The master keys are used to generate digital signatures for authentication with the certificate authority and the bank. The pseudonym keys are used to generate digital signatures for authentication with the issuer of digital cash virtual accounts and the shop.

The bank may store a user id, an amount of money, and the user's master pubic key in association with a user account and the issuer of digital cash virtual accounts stores the user's pseudonym public key and the digital cash virtual accounts issued to the user, where the user's master public key is not linked to digital cash virtual accounts and is not used for payments to maintain the user's privacy.

The certificate authority may stores the pseudonym public key in correspondence to a user id or the master public key and issues a license for the pseudonym public key in response to a request which is signed by the master private key of the user. The certificate authority may reveal the identity of the owner of a pseudonym public key if there is any misuse of digital cash or frauds.

The issuer of digital cash virtual accounts stores an account of a user known under one or more pseudonyms, issues digital cash virtual accounts in response to a request from the bank, and stores information related to the issued digital cash virtual accounts.

In another general aspect, a method for implementing a digital cash protocol for a user having two pairs of user keys, one pair linked to the real identity of the user including a master public key (mPKU) and a master secret key (mSKU), and a second pair linked to the pseudonym identity of the user including a pseudonym public key (pPKU) and a pseudonym secret key (pSKU), in a system including a certificate authority, a bank of the user, an issuer of digital cash virtual accounts, a shop and a bank of the shop. The method includes registering a user with the certificate authority to store the pPKU in connection with a user id (UID) and the mPKU, and to issue a license for the pPKU in response to a request from the user for digital currency which is signed by the mPKU; issuing digital cash from an issuer of digital cash virtual accounts to store the pPKU of a registered user, issue digital cash virtual accounts in response to a request from the bank, and store information related to the issued digital cash virtual accounts; paying the digital cash to a shop for goods and services; and depositing the digital currency in the bank of the shop.

In another general aspect, a system for implementing a digital cash protocol, the system includes a user having two pairs of user keys, one pair linked to the real identity of the user including a master public key (mPKU) and a master secret key (mSKU), and a second pair linked to the pseudonym identity of the user including a pseudonym public key (pPKU) and a pseudonym secret key (pSKU), the system comprising: a certificate authority to store the pPKU in connection with a user id (UID) and the mPKU and to issue a license for the pPKU in response to a request from the user for digital currency which is signed by the mPKU; a bank of the user having a user account associated with a user ID (UID) and the certified mPKU which is used to authenticate a user; an issuer of digital cash virtual accounts to store the pPKU of a registered user, issue digital cash virtual accounts in response to a request from the bank, and store information related to the issued digital cash virtual accounts; and a shop to receive payment of digital cash in return for the goods or services, wherein the certificate authority reveals the identity of the user associated with the pPKU if there is any misuse of the digital currency.

Other features will be apparent from the description, the drawings, and the claims.

DESCRIPTION OF DRAWINGS

Like reference symbols in the various drawings indicate like elements.

DETAILED DESCRIPTION

Overview

Virtual account based digital cash protocols described below employ two pairs of private and public keys. Each public key is certified separately and the protocols do not use any blind signature schemes. As a result, the virtual account based digital cash protocols described herein provide strong protection of the user privacy by using two certified public keys instead of a blind signature.

One pair of certified keys consists of one master user private key and one master user public key. A second pair of certified keys consists of one pseudonym user private key and one pseudonym user public key. The use of a master key pair and a pseudonym key pair circumvents the need for blind signatures. As a result, the proposed protocols do not require blind signatures. Therefore, the protocols herein do not add additional overhead and security requirements necessitated by conventional blind signature schemes. The protocols use public key protocols, digital signatures and symmetric key protocols, which may be readily implemented in standard information security based systems based on cryptographic constructs. In addition, the protocols may be deployed in off-line and on-line setting.

The protocols described utilize the following entities: (i) a certificate authority, (ii) a user's bank, (iii) an issuer of digital cash virtual accounts, and (iv) a shop and (v) the shop's bank.

The certificate authority has storage to store a pseudonym public key in correspondence to a user id and/or master public key, issues a license for the pseudonym public key in response to a request which is signed by the master private key of the user. The certificate authority reveals the identity of the owner of a pseudonym public key if there is any misuse of digital cash or frauds.

The user's Bank holds the user's account with his ID, and the certified user's maser public key which is used to authenticate a user.

The issuer of digital cash virtual accounts has a storage space for each registered user which is known under one or more pseudonyms, issues digital cash virtual accounts in response to a request from the bank, and stores information related to the issued digital cash virtual accounts. The type of stored information about a digital virtual account differs depending on whether traceable or untraceable virtual accounts are being issued.

Figure 1:
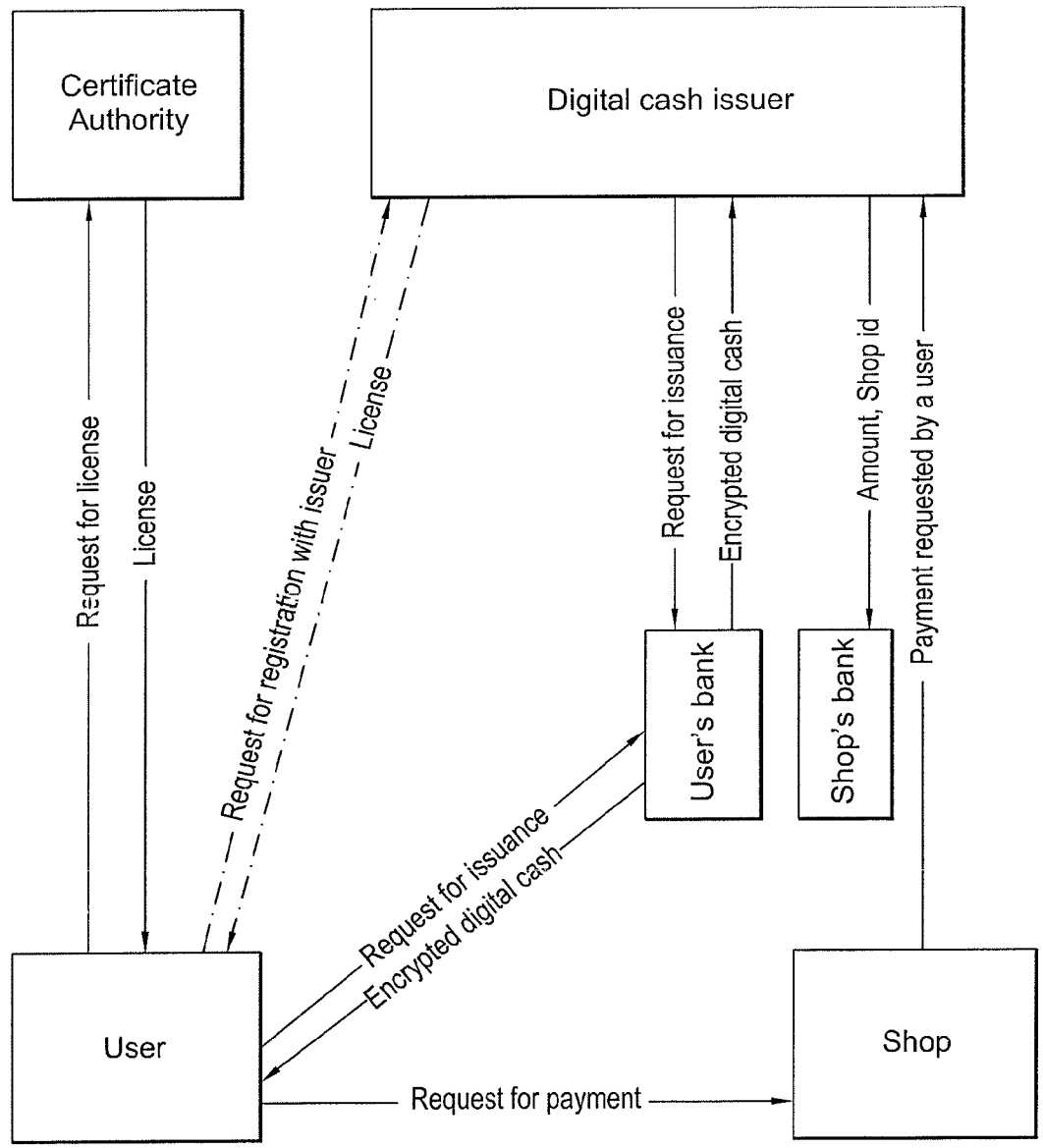
FIG. 1 shows an exemplary system network diagram for implementing the digital cash protocol.

As shown in FIG. 1, a system for implementing the protocols includes a number of entities (e.g., a user, a certificate authority, a digital cash issuer, a user bank, a shop bank, and a shop).

Each of these entities may send and receive data via any number of communications paths. Each entity may include one or more processing devices, such as, for example, a general or special-purpose computer, such as a processor, a microprocessor, a microcomputer, a personal computer ("PC"), a workstation, a mainframe, a server, a laptop, a mobile communications device/phone, a personal digital assistant ("PDA"), an on-board (i.e., vehicle-mounted) computer, or a combination of two or more of these devices capable of responding to, generating, and/or executing instructions in a defined manner. The processing device may include or be associated with any number of other devices, components, and/or peripherals, such as additional computing devices, memory/storage devices, input devices, output devices, user interfaces, and/or communications interfaces.

Each entity also may include one or more software applications including, for example, encryption decryption software, signature generating software, key generating software, random number generating software, signature verification software, in addition to other system and operating system software loaded to command and direct the processing device. Software applications may be implemented as a computer program, a piece of code, an instruction, or some combination thereof, for independently or collectively instructing the processing device to interact and operate as desired.

The applications may be embodied permanently or temporarily in any type of machine, component, physical or virtual equipment, storage medium, or propagated signal wave capable of providing instructions to the processing device. In particular, the applications may be stored on a storage medium or device including volatile and non-volatile (e.g., a read only memory (ROM), a random access memory (RAM), a flash memory, a floppy disk, a hard disk, a tape, a DROM, a flip-flop, a register, an SRAM, DRAM, PROM, EPROM, OPTROM, EEPROM, NOVRAM, or RAMBUS), such that if the storage medium or device is read by the processing device, the specified steps, processes, and/or instructions are performed.

The processing device also may include one or more communications interfaces that allow the processing device to send and receive information using the communications paths. The communications paths may be configured to send and receive signals (e.g., electrical, electromagnetic, or optical) that convey or carry data streams representing various types of analog and/or digital data. For example, the communications paths may be implemented using various communications media and one or more networks comprising one or more network devices (e.g., servers, routers, switches, hubs, repeaters, and storage devices). The one or more networks may include a local area network (LAN), a wide area network (WAN), a plain old telephone service (POTS) network, a digital subscriber line (DSL) network, an integrated services digital network (ISDN), a synchronous optical network (SONNET), or a combination of two or more of these networks. In addition, the communications paths may include one or more wireless links (e.g., cellular, mobile, GSM, CDMA, TDMA, and satellite) that transmit and receive electromagnetic signals, such as, for example, radio, infrared, and microwave signals, to convey information. Because the communications paths may cover any number of networks and media, generally, they are considered unsecured.

The user may be any entity (person, group, business, government and/or organization) that requires the issuance of digital cash for use a payment to a shop. The certificate authority comprises a storage device, a signature verifying program, an encryption program, a decryption program, and a signature generating program. The user may include a processing device, a storage device, an encryption program, a decryption program, a signature verifying program and a key generating program and a signature generating program.

The digital cash issuer provides digital currency for use by the user as payment to a shop. The issuer may include a processing device, a storage device, an encryption program, a decryption program, a signature generating program, a signature verifying program, and a random number generating program.

The user's bank may include a processing device, a storage device, a signature verifying program encryption program, a decryption program, and a signature generating program.

The shop may include a processing device, a storage device, a signature verifying program encryption program, a decryption program, a signature generating program, a random number generating program and a time generating program.

Each of the exemplary embodiments, described in detail below include at least three primary procedures: a user registration procedure; a withdrawal procedure (e.g., an electronic cash issuing procedure); and a payment procedure.

In the following description PKy denotes the public key of the entity y, Sky denotes the private key of the entity y, mPKy and mSKy denotes the master public and private key of entity y respectively, pPKy and pSKy denotes the pseudonym public and private key of entity y respectively, PKy(.) indicates that the quantity between parenthesis is encrypted using the public key of entity y, Sky(.) indicates that the quantity between parenthesis is encrypted using the private key of entity y, and $[.]_{SKy}$ indicates that the quantity between square brackets is signed by the private key of entity y. The user public key PKC is known to all entities. The master public key mPKU is known to all entities. The issuer public key PKI is known to all entities. The bank's public key PKB are known to all entities. The shop public key PKS is known to all entities.

First Embodiment (1) User Registration Procedure

Figure 2:
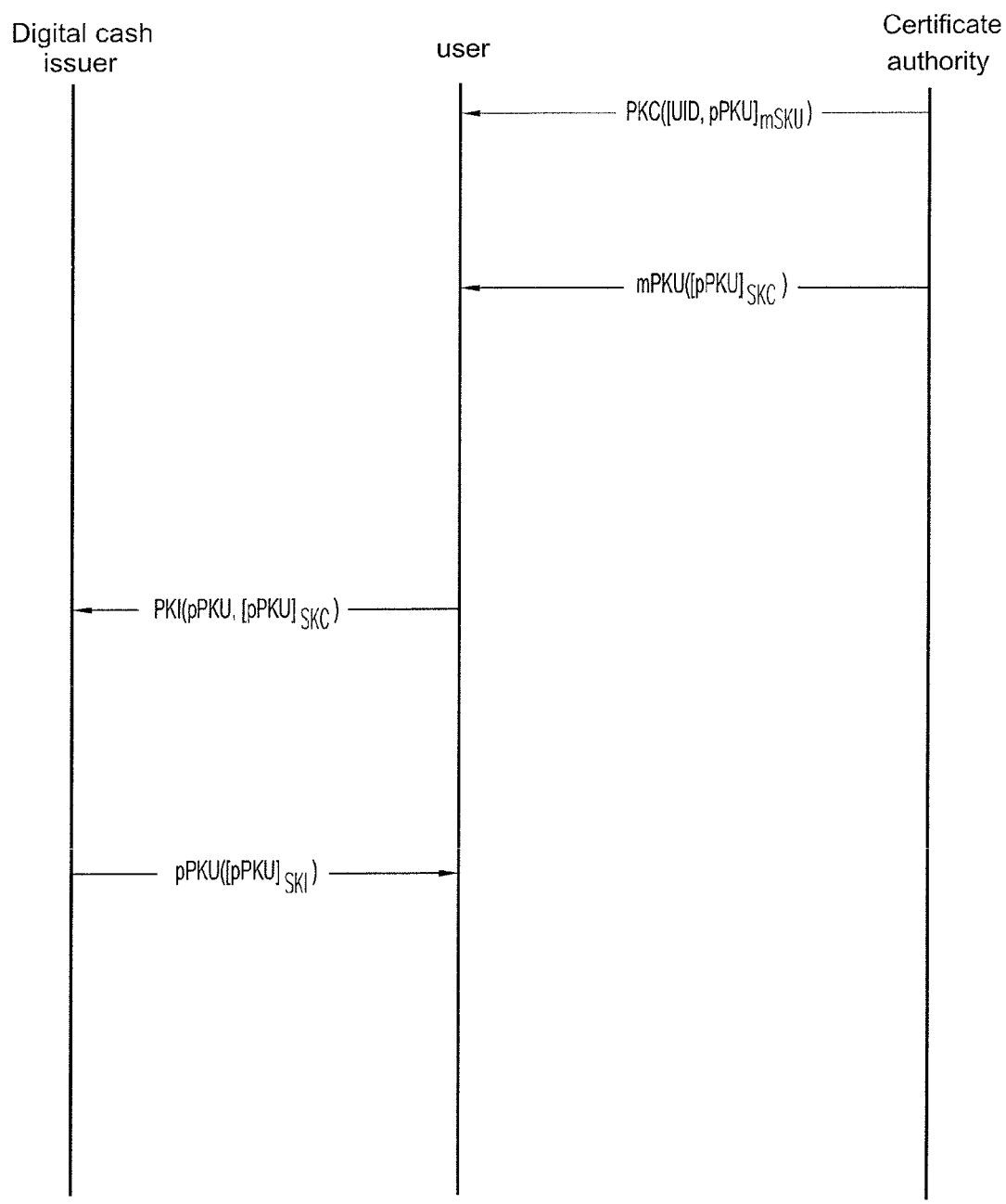
FIG. 2 is an exemplary user registration protocol according to the first embodiment.
Figure 3:
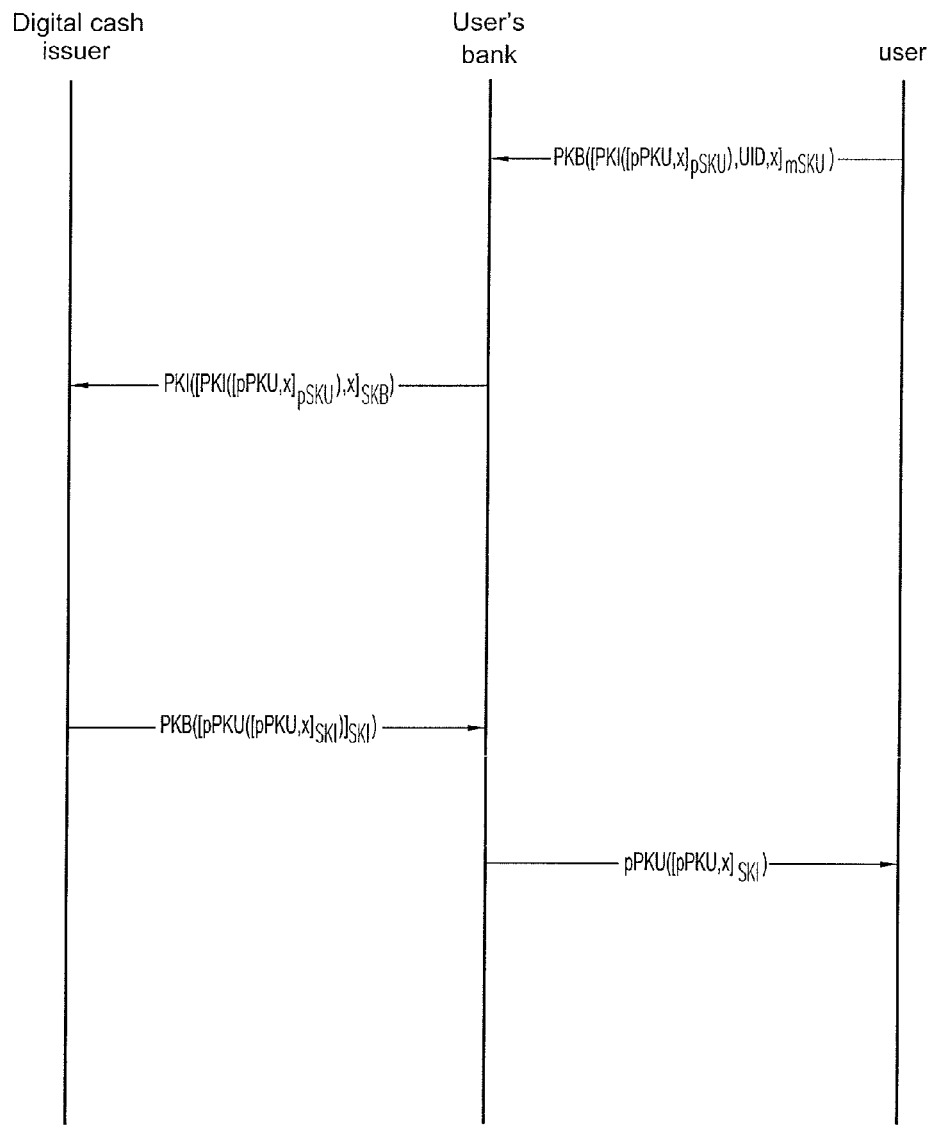
FIG. 3 is an exemplary user registration process part 1 according to the first embodiment.
Figure 4:
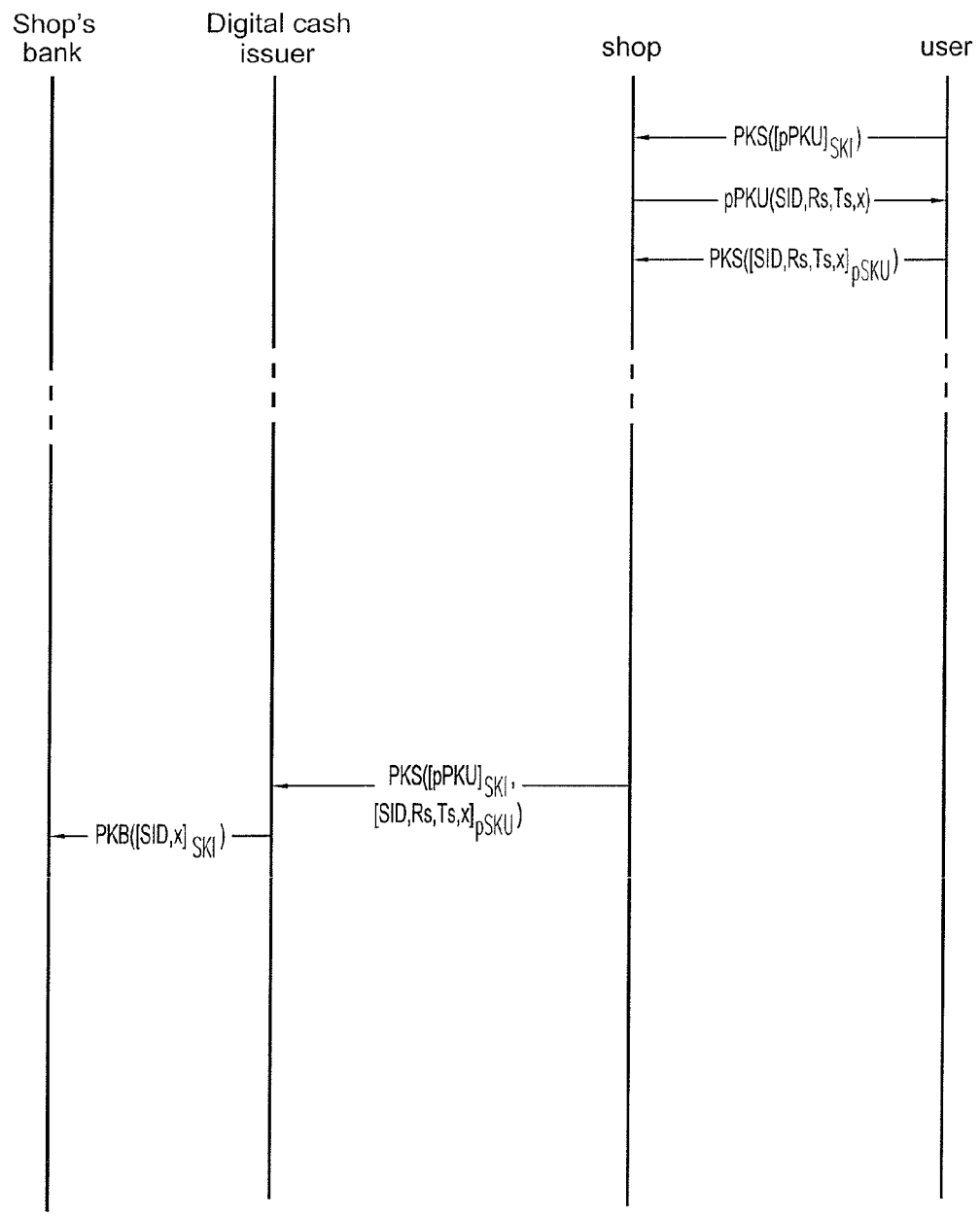
FIG. 4 is an exemplary user registration process part 2 according to the first embodiment.

FIG. 2 shows the diagrammatic representation of the registration protocol, and FIGS. 3 and 4 show parts 1 and 2 of the registration process. Referring to FIG. 3, the user key generating program generates a pseudonym public key and a pseudonym secret key. The signature generating program then signs the pseudonym public key and the user real identification using the user's master secret key. The encryption program encrypts $[UID,pPKU]_{mSKU}$ using the public key of the certificate authority and sends $PKC([UID,pPKU]_{mSKU})$ to the certificate authority via a communications path as a request for a certified pseudonym public key (i.e., a request for the issuance of a license).

The certificate authority receives the request (PKC([UID, pPKU]$_{mSKU}$)) and the decryption program decrypts request using the secret key SKC of the certificate authority. The signature verifying program verifies the validity of the user signature using the user's master public key mPKU. If the signature is valid, the certificate authority signature generating program generates a signature (license) [pPKU]$_{SKC}$ for the user's pseudonym public key using the certificate authority's secret key SKC, and stores the user's pseudonym public key in the storage device in connection with the user's master public key mPKU and the user's real identification UID. The certificate authority encryption program encrypts the license [pPKU]$_{SKC}$ using the user's master public key mPKU and sends the license mPKU([pPKU]$_{SKC}$) to the user via a communications path.

The user receives the encrypted license mPKU ([pPKU]$_{SKC}$) and the decryption program decrypts the license using the user's master secret key mSKU. The signature verifying program verifies the validity of the license [pPKU]$_{SKC}$ using the public key PKC of the certificate authority. If the license is valid, the license is stored in the storage device.

Referring to FIG. 4, the user encryption program encrypts the license [pPKU]$_{SKC}$, pseudonym public key pPKU using the public key PKI of the digital cash issuer and sends the encrypted license PKI([pPKU]$_{SKC}$,pPKU) to the digital cash issuer via a communications path as a request for registration in the digital cash issuer and for the digital cash issuer license.

The digital cash issuer receives the request PKI([pPKU]$_{SKC}$,pPKU) and the decryption program decrypts the information using the secret key SKI of the digital cash issuer. The digital cash issuer searches for pPKU in its storage to prevent the use of another user's pseudonym public key. If the user's pseudonym public key pPKU is not registered, the digital cash issuer signature verifying program verifies the validity of the license [pPKU]$_{SKC}$ the using the certificate authority's public key PKC. If the license is valid, the digital cash issuer assigns a storage space to the user and stores the user's pseudonym public key pPKU. The digital cash issuer signature generating program signs the user's pseudonym public key pPKU the using the secret key of the digital cash issuer SKI. The encryption program encrypts the information using the user's pseudonym public key pPKU and sends pPKU([pPKU]$_{SKI}$) as a license to the user via a communications path.

The user receives pPKU([pPKU]$_{SKI}$), and the decryption program decrypts the license using the user's pseudonym secret key pSKU. The signature verifying program verifies the validity of the digital cash issuer signature using the digital cash issuer's public key PKI. If the signature is valid, the license [pPKU]$_{SKI}$ is stored in the storage device. The user may obtain additional certified pseudonym public keys without a limit.

(2) Withdrawal Procedure (i.e., the Electronic Cash Issuing Procedure)

Figure 5:
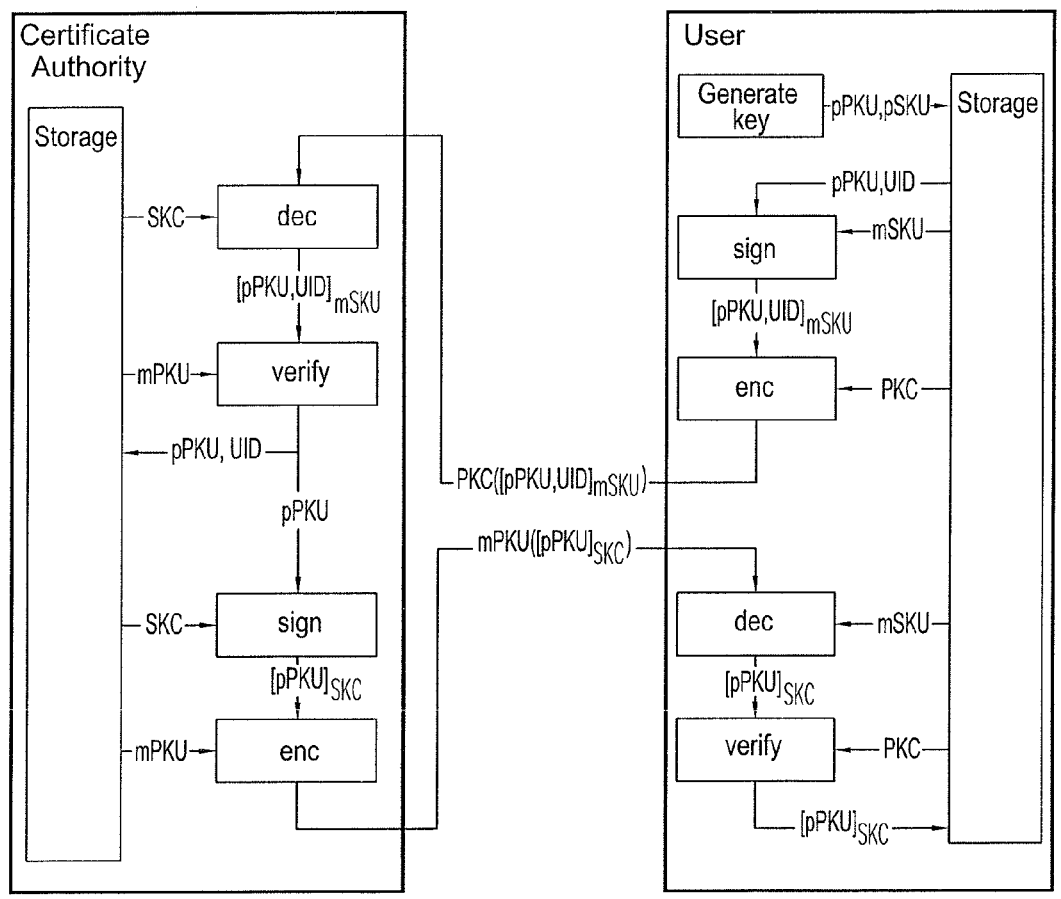
FIG. 5 is an exemplary withdrawal protocol according to the first embodiment.
Figure 6:
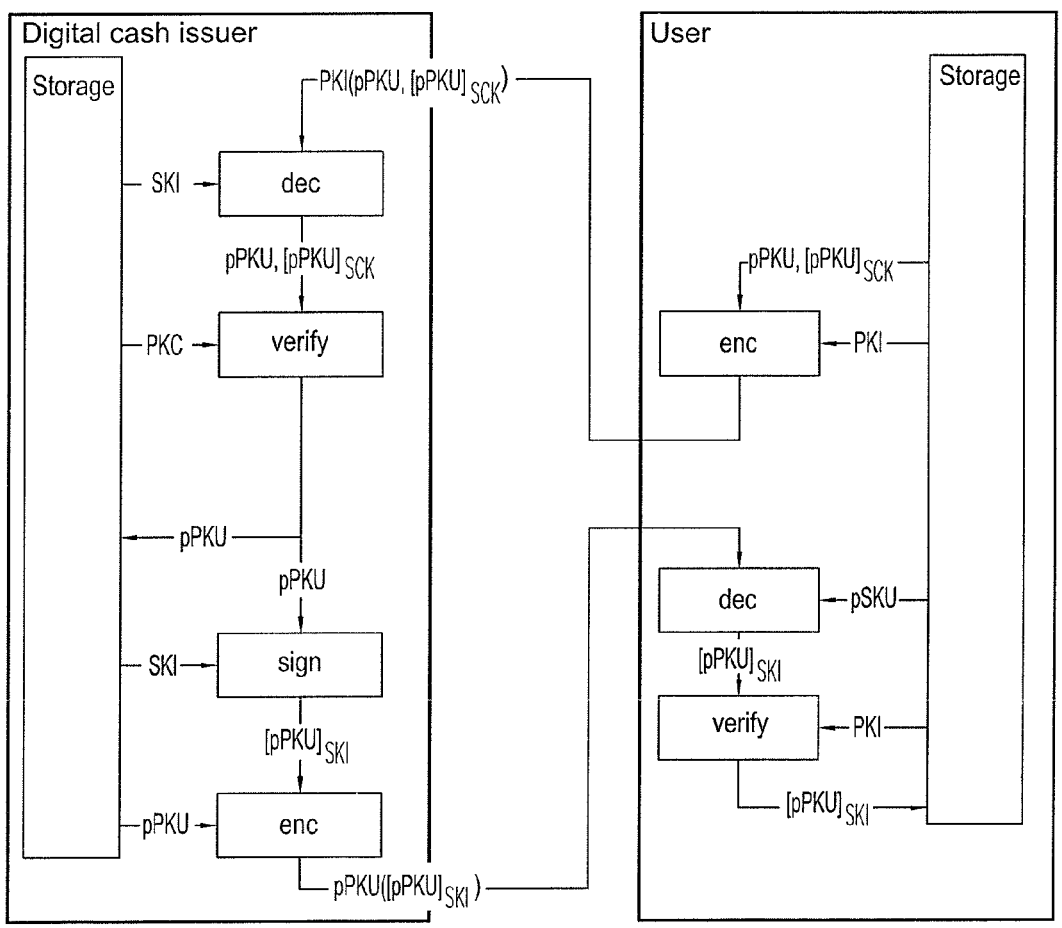
FIG. 6 is an exemplary withdrawal process part 1 according to the first embodiment.
Figure 7:
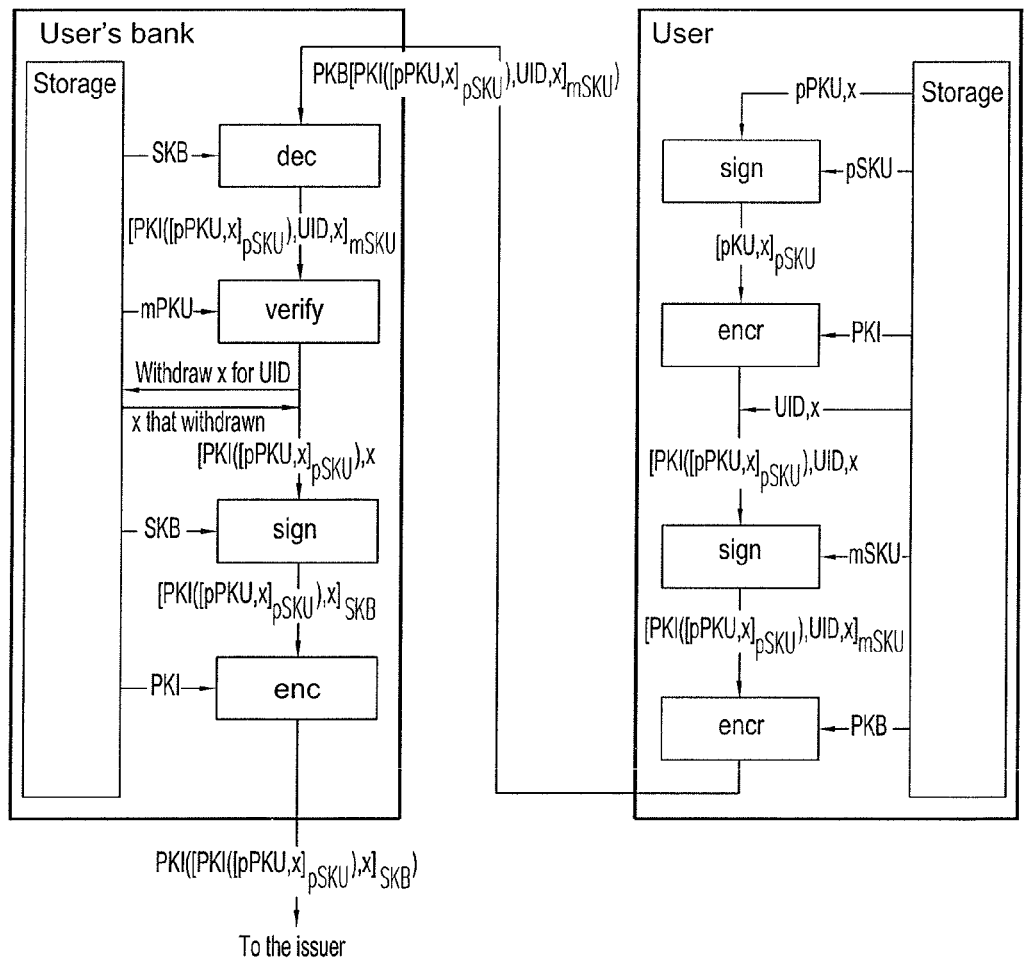
FIG. 7 is an exemplary withdrawal process part 2 according to the first embodiment.
Figure 8:
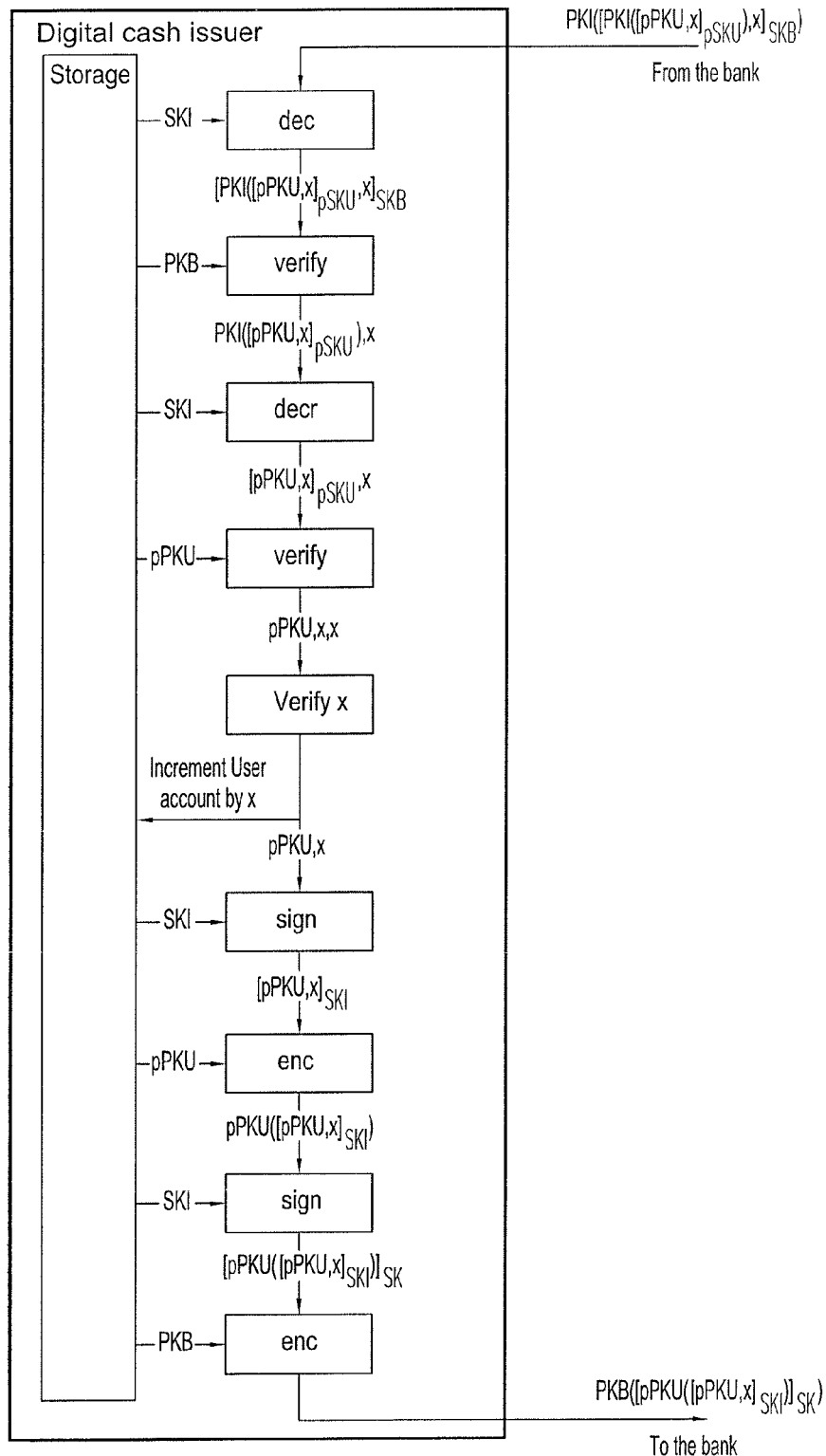
FIG. 8 is an exemplary withdrawal process part 3 according to the first embodiment.

FIG. 5 shows a diagrammatic representation of the withdrawal protocol, and FIGS. 6-8 show parts 1-3 of the withdrawal process. Referring to FIGS. 5 and 6, the user signature generating program signs the user's pseudonym public key pPKU and the amount of digital cash x using the user's pseudonym secret key pSKU. The encryption program encrypts the signed user's pseudonym public key and the amount of digital cash [pPKU,x]$_{pSKU}$ using the digital cash issuer's public key PKI. The signature generating program signs the user real identification UID, the amount of money to be withdrawn x, the encrypted signed user's pseudonym public key, and the amount of digital cash PKI([pPKU,x]$_{pSKU}$) using the user's master secret key mSKU. The encryption program encrypts the information using the public key of the bank PKB and sends PKB([PKI([pPKU,x]$_{pSKU}$), UID,x]$_{mSKU}$) to the user's bank via a communications path.

The bank decryption program decrypts PKB([PKI([pPKU, x]$_{pSKU}$),UID,x]$_{mSKU}$) using the bank's secret key SKB and the signature verifying program verifies the validity of the signature for authentication with the master public key of the user mPKU. If the signature is valid, the amount of money x is withdrawn from the user account. The signature generating program signs the encrypted signed user's pseudonym public key, the amount of digital cash PKI([pPKU,x]$_{pSKU}$, and the withdrawn amount of money x using the bank's secret key SKB. The encryption program encrypts the information using the public key of the digital cash issuer PKI and sends the information PKI([PKI([pPKU,x]$_{pSKU}$),x]$_{SKB}$) to the digital cash issuer via a communications path.

Referring to FIG. 7, the digital cash issuer receives the information PKI([PKI([pPKU,x]$_{pSKU}$),x]$_{SKB}$), and the decryption program decrypts the information using the digital cash issuer's secret key SKI. The signature verifying program verifies the signature of the bank using the public key of the user's bank PKB. If the signature is valid, the digital cash issuer decryption program decrypts PKI([pPKU,x]$_{pSKU}$) using the digital cash issuer's secret key. The signature verifying program verifies the signature of the user using the user's pseudonym public key pPKU to authenticate the user. If the signature is valid, the issuer verifies the equality of the two amounts x. The amounts are not equal, the real identity of the user is revealed by sending pPKU to the certificate authority. If the amounts are equal, the digital cash issuer increments the user's virtual account by the amount x of digital cash. The signature generating program signs the pseudonym public key pPKU and digital cash amount x using the digital cash issuer's secret key SKI. The encryption program encrypts the signed pseudonym public key and the amount of the digital cash [pPKU,x]$_{SKI}$ using the user's pseudonym public key pPKU. The signature generating program signs the pPKU ([pPKU,x]$_{SKI}$) using the digital cash issuer's secret key SKI. The encryption program encrypts [pPKU([pPKU,x]$_{SKI}$)]$_{SKI}$ using the public key of the bank PKB and sends PKB([pPKU ([pPKU,x]$_{SKI}$)]$_{SKI}$) to the user's bank via a communications path.

Referring to FIG. 8, the user's bank receives the information PKB([pPKU([pPKU,x]$_{SKI}$)]$_{SKI}$) and the decryption program decrypts the information using the user's bank secret key SKB. The signature verifying program verifies the digital cash issuer signature using the public key of the digital cash issuer PKI. If the signature is valid, pPKU([pPKU,x]$_{SKI}$) is sent to the user via a communications path.

The user receives pPKU([pPKU,x]$_{SKI}$), and the decryption program decrypts the information by the using the user's pseudonym secret key. The signature verifying program verifies the validity of the digital cash issuer signature with the digital cash issuer's public key PKI. If the signature is valid, the cumulative amount of digital cash is incremented by the amount of digital cash x. The new cumulative amount of digital cash is then stored in the storage device by the user.

(3) Payment Procedure

Figure 9:
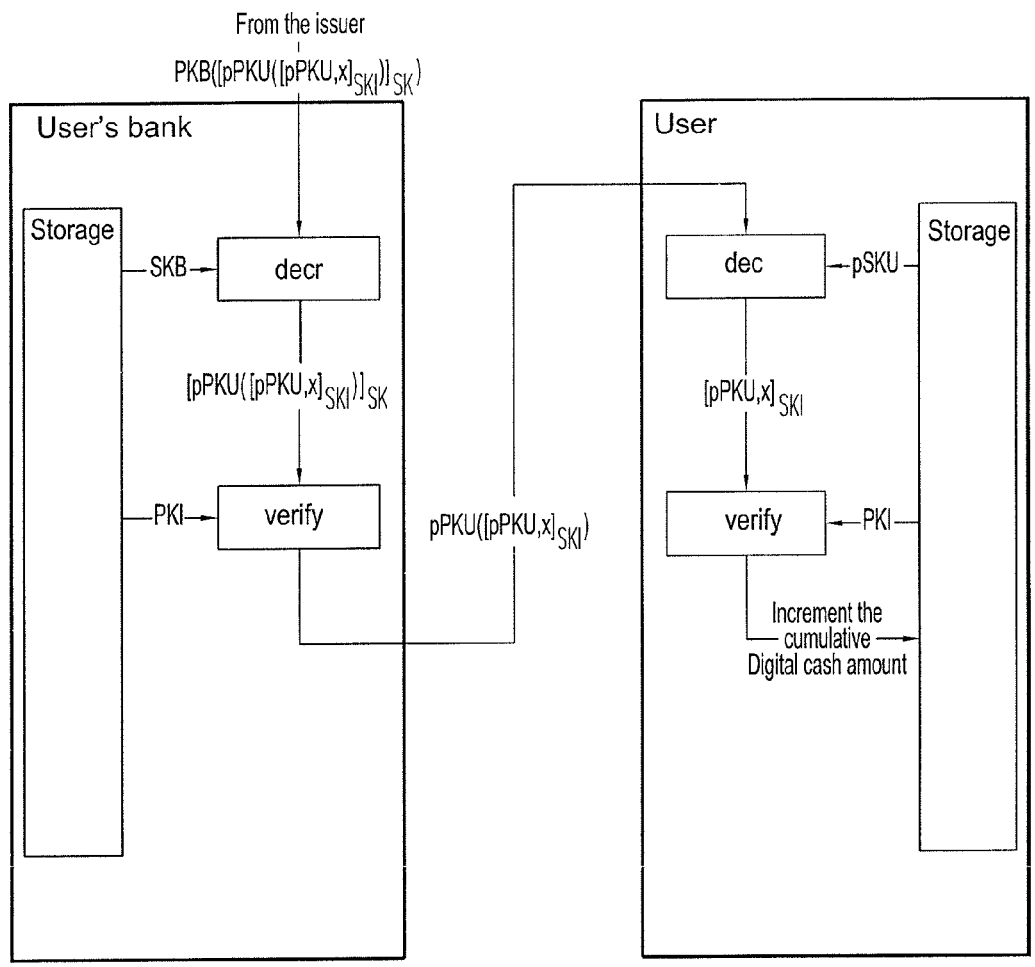
FIG. 9 is an exemplary payment protocol according to the first embodiment.
Figure 10:
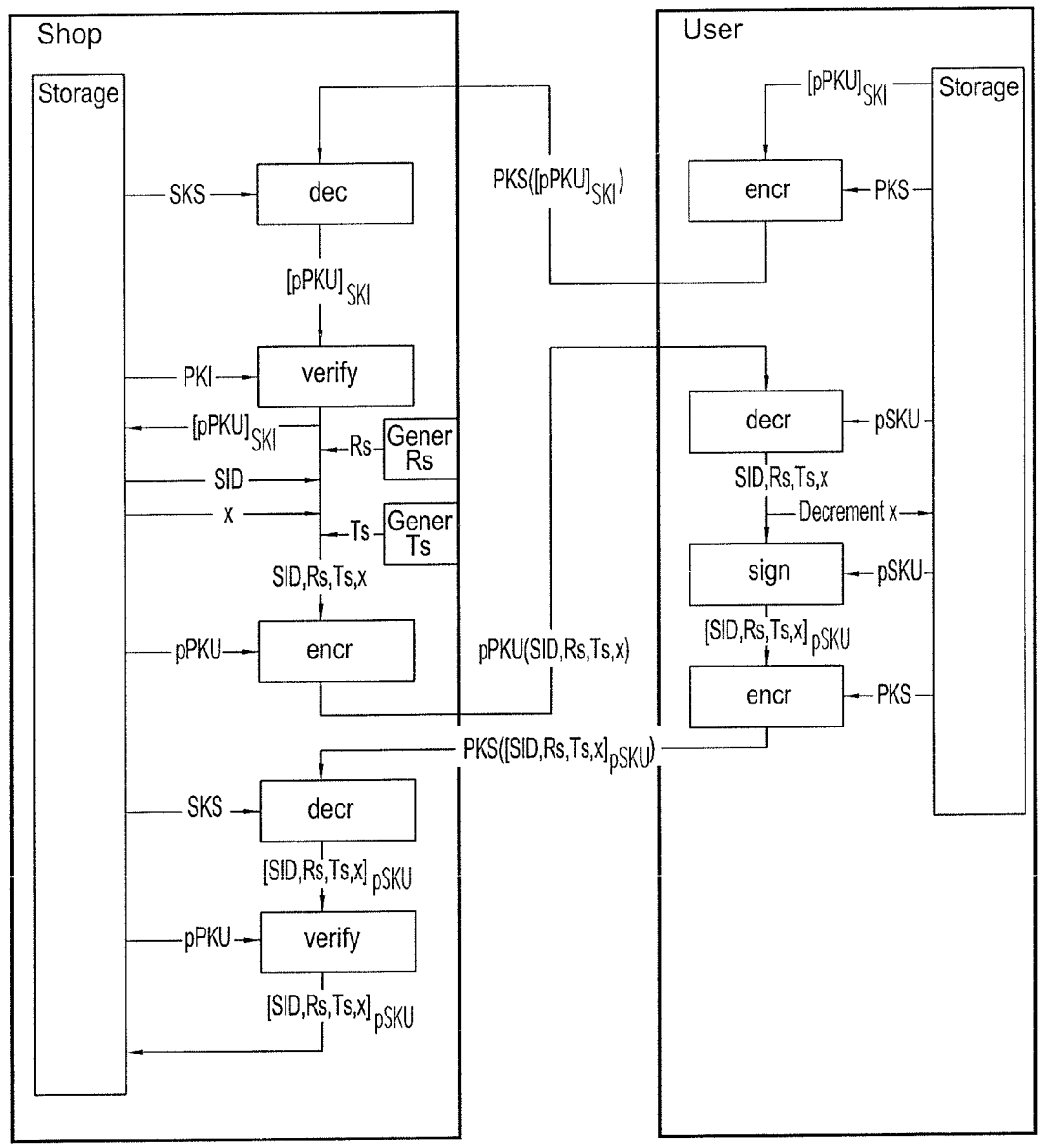
FIG. 10 is and exemplary payment process part 1 according to the first embodiment.
Figure 11:
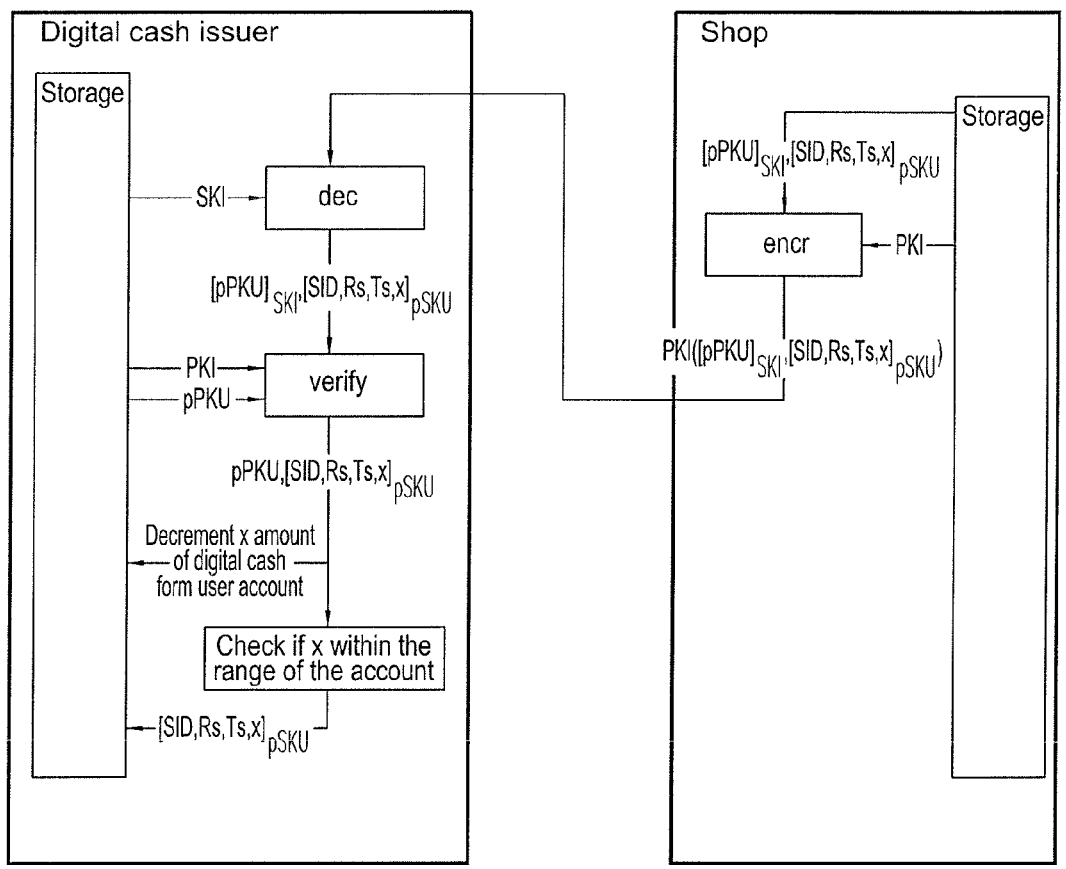
FIG. 11 is an exemplary payment process part 2 according to the first embodiment.
Figure 12:
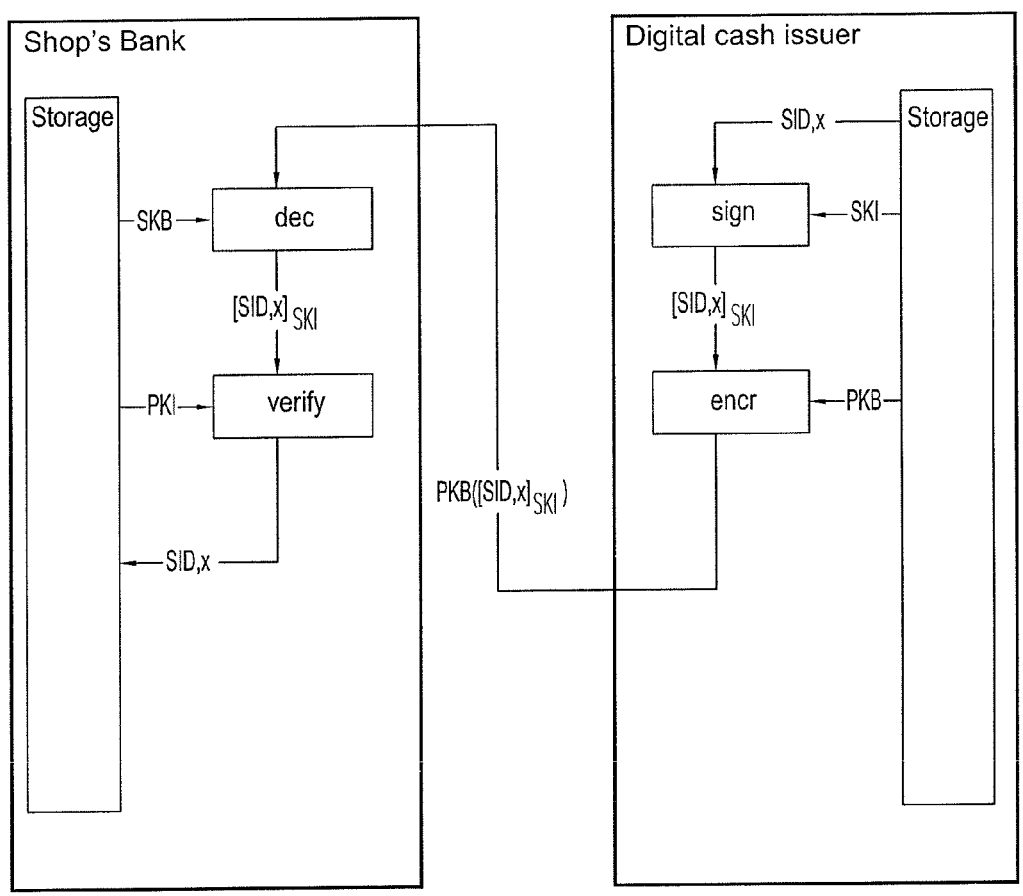
FIG. 12 is an exemplary payment process part 3 according to the first embodiment.

FIG. 9 shows the diagrammatic representation of the payment protocol, and FIGS. 10-12 show parts 1-3 of the payment process. Referring to FIGS. 9 and 10, the user encryption program encrypts the digital cash issuer license [pPKU]$_{SKI}$ using the public key of the shop PKS and sends the license to the shop as request for payment.

The shop decryption program decrypts the encrypted digital cash issuer license $PKS([pPKU]_{SKI})$ using the shop's secret key SKS. The signature verifying program verifies the signature of the issuer with the digital cash issuer public key PKI. If the signature is valid, the shop stores the user's digital cash issuer license. The random number generating program generates a random number Rs, and the time generating program generates the time Ts. The encryption program encrypts the shop identification SID, Rs, Ts, and the price of payment x using the user's pseudonym public key pPKU and sends pPKU(SID,Rs,Ts,x) to the user via a communications path.

The user receives pPKU(SID,Rs,Ts,x) and the decryption program decrypts the information using the user's pseudonym secret key pSKU. The cumulative amount of digital cash in the user's storage device is decremented by x. The signature generating program signs the shop identification SID, the random number Rs, the time Ts, and the price of payment x using the user's pseudonym secret key pSKU. The encryption program encrypts the information using the public key of the shop PKS then sends $PKS([SID,Rs,Ts,x]_{pSKU})$ to the shop via a communications path.

The shop receives the information $PKS([SID,Rs,Ts,x]_{pSKU})$ and the decryption program decrypts the information using the shop's secret key SKS. The signature verifying program verifies the signature using the user's pseudonym public key pPKU. If the signature is valid, the shop stores the challenge and the shop regards the payment as valid.

Referring to FIG. 11, after a period of time, the shop encryption program encrypts the information that contains the challenge that was signed by the user $[SID,Rs,Ts,x]_{pSKU}$, and the user's digital cash issuer license $[pPKU]_{SKI}$ using the public key of the digital cash issuer PKI and sends the information to the digital cash issuer via a communications path.

The digital cash issuer decryption program decrypts PKI $([SID,Rs,Ts,x]_{pSKU}, [pPKU]_{SKI})$ using the digital cash issuer's secret key SKI. The signature verifying program verifies the signature using the digital cash issuer's public key PKI and the user's pseudonym public key pPKU. If the signature is valid, the issuer decrements the user virtual account by the amount of the payment x. If the digital cash issuer determines that the user spends more than the amount in the virtual account, the real user identity is revealed by sending the user's pseudonym public key pPKU to the certificate authority. If the user spends less than the amount in the virtual account, the digital cash issuer stores the challenge $[SID,Rs,Ts,x]_{pSKU}$ in the storage device.

Referring to FIG. 12, the digital cash issuer signature generating program signs the shop identification SID and the amount x to be deposited for the shop with the digital cash issuer's secret key SKI. The encryption program encrypts the information using the public key of the shop's bank PKB and sends $PKB([SID,x]_{SKI})$ to the shop's bank via a communications path.

The shop's bank receives $PKB([SID,x]_{SKI})$ and the decryption program decrypts the information using the secret key SKB. The signature verifying program verifies the signature with the public key of the issuer PKI. If the signature is valid, the shop's bank adds the amount of money x to the shop's account.

Second Embodiment

In another example, against that because issued public keys may be passed outside of the issuer's control, a more powerful encryption may be used to protect against any public key leakage and misuse. A cryptographic coprocessor is used such that once data is encrypted, the data may not be decrypted without use of the coprocessor. In this example, the certification authority, use, and bank entities are as described above, however, the certificate issuer also is provided with a cryptographic coprocessor.

(1) User Registration Procedure

The user registration procedure for this example is the same as described above for FIGS. 2-4.

(2) Withdrawal Procedure (i.e., Electronic Cash Issuing Procedure)

Figure 13:
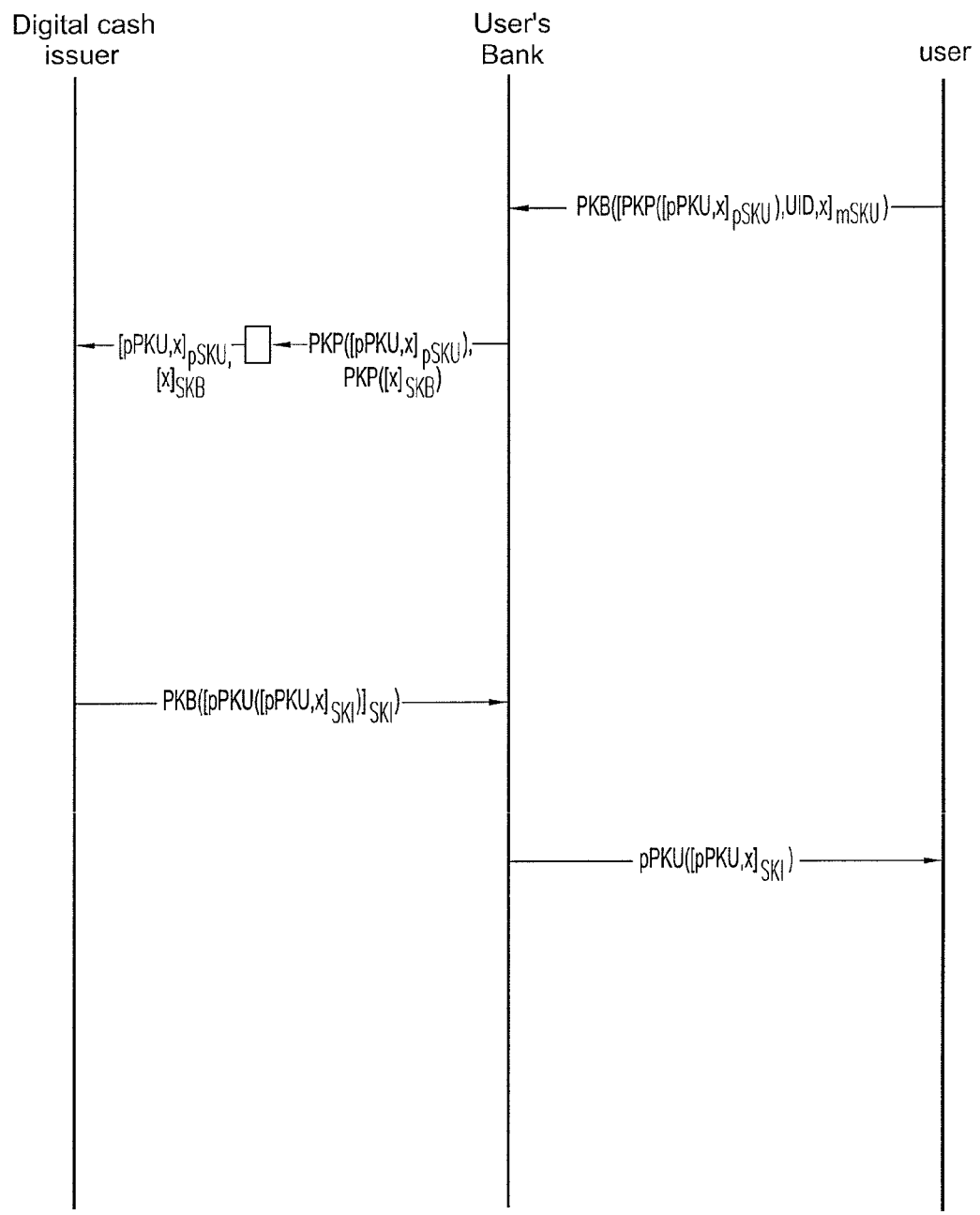
FIG. 13 is an exemplary withdrawal protocol according to the second embodiment.
Figure 14:
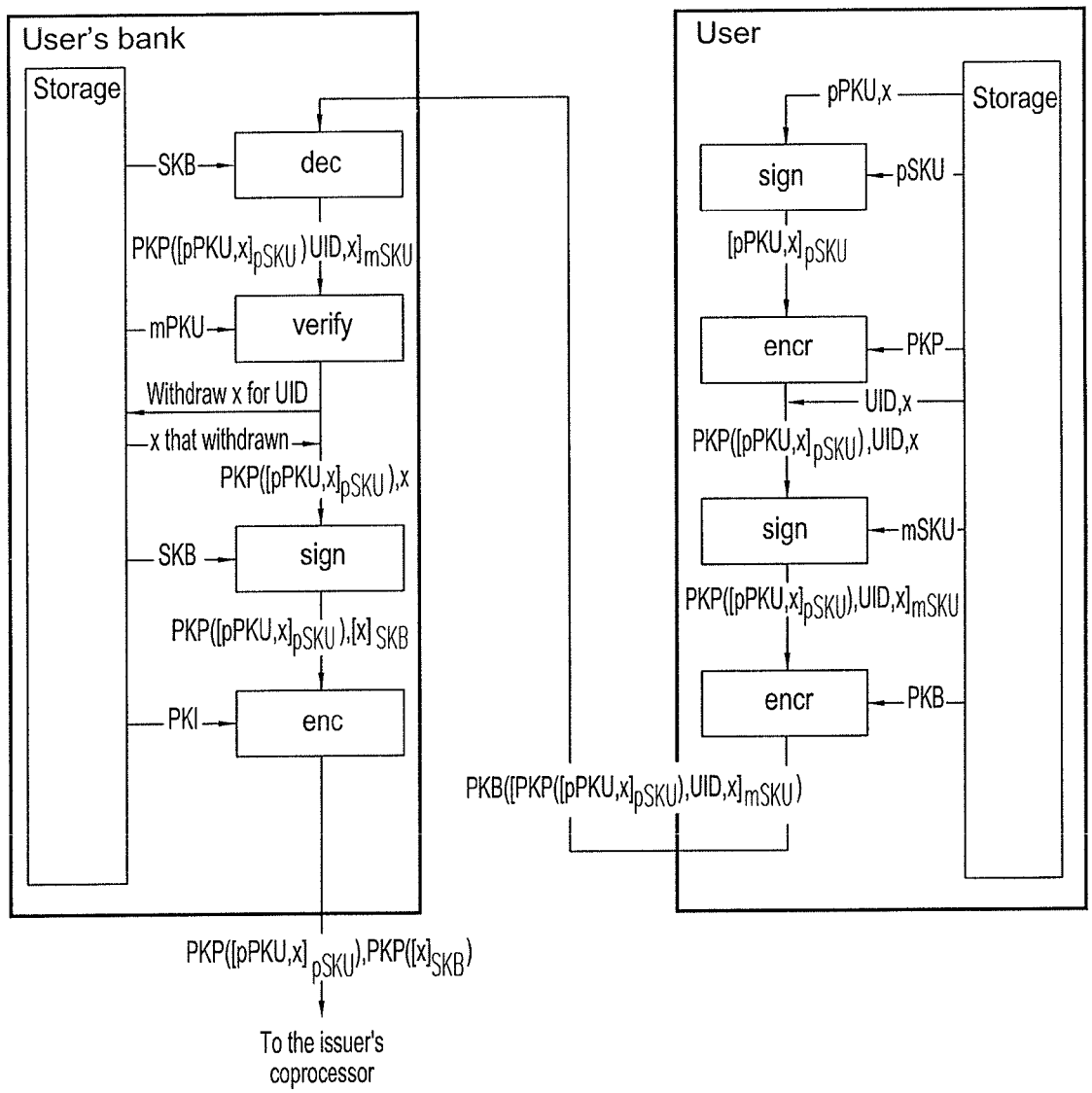
FIG. 14 is an exemplary withdrawal process part 1 according to the second embodiment.
Figure 15:
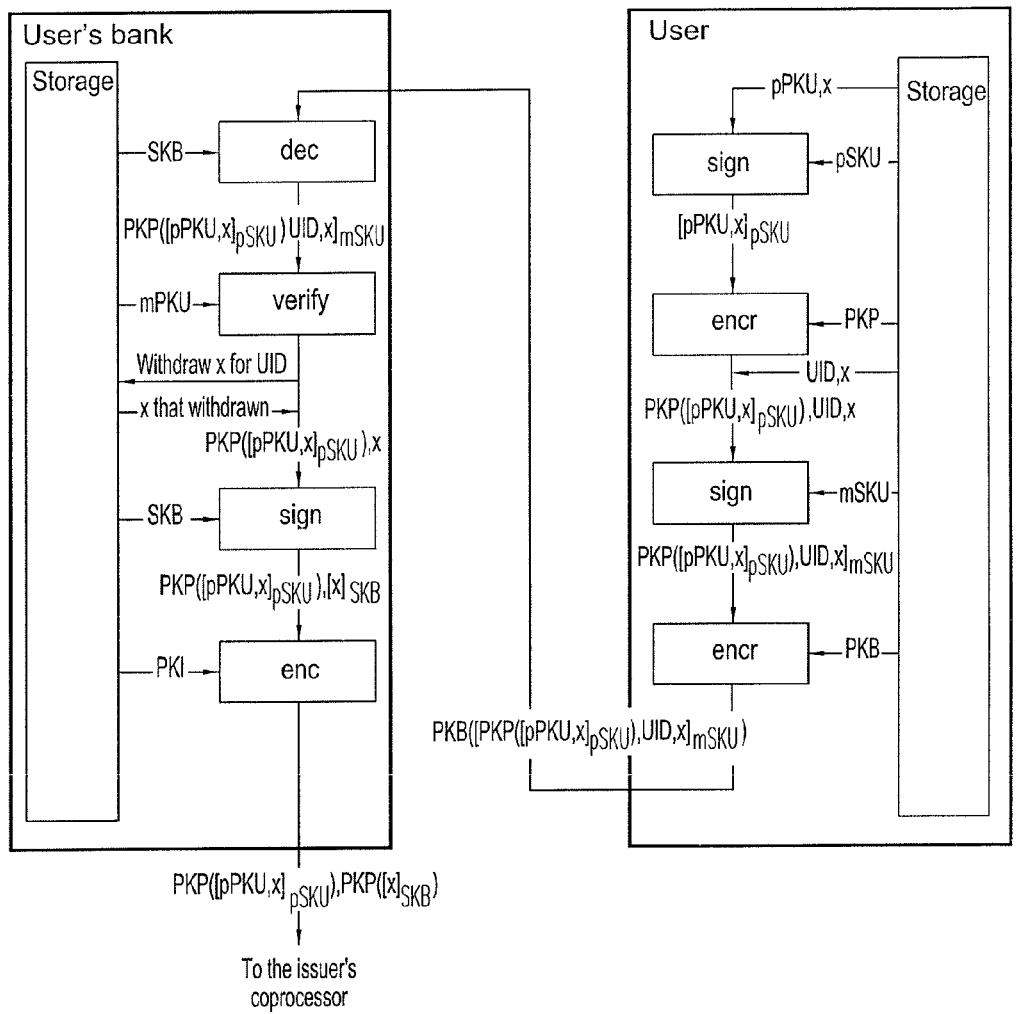
FIG. 15 is an exemplary withdrawal process part 2 according to the second embodiment.
Figure 16:
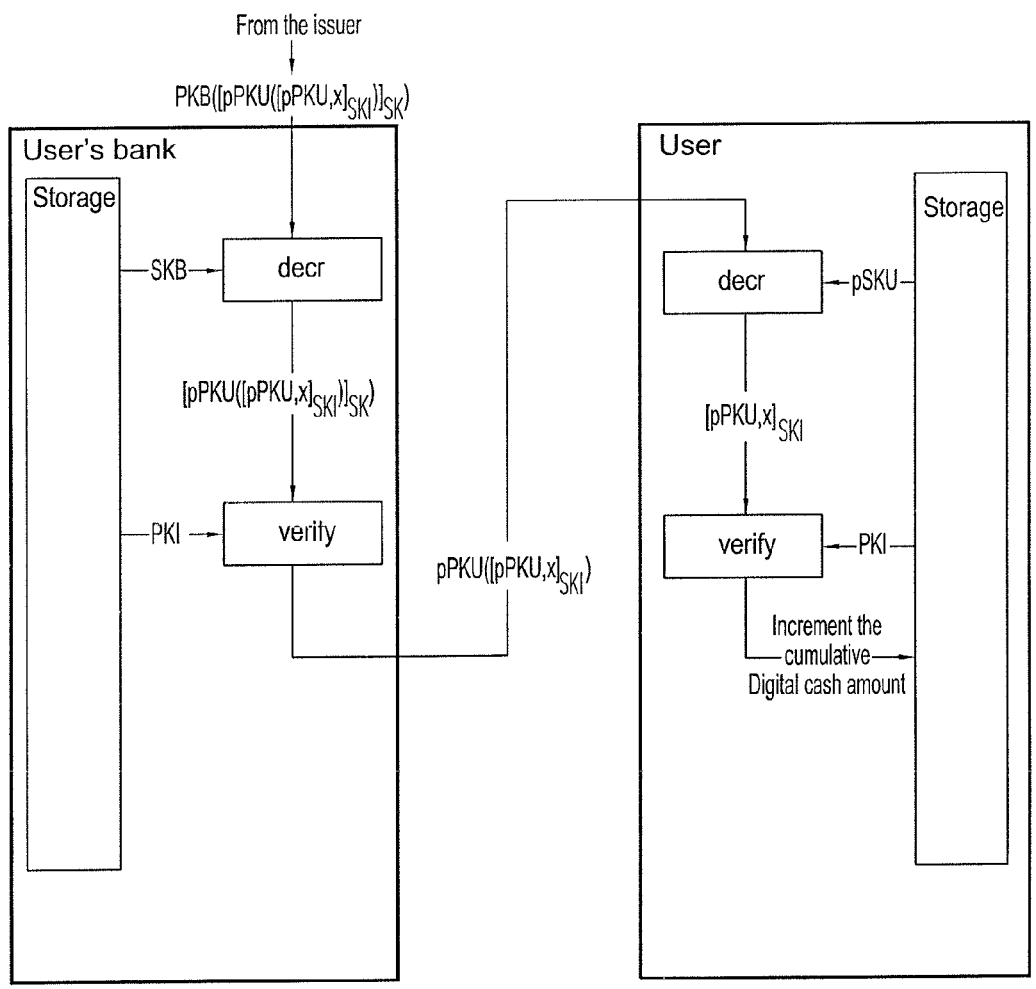
FIG. 16 is an exemplary withdrawal process part 3 according to the second embodiment.

FIG. 13 shows the diagrammatic representation of a withdrawal protocol, and FIGS. 14-16 show parts 1-3 of the withdrawal process. Referring to FIGS. 13 and 14, the user signature generating program signs the user's pseudonym public key pPKU and the amount of digital cash x using the user's pseudonym secret key pSKU. The encryption program encrypts the signed user's pseudonym public key and the amount of digital cash $[pPKU,x]_{pSKU}$ using the public key of a cryptographic coprocessor PKP. The signature generating program signs the user real identification UID, the amount of money to be withdrawn x, and $PKP([pPKU,x]_{pSKU})$ using the user's master secret key mSKU. The encryption program encrypts the information using the public key of the user's bank PKB and sends the information $PKB([PKP([pPKU,x]_{pSKU}),UID,x]_{mSKU})$ to the user's bank via a communications path.

The user's bank decryption program decrypts the information $PKB([PKP([pPKU,x]_{pSKU}),UID,x]_{mSKU})$ using the bank's secret key. The signature verifying program verifies the validity of the signature for authentication with the master public key of the user mPKU. If the signature is valid, the amount of money x is withdrawn from the user account. The signature generating program signs the amount x that is withdrawn from the user account using the user's bank's secret key SKB and the encryption program encrypts $[x]_{SKB}$ using the public key of the cryptographic coprocessor PKP. The information $PKP([pPKU,x]_{pSKU})$ and $PKP([x]_{SKB})$ is sent to the digital cash issuer via a communications path.

Referring to FIG. 15, the digital cash issuer receives PKP $([pPKU,x]_{pSKU})$ and $PKP([x]_{SKB})$, and decrypts the information using the secret key of the cryptographic coprocessor to obtain the signed user's pseudonym public key, the amount of digital cash $[pPKU,x]_{pSKU}$ and the signed amount of withdrawn money from the user account $[x]_{SKB}$. The signature verifying program verifies the signature of the bank using the public key of the bank PKB. If the signature is valid, the digital cash issuer signature verifying program verifies the user's signature $[pPKU,x]_{pSKU}$ using the user's pseudonym public key pPKU. If the user's signature is valid, the issuer verifies that the two amounts x are equal. If the amounts are not equal, the real identity of the user is revealed by sending pPKU to the certificate authority. If the amounts are equal, the digital cash issuer increments the user's virtual account of digital cash by the amount x. The signature generating program signs the pseudonym public key pPKU and the digital cash amount x using the digital cash issuer's secret key SKI. The encryption program encrypts the signed pseudonym public key and the amount of the digital cash $[pPKU,x]_{SKI}$ using the user's pseudonym public key pPKU. The signature generating program signs the $pPKU([pPKU,x]_{SKI})$ using the digital cash issuer's secret key SKI and the encryption program encrypts $[pPKU([pPKU,x]_{SKI})]_{SKI}$ using the public key of the bank PKB. The information $PKB([pPKU([pPKU,x]_{SKI})]_{SKI})$ is sent to the user's bank via a communications path.

Referring to FIG. 16, the user's bank receives the information $PKB([pPKU([pPKU,x]_{SKI})]_{SKI})$ and the decryption program decrypts the information using the user's bank secret key SKB. The signature verifying program verifies the digital cash issuer signature using the public key of the digital cash issuer PKI. If the signature is valid, pPKU([pPKU,x]$_{SKI}$) is sent to the user.

The user receives pPKU([pPKU,x]$_{SKI}$), and the decryption program decrypts the information using the user's pseudonym secret key. The signature verifying program verifies the validity of the digital cash issuer signature with the digital cash issuer's public key PKI. If the signature is valid, the cumulative amount of digital cash is incremented by the amount of digital cash x and the new cumulative amount of digital cash is stored in the storage device of the user.

(3) Payment Procedure

The payment procedure is the same as that described above for FIGS. 9-12.

Third Embodiment

In the previous embodiments, the withdrawal process and the payment process are performed from fixed positions, which require the user to access user station to buy or to get digital cash. For more convenience and accessibility, the following example allows a user to use a mobile device to buy and to get digital cash. The user mobile device in this implementation includes a processing device, a storage device, an encryption program, and a decryption program. However, because the storage and the computational power of most conventional mobile devices are limited, the mobile device implementation may provide only a minimum requirement to protect the security and privacy.

(1) User Registration Procedure

The user registration procedure for this example is the same as described above for FIGS. 2, 3, and 4.

(2) Withdrawal Procedure (Electronic Cash Issuing Procedure)

Figure 17:
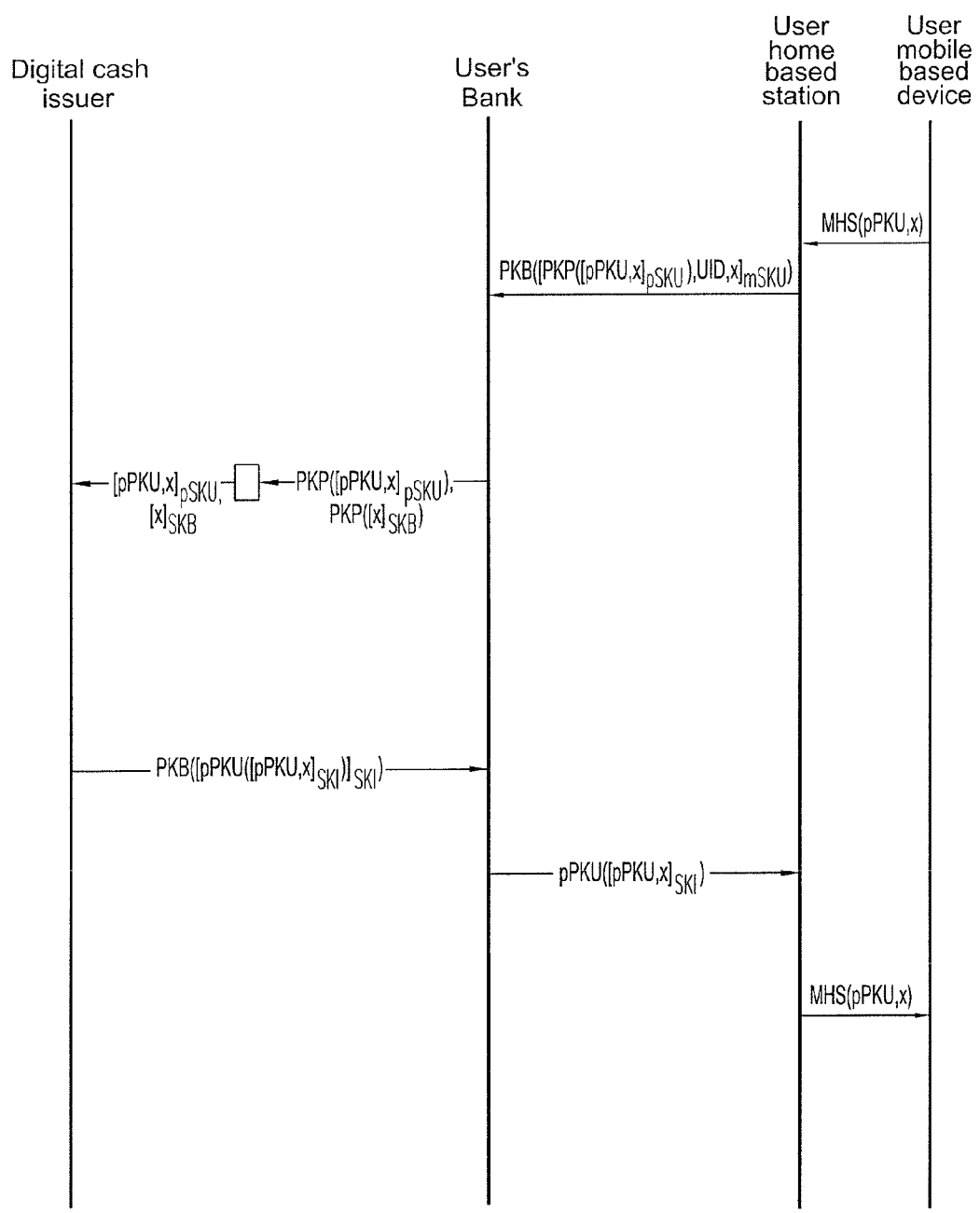
FIG. 17 is an exemplary withdrawal protocol according to the third embodiment.
Figure 18:
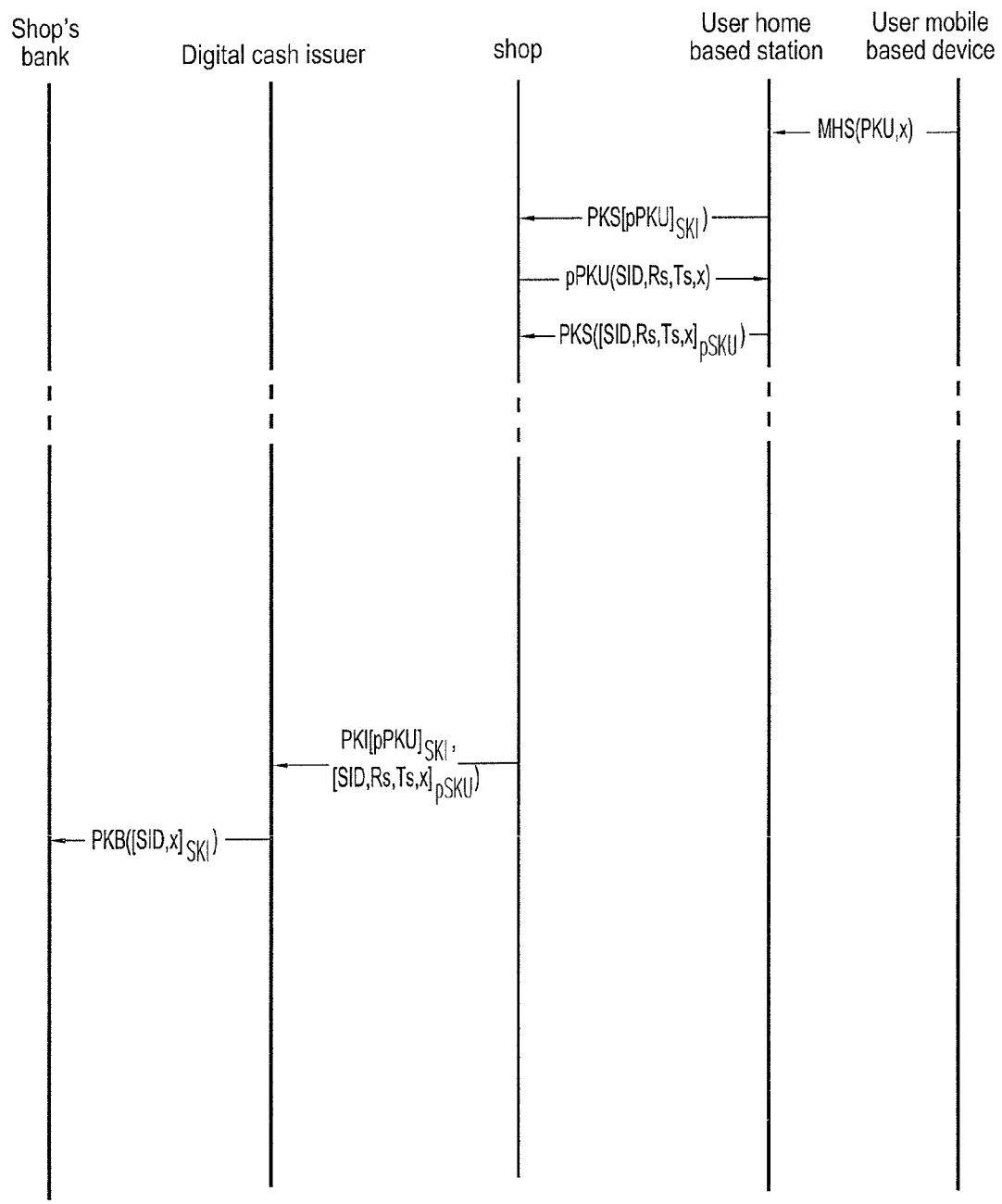
FIG. 18 is an exemplary withdrawal process part 1 according to the third embodiment.

FIG. 17 shows a diagrammatic representation of the withdrawal protocol, and FIGS. 18-22 show parts 1-5 of the withdrawal process. Referring to FIGS. 17 and 18, the user's mobile device encryption program encrypts the user's pseudonym public key pPKU and the amount of digital cash x using a mobile-home based shared secret key MHS. The mobile device sends the information MHS(pPKU,x) to the user's station via a communications path.

The user's station receives the encrypted user's pseudonym public key and the amount of digital cash MHS(pPKU, x) and the decryption program decrypts the information using the mobile/home shared secret key MHS. The home base station determines if the decrypted pseudonym public key matches the user's pseudonym public key. If they are the same, the user's mobile device is authenticated by the user's home station.

Figure 19:
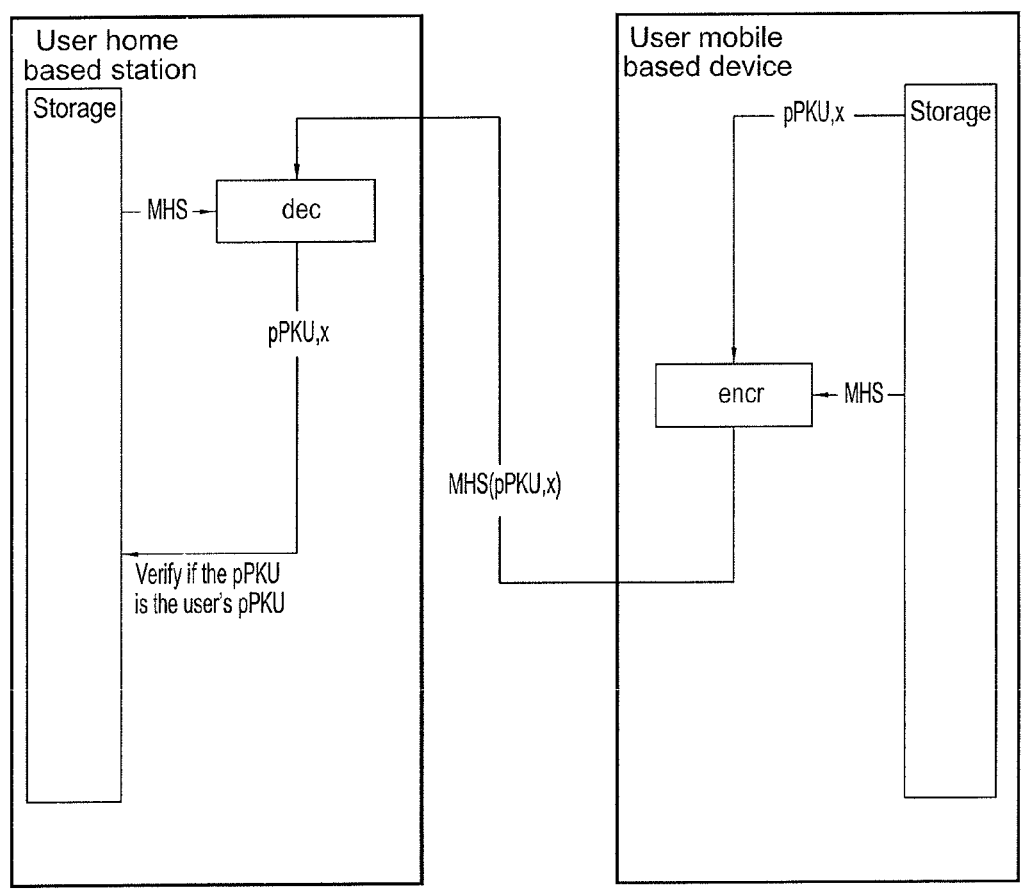
FIG. 19 is an exemplary withdrawal process part 2 according to the third embodiment.

Referring to FIG. 19, the user's home station signature generating program signs the user's pseudonym public key pPKU and the amount of digital cash x using the user's pseudonym secret key pSKU. The encryption program encrypts the signed user's pseudonym public key and the amount of digital cash [pPKU,x]$_{pSKU}$ using the public key of a cryptographic coprocessor PKP. The signature generating program signs the user real identification UID, the amount of money to be withdrawn x, and PKP([pPKU,x]$_{pSKU}$) using the user's master secret key mSKU. The encryption program encrypts the information using the public key of the user's bank PKB and sends PKB([PKP([pPKU,x]$_{pSKU}$), UID,x]$_{mSKU}$) to the user's bank via a communications path.

The user's bank decryption program decrypts PKB([PKP ([pPKU,x]$_{pSKU}$),UID,x]$_{mSKU}$) using the user's bank's secret key. The signature verifying program verifies the validity of the signature for authentication with the master public key of the user mPKU. If the signature is valid, the amount of money x is withdrawn from the user account. The signature generating program signs the amount x that is withdrawn from the user account using the user's bank's secret key SKB. The encryption program encrypts [x]$_{SKB}$ using the public key of the cryptographic coprocessor PKP, and sends information PKP([pPKU,x]$_{pSKU}$) and PKP([x]$_{pSKU}$) to the digital cash issuer via a communications path.

Figure 20:
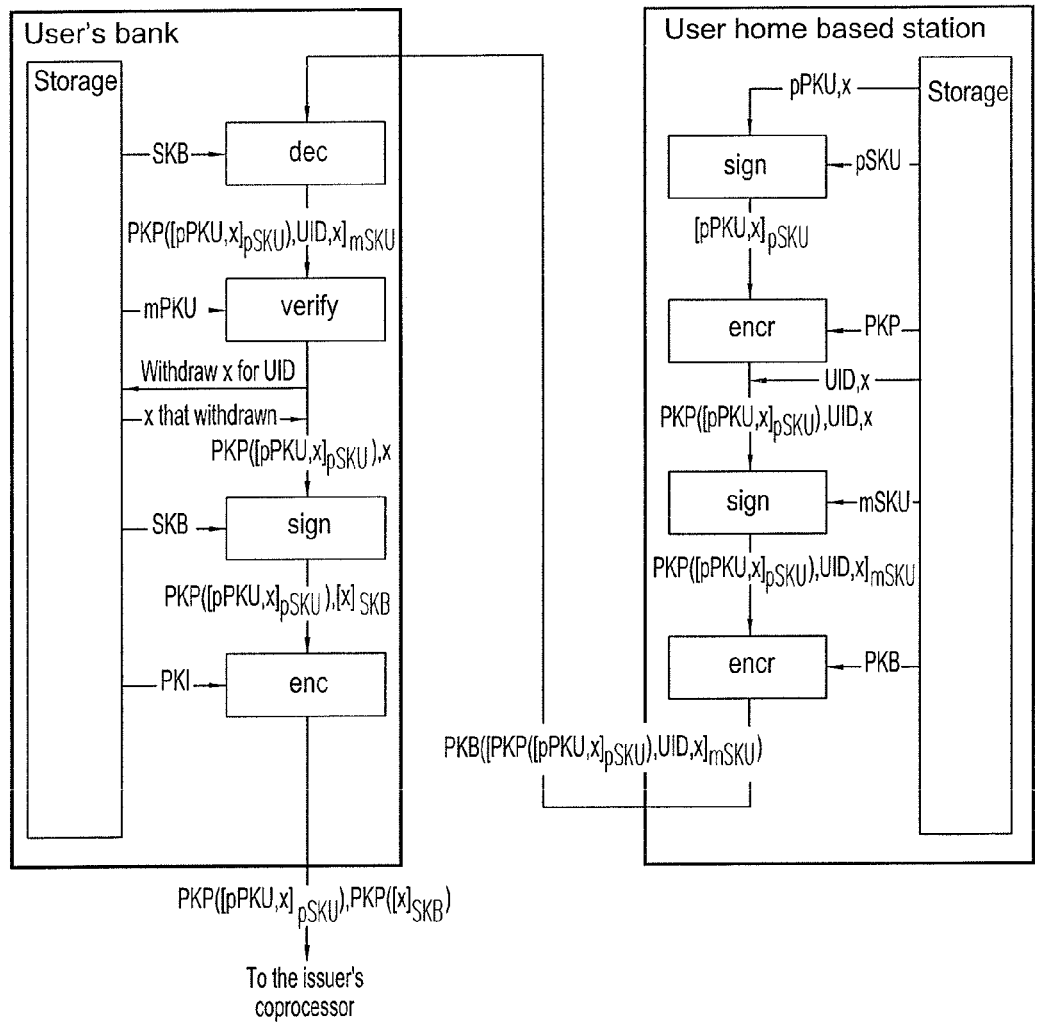
FIG. 20 is an exemplary withdrawal process part 3 according to the third embodiment.

Referring to FIG. 20, the digital cash issuer receives PKP ([pPKU,x]$_{pSKU}$) and PKP([x]$_{SKB}$), and decrypts the information using the secret key of the cryptographic coprocessor to obtain the signed user's pseudonym public key, the amount of digital cash [pPKU,x]$_{pSKU}$, and the signed amount of withdrawn money from the user account [x]$_{SKB}$. The signature verifying program verifies the signature of the user's bank using the public key of the bank PKB. If the signature is valid, the digital cash issuer signature verifying program verifies the user's signature [pPKU,x]$_{pSKU}$ using the user's pseudonym public key pPKU. If the signature is valid, the issuer verifies that the two amounts x are equal. If the amounts are not equal, the real identity of the user is revealed by sending pPKU to the certificate authority via a communications path. If the amounts are equal, the digital cash issuer increments the user's virtual account by the amount digital cash x. The signature generating program signs the pseudonym public key pPKU and digital cash amount x using the digital cash issuer's secret key SKI. The encryption program encrypts the signed pseudonym public key and the amount of the digital cash [pPKU,x]$_{SKI}$ using the user's pseudonym public key pPKU. The signature generating program signs the pPKU ([pPKU,x]$_{SKI}$) using the digital cash issuer's secret key SKI. The encryption program encrypts [pPKU([pPKU,x]$_{SKI}$)]$_{SKI}$ using the public key of the bank PKB and sends PKB([pPKU ([pPKU,x]$_{SKI}$)]$_{SKI}$) to the user's bank via a communications path.

Figure 21:
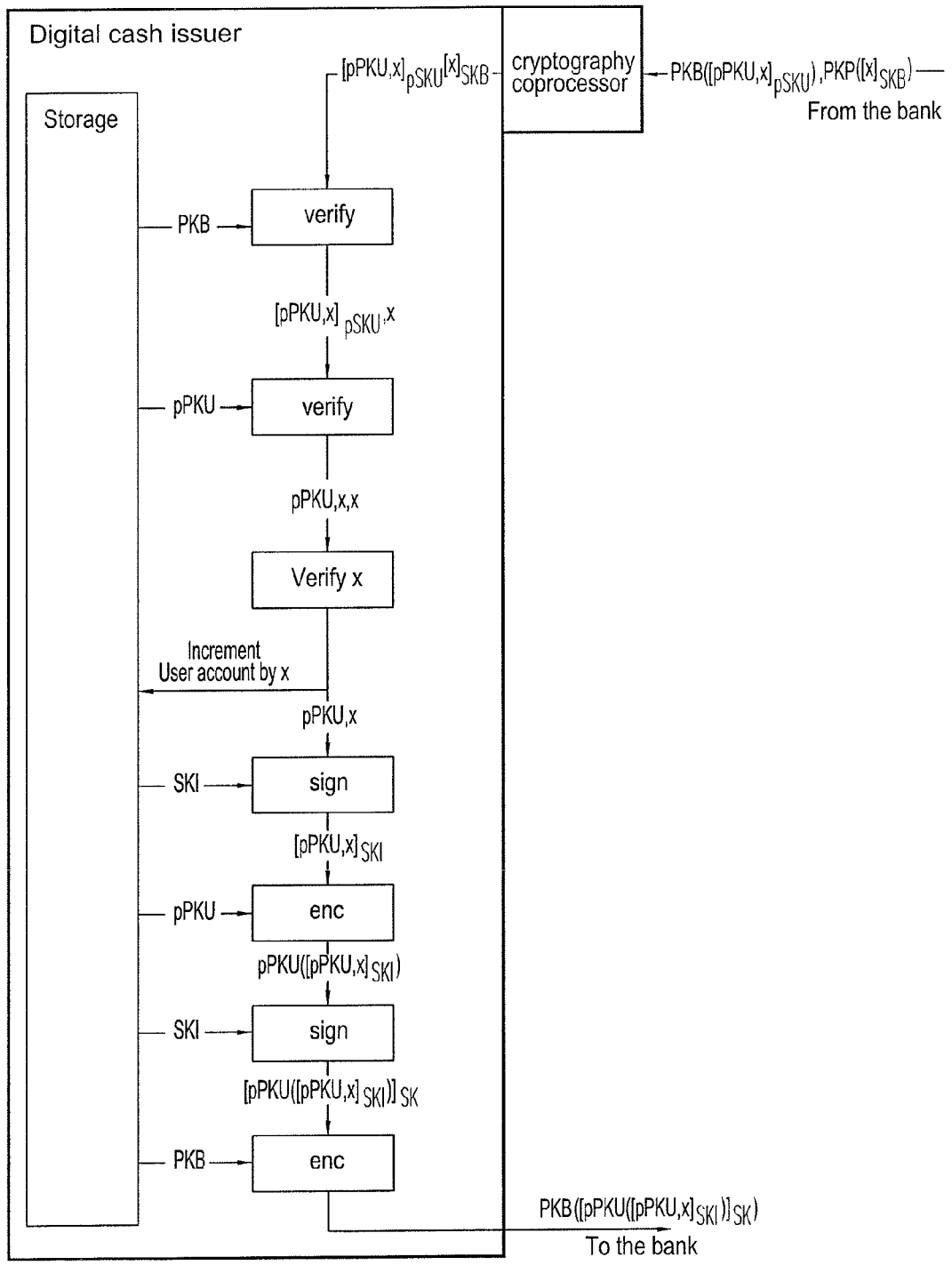
FIG. 21 is an exemplary withdrawal process part 4 according to the third embodiment.

Referring to FIG. 21, the user's bank receives the information PKB([pPKU([pPKU,x]$_{SKI}$)]$_{SKI}$) and the decryption program decrypts the information using the user's bank secret key SKB. The signature verifying program verifies the digital cash issuer signature using the public key of the digital cash issuer PKI. If the signature is valid, pPKU([pPKU,x]$_{SKI}$) is sent to the user's station.

The user's station receives pPKU([pPKU,x]$_{SKI}$), then the decryption program decrypts the information using the user's pseudonym secret key. The signature verifying program verifies the validity of the digital cash issuer signature with the digital cash issuer's public key PKI. If the signature is valid, the cumulative amount of digital cash is incremented by the amount of digital cash x. The new cumulative amount of digital cash is stored in the storage device by the user's station.

Figure 22:
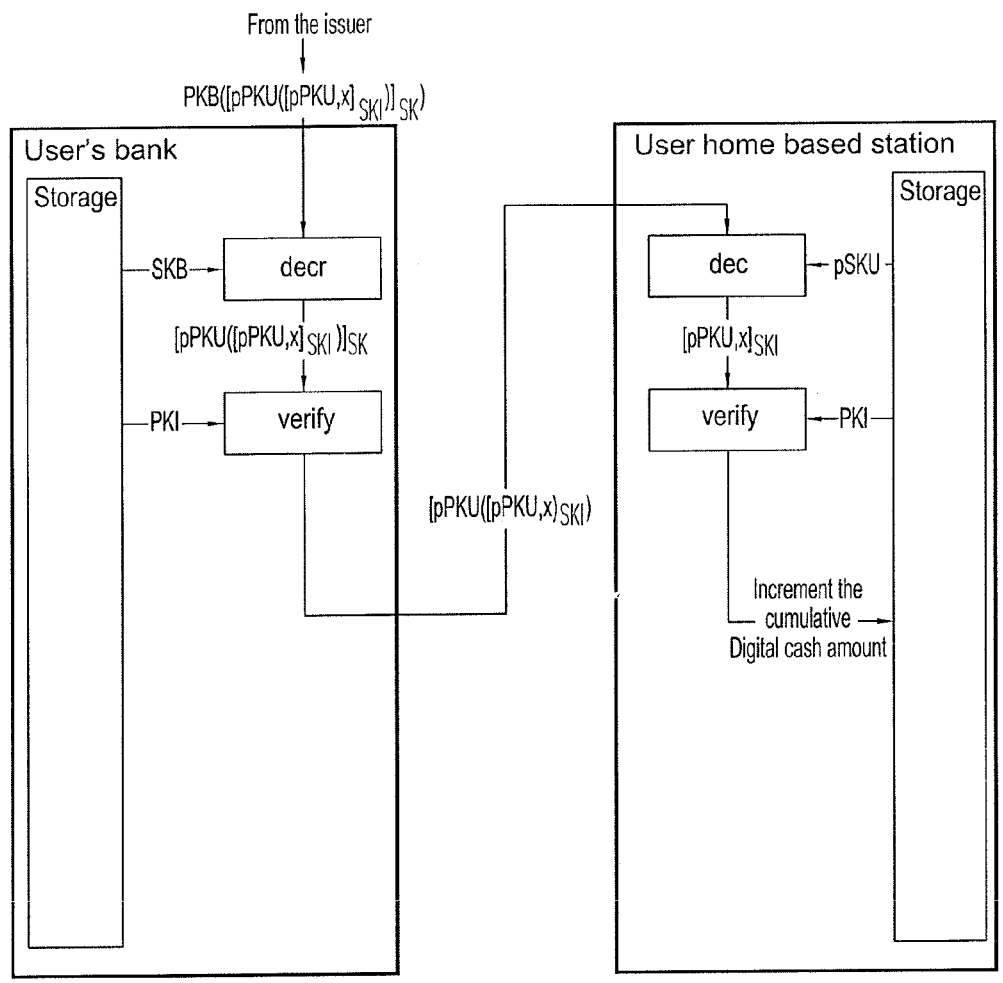
FIG. 22 is an exemplary withdrawal process part 5 according to the third embodiment.

Referring to FIG. 22, the user's station encryption program encrypts the value of the new cumulative amount of digital cash x and the user's pseudonym public key pPKU using the mobile/home shared secret key MHS and sends MHS(pPKU, x) to the user's mobile device via a communications path.

The user's mobile device receives the encrypted value of the new cumulative amount of digital cash and the user's pseudonym public key MHS(pPKU,x) and the decryption program decrypts the information by using the mobile/home shared secret key MHS. If the decrypted key matches the user's pseudonym public key, the user stores the new cumulative amount of digital cash in the storage device of the user's mobile device.

(3) Payment Procedure

Figure 23:
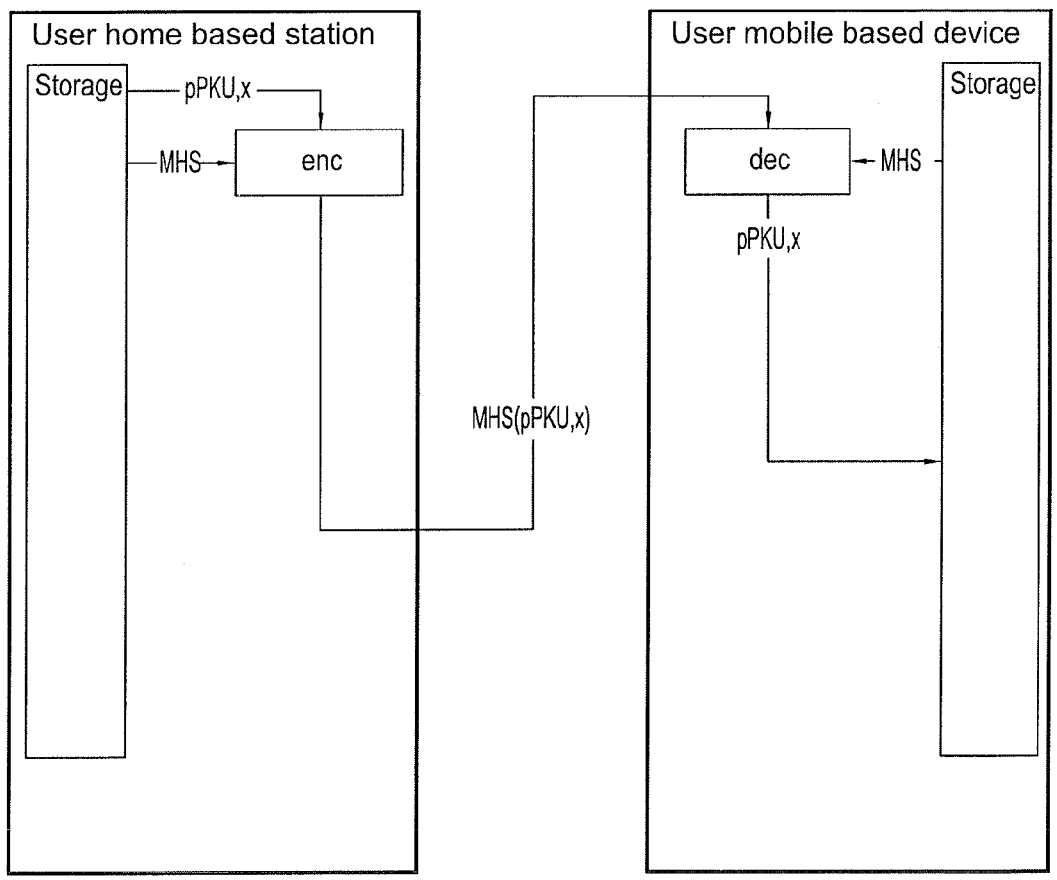
FIG. 23 is an exemplary payment protocol according to the third embodiment.

FIG. 23 show the diagrammatic representation of the payment protocol, and FIGS. 24-27 show parts 1-4 of the payment process.

Figure 24:
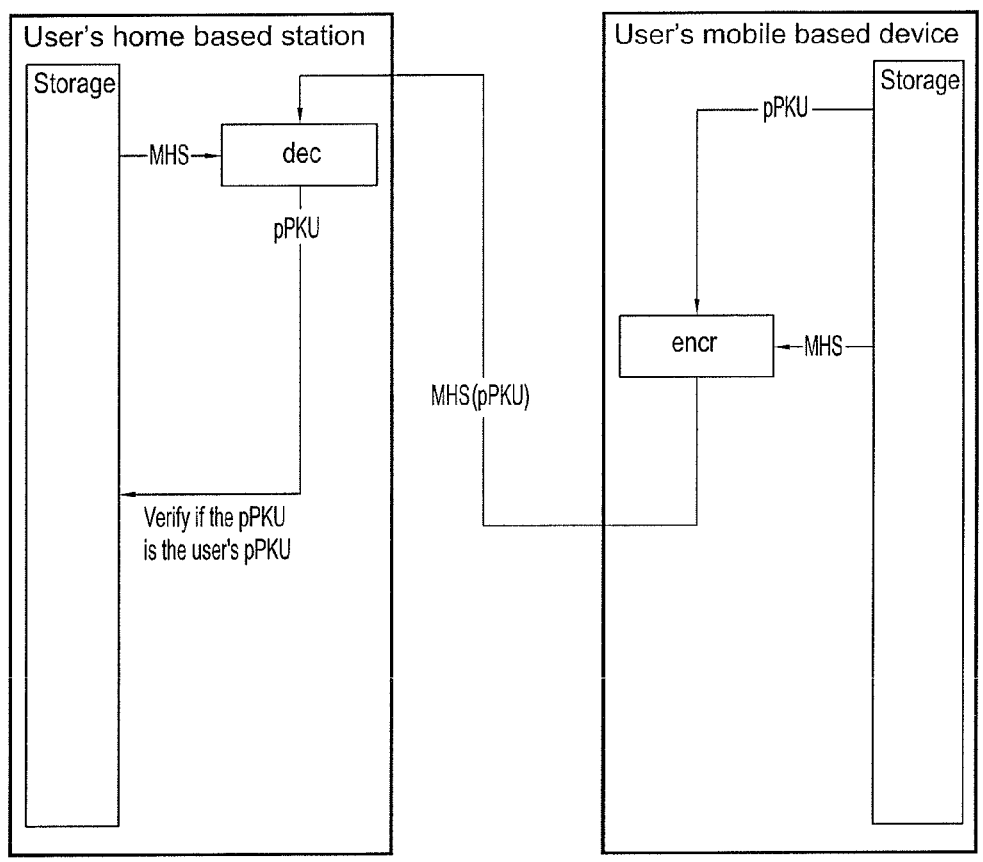
FIG. 24 is an exemplary payment process part 1 according to the third embodiment.

Referring to FIG. 24, the user's mobile device encrypts the user's pseudonym public key pPKU by encryption program using the mobile-home based shared secret key MHS and sends MHS(pPKU) to the user's home based station via a communications path.

The user station receives MHS(pPKU) and the decryption program decrypts the information using the mobile/home shared secret key MHS. The user station determined if the decrypted key matches the user's pseudonym public key to authenticate the user's mobile device.

Figure 25:
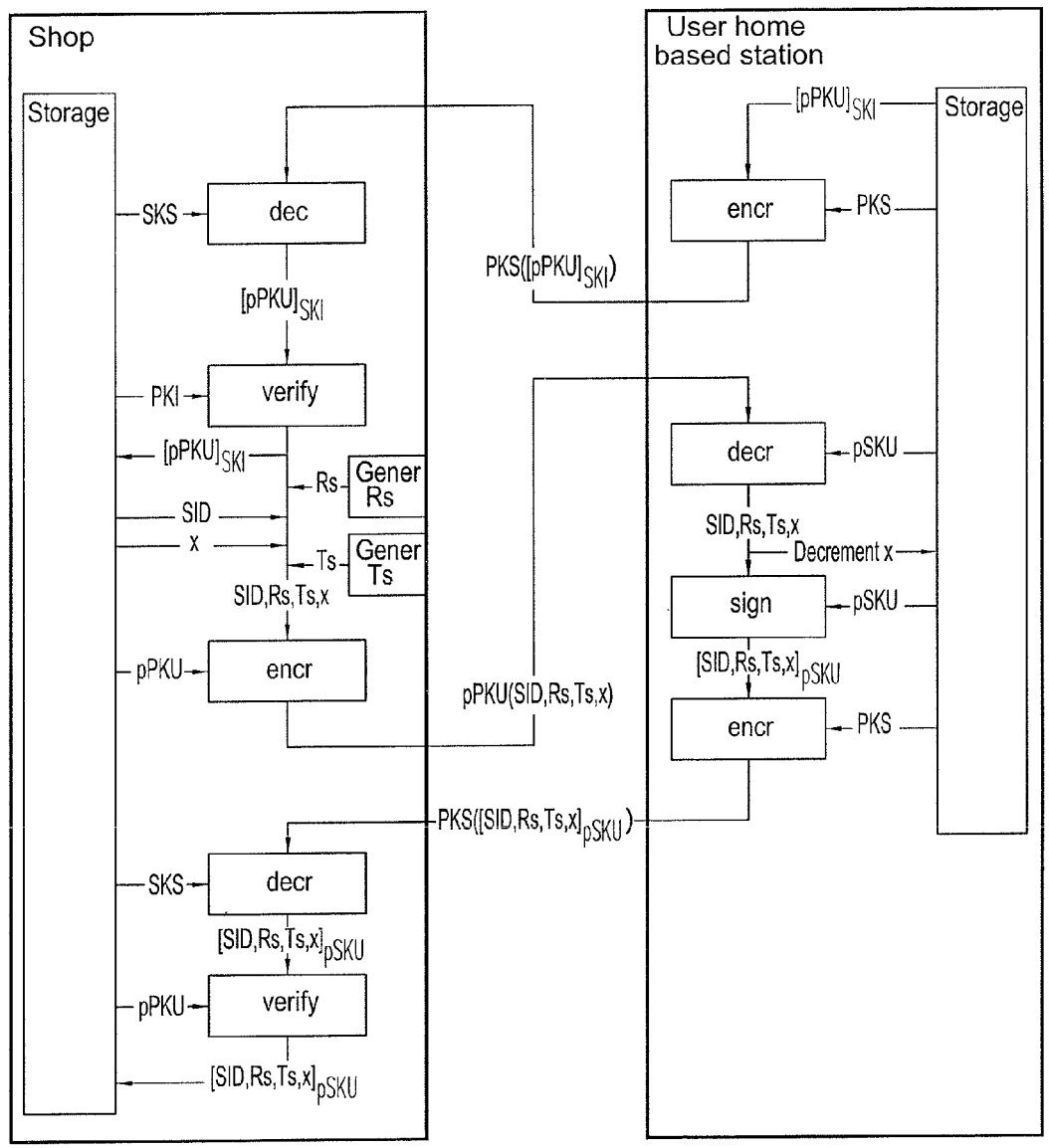
FIG. 25 is an exemplary payment process part 2 according to the third embodiment.

Referring to FIG. 25, the user station encryption program encrypts the digital cash issuer license $[pPKU]_{SKI}$ using the public key of the shop PKS and sends it via a communications path to the shop as request for payment.

The shop decryption program decrypts the encrypted the digital cash issuer license PKS($[pPKU]_{SKI}$) using the shop's secret key SKS. The signature verifying program verifies the signature of the issuer with the digital cash issuer public key PKI. If the signature is valid, the shop stores the user's digital cash issuer license. The random number generating program generates a random number Rs. The time generating program generates the time Ts. The encryption program encrypts the shop identification SID, Rs, Ts, and the price of payment x using the user's pseudonym public key pPKU and sends pPKU(SID,Rs,Ts,x) to the user station via a communications path.

The user station receives pPKU(SID,Rs,Ts,x) and the decryption program decrypts the information using the user's pseudonym secret key pSKU and decrements the cumulative amount of digital cash in the user's storage device by x. Then signature generating program signs the shop identification SID, the random number Rs, the time Ts, and the price of payment x using the user's pseudonym secret key pSKU. The encryption program encrypts the information using the public key of the shop PKS and sends the information PKS($[SID,Rs,Ts,x]_{pSKU}$) to the shop via a communications path.

The shop receives the information PKS($[SID,Rs,Ts,x]_{pSKU}$) and the decryption program decrypts the information using the shop's secret key SKS. The signature verifying program verifies the signature using the user's pseudonym public key pPKU. If the signature is valid, the shop stores the challenge and the shop regards the payment as valid.

Figure 26:
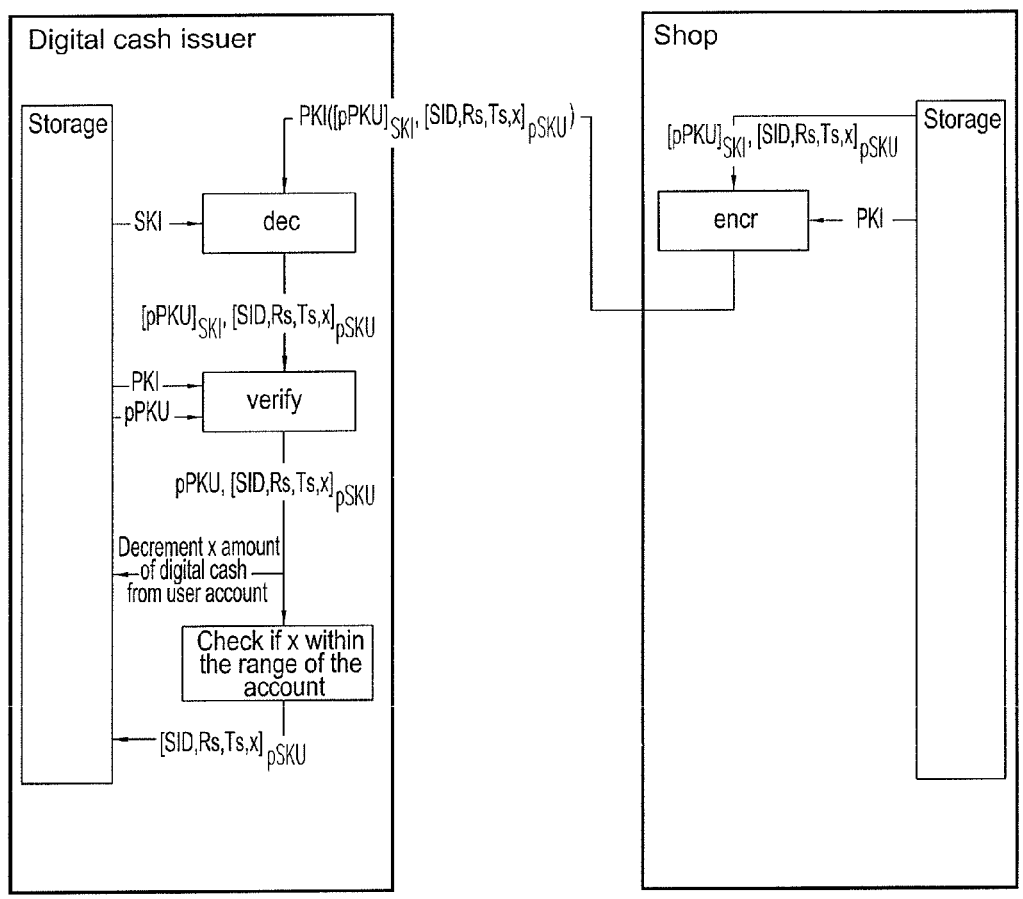
FIG. 26 is an exemplary payment process part 3 according to the third embodiment.

Referring to FIG. 26, after a period of time the shop encryption program encrypts the information that contains the challenge that was signed by the user $[SID,Rs,Ts,x]_{pSKU}$, and the user's digital cash issuer license $[pPKU]_{SKI}$ using the public key of the digital cash issuer PKI and sends the information to the digital cash issuer via a communications path.

The digital cash issuer decryption program decrypts PKI($[SID,Rs,Ts,x]_{pSKU}$, $[pPKU]_{SKI}$) using the digital cash issuer's secret key SKI and verifies the signature the signature verifying program using the digital cash issuer's public key PKI and the user's pseudonym public key pPKU. If the signatures are valid, the issuer decrements the user virtual account by the amount of the payment x. If the digital cash issuer determines that the user spends more than the amount in the virtual account, the real identity of the user is revealed by sending the user's pseudonym public key pPKU to the certificate authority. If not, the digital cash issuer stores the challenge $[SID,Rs,Ts,x]_{pSKU}$ in the storage device.

Figure 27:
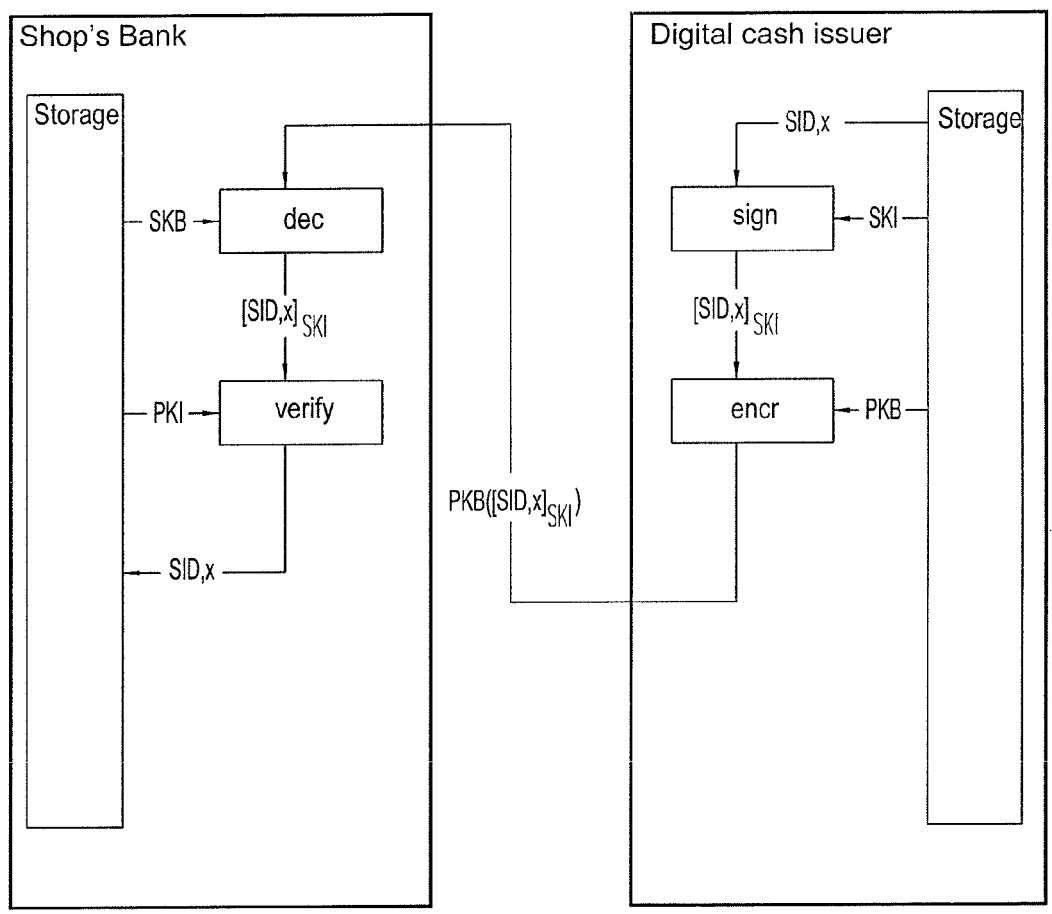
FIG. 27 is an exemplary payment process part 4 according to the third embodiment.

Referring to FIG. 27, the digital cash issuer signature generating program signs the shop identification SID, and the amount x to be deposited for the shop with the digital cash issuer's secret key SKI. The encryption program encrypts the information using the public key of the shop's bank PKB and sends PKB($[SID,x]_{SKI}$) to the shop's bank via a communications path.

The shop's bank receives PKB($[SID,x]_{SKI}$) and the decryption program decrypts the information using the secret key SKB. The signature verifying program verifies the signature with the public key of the issuer PKI. If the signature is valid, the shop's bank adds the amount of money x to the shop's account.

Fourth Embodiment

In the previous embodiments described above public key encryption is used. Public key encryption adds a cost in power and time used to complete a transaction. Therefore, a shared secret key may be used in place of the public key to hide the pseudonym and the amount of the digital cash as described in the following example. In this example, the certificate authority, bank, and user are as described above; however, in addition to the elements described above, the issuer further includes a key pointer KPr generating program.

(1) User Registration Procedure

Figure 28:
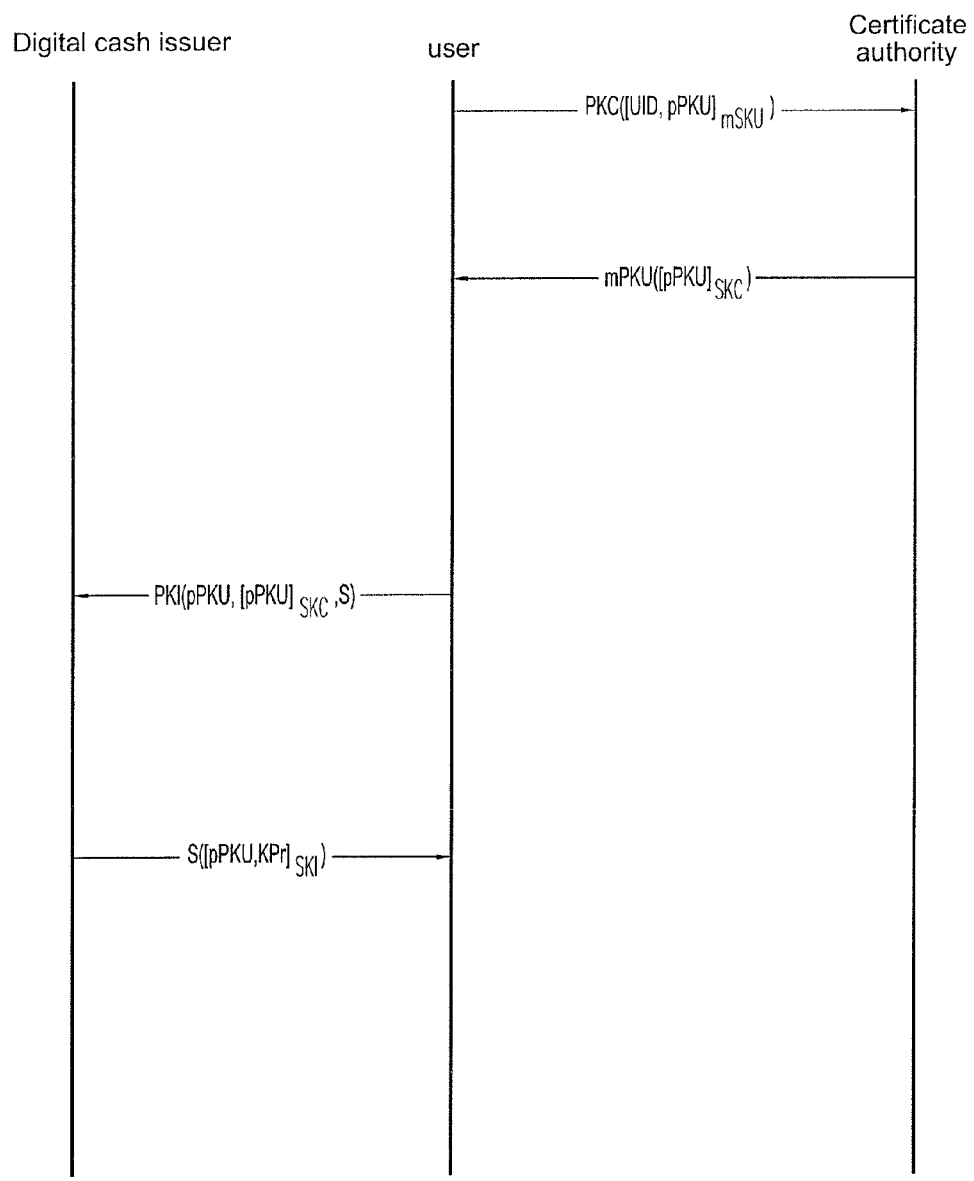
FIG. 28 is an exemplary user registration Protocol according to the fourth embodiment.
Figure 29:
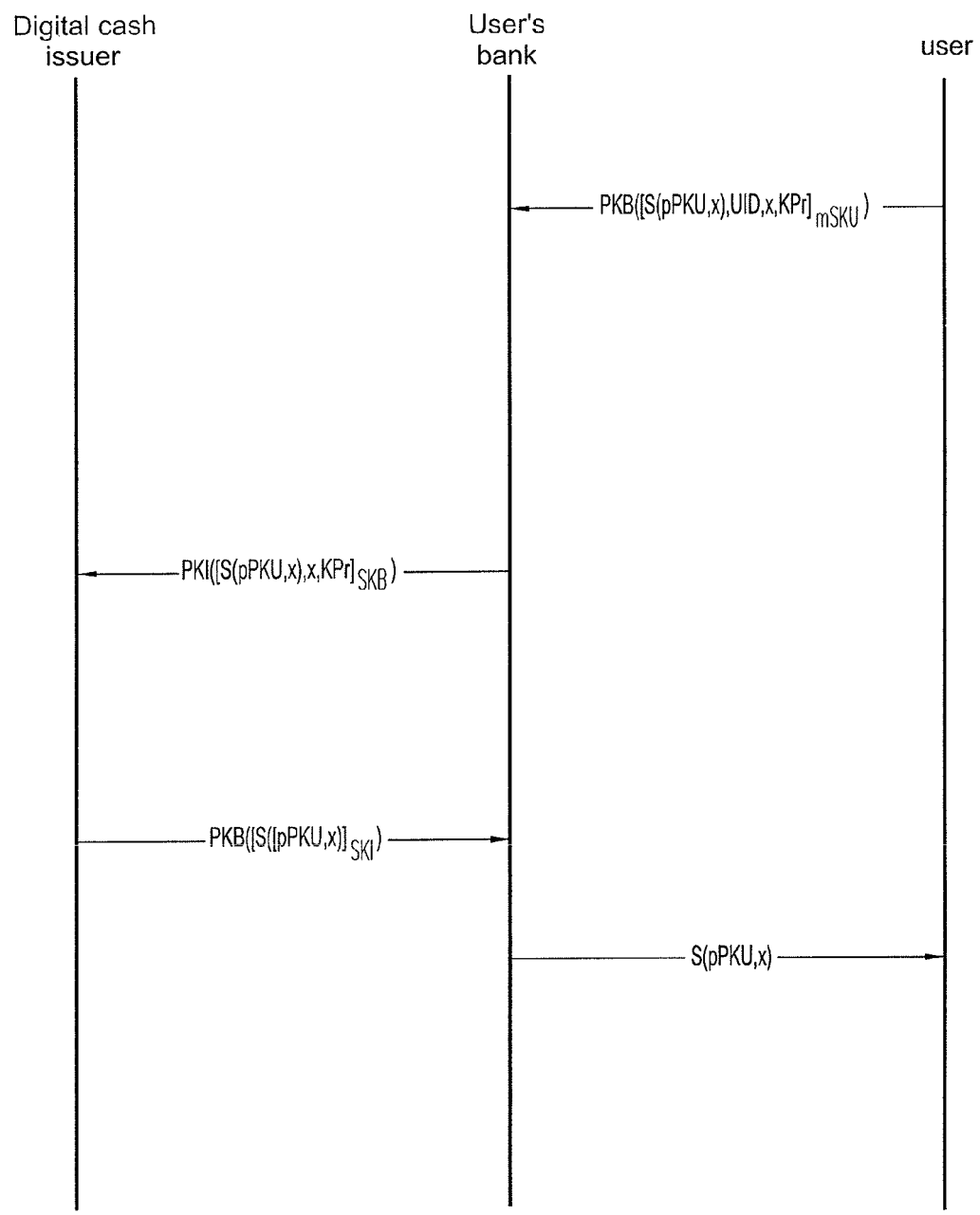
FIG. 29 is an exemplary user registration process part 1 according to the fourth embodiment.
Figure 30:
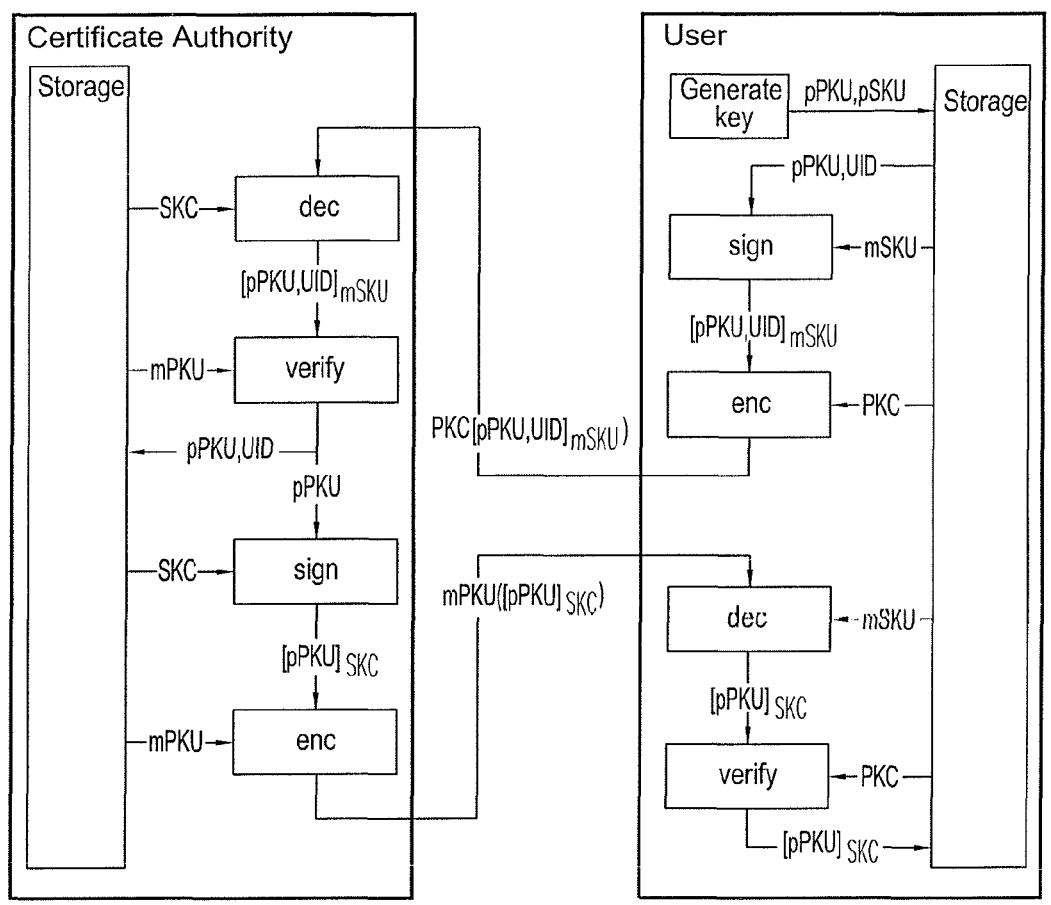
FIG. 30 is an exemplary user registration process part 2 according to the fourth embodiment.

FIG. 28 show the diagrammatic representation of the registration protocol, and FIGS. 29 and 30 show parts 1 and 2 of the registration process. Referring to FIGS. 28 and 29, the user the key generating program generates a pseudonym public key and a pseudonym secret key. The signature generating program signs the pseudonym public key and the user real identification using user's master secret key. The encryption program encrypts $[UID,pPKU]_{mSKU}$ using the public key of the certificate authority and sends PKC($[UID,pPKU]_{mSKU}$) to the certificate authority as a request for a certified pseudonym public key (i.e., a request for the issuance of a license).

The certificate authority receives the request (PKC($[UID, pPKU]_{mSKU}$)) and the decryption program decrypts the request using the secret key of the certificate authority SKC. The signature verifying program verifies the validity of the user signature using the user's master public key mPKU. If the signature is valid, the certificate authority the signature generating program generates a signature (i.e., a license) $[pPKU]_{SKC}$ for the user's pseudonym public key using the certificate authority's secret key SKC, and stores the user's pseudonym public key in the storage device in connection with the user's master public key mPKU and the user's real identification UID. The certificate authority encryption program encrypts the license $[pPKU]_{SKC}$ using the user's master public key mPKU and sends mPKU($[pPKU]_{SKC}$) to the user via a communications path.

The user receives the encrypted license mPKU ($[pPKU]_{SKC}$) and the decryption program decrypts the license using the user's master secret key mSKU. The signature verifying program verifies the validity of the license $[pPKU]_{SKC}$ using the public key of the certificate authority PKC. If the signature is valid, the user key generating program establishes a user-issuer shared secret key S and stores the license and the user-issuer shared secret key in the user storage device.

Referring to FIG. 30, the user encryption program encrypts the license $[pPKU]_{SKC}$, pseudonym public key pPKU, and the user-issuer shared secret key S using the public key of the digital cash issuer PKI. The user then sends PKI($[pPKU]_{SKC}$, pPKU,S) to the digital cash issuer via a communications path.

The digital cash issuer receives PKI($[pPKU]_{SKC}$,pPKU,S) and the decryption program decrypts the information using the secret key of the digital cash issuer SKI. The digital cash issuer searches for pPKU in its storage device to prevent misuse of other users' pseudonym public key. If the user's pseudonym public key pPKU is not already registered, the digital cash issuer signature verifying program verifies the validity of the license $[pPKU]_{SKC}$ using the certificate authority's public key PKC. If the license valid, the digital cash issuer assigns an empty storage space to the user and generates a key pointer KPr to identify the user-issuer shared secret key S. In addition, the cash issuer also stores the user's pseudonym public key pPKU, the user-issuer shared secret key S and the key pointer KPr in the storage device. The digital cash issuer signature generating program signs the user's pseudonym public key pPKU and the key pointer KPr using the secret key of the issuer SKI. The encryption program encrypts the information using the user-issuer shared secret key S and sends S([pPKU, KPr]$_{SKI}$) as an acknowledgment to the user via a communications path.

The user receives the acknowledgement S([pPKU, KPr]$_{SKI}$), and the decryption program decrypts the information using the user-issuer shared secret key S. The signature verifying program verifies the validity of the digital cash issuer signature using the digital cash issuer's public key PKI. If the signature valid, the digital cash issuer stores the license [pPKU]$_{SKI}$ and the key pointer KPr in the storage device. According to this example, the user may obtain an unlimited number of certified pseudonym public keys.

(2) Withdrawal Procedure (Electronic Cash Issuing Procedure)

Figure 31:
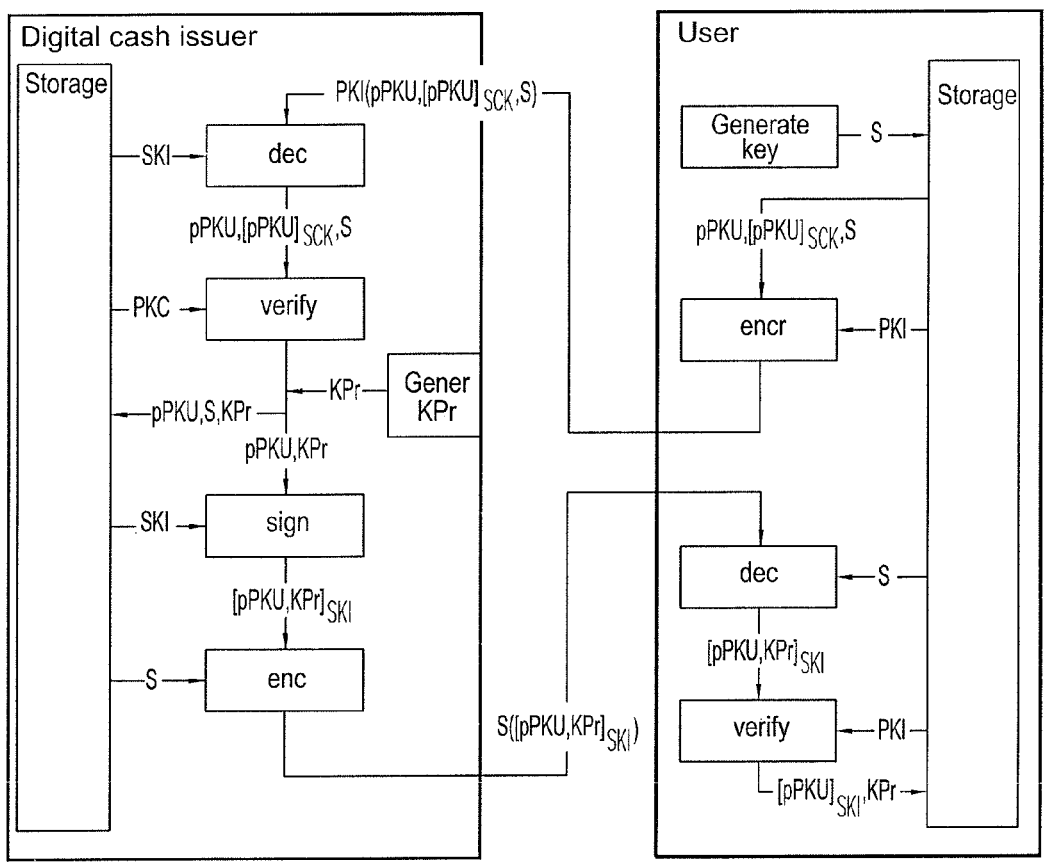
FIG. 31 is an exemplary withdrawal protocol according to the fourth embodiment.
Figure 32:
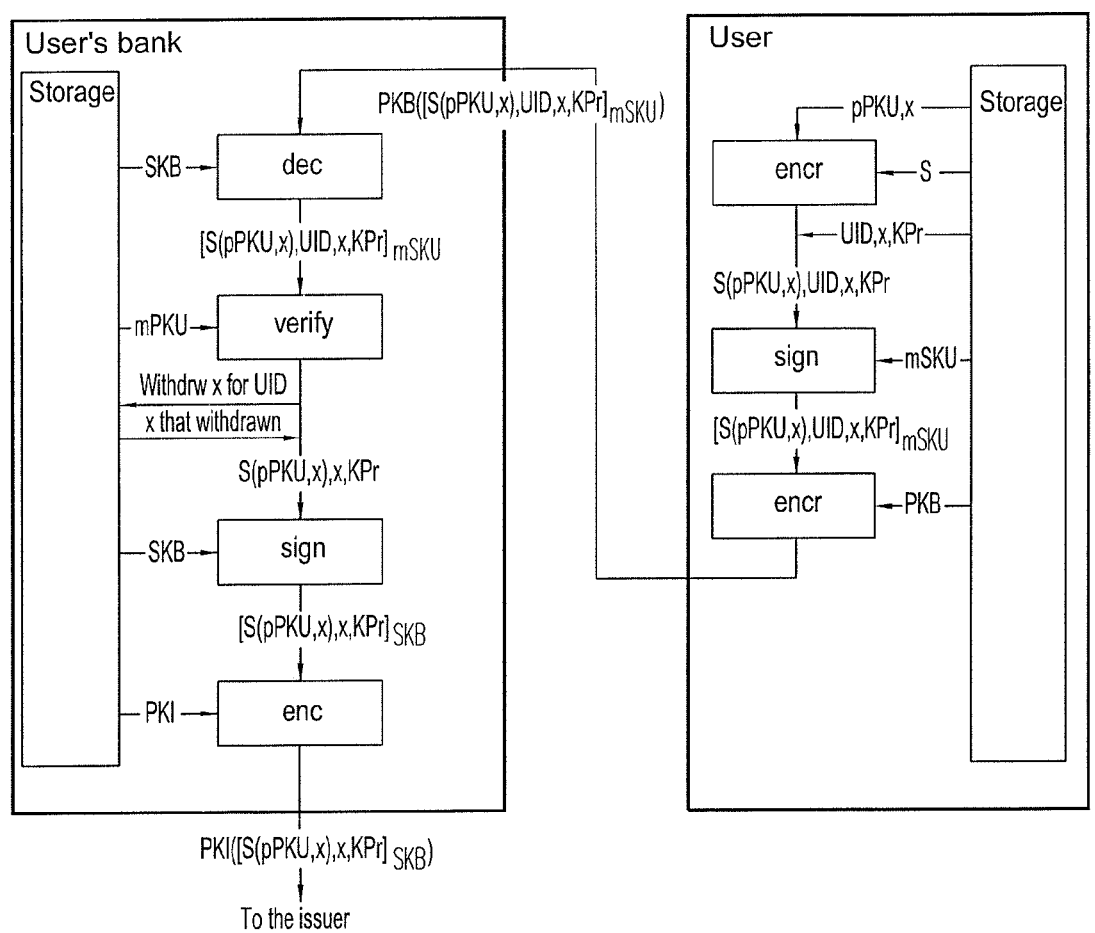
FIG. 32 is an exemplary withdrawal process part 1 according to the fourth embodiment.
Figure 33:
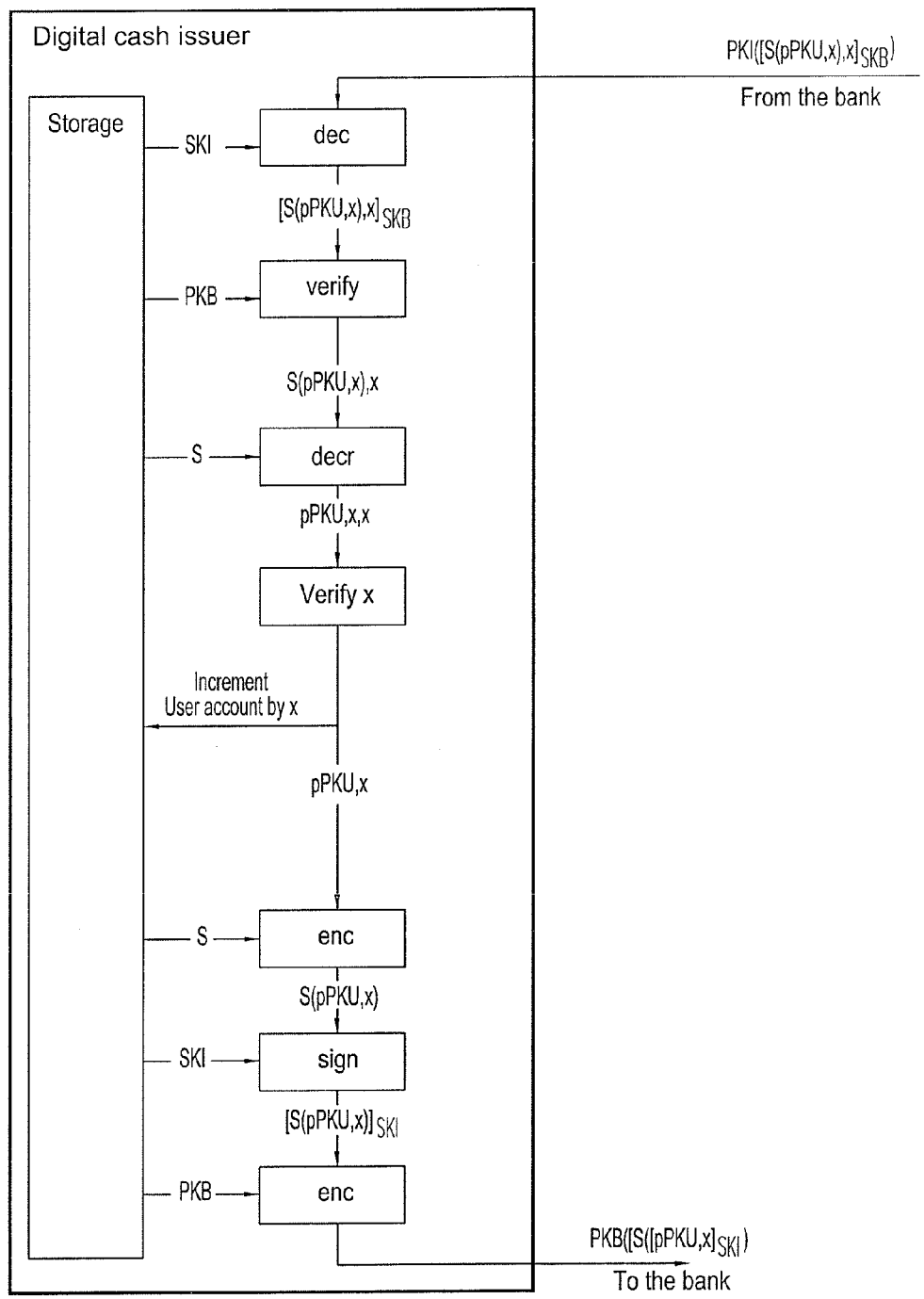
FIG. 33 is an exemplary withdrawal process part 2 according to the fourth embodiment.
Figure 34:
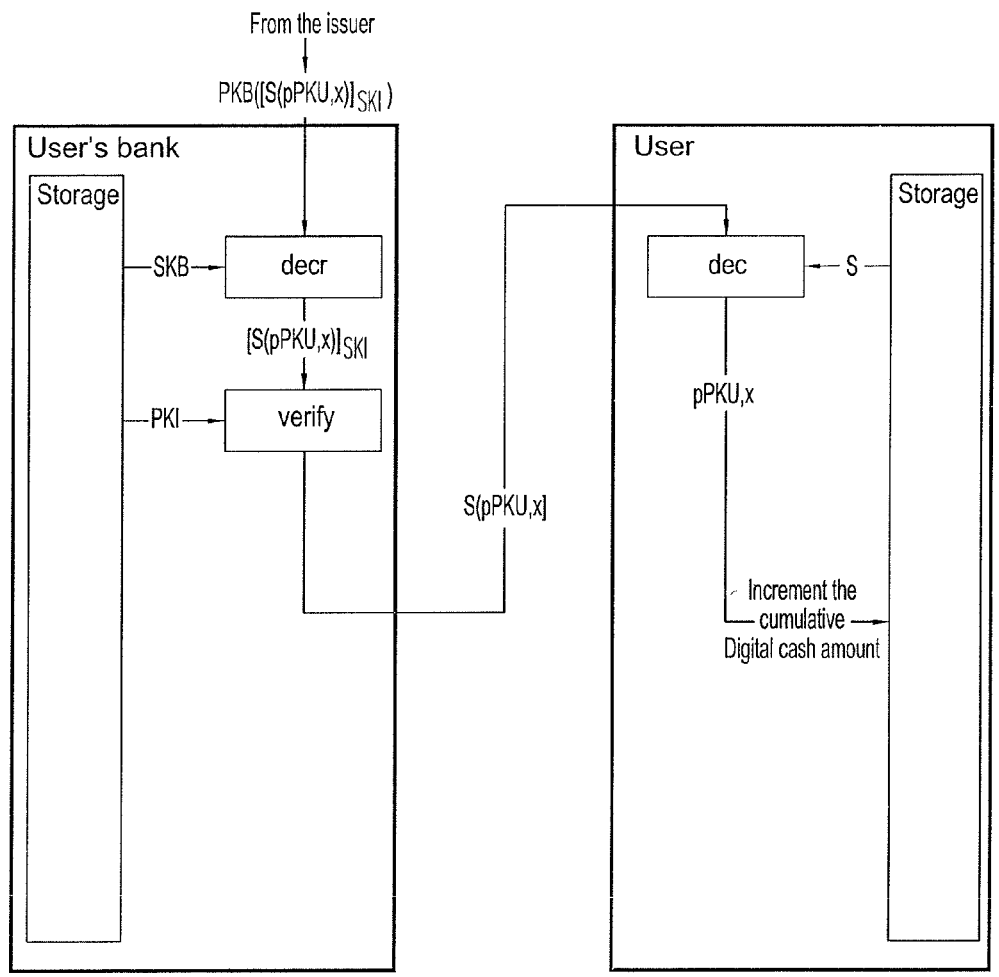
FIG. 34 is an exemplary withdrawal process part 3 according to the fourth embodiment.

FIG. 31 shows the diagrammatic representation of the withdrawal protocol, and FIGS. 32-34 show parts 1-3 of the withdrawal process. Referring to FIGS. 31 and 32, the user encryption program encrypts the user's pseudonym public key pPKU and the amount of digital cash x using the user-issuer shared secret key S. The signature generating program signs the user real identification UID, the amount of money to be withdrawn x, the encrypted user's pseudonym public key, the amount of digital cash S(pPKU,x), and the key pointer KPr using the user's master secret key mSKU. The encryption program encrypts the information using the public key of the user's bank PKB and sends PKB([(pPKU,x),UID,x,KPr]$_{mSKU}$) to the user's bank via a communications path.

The user's bank decryption program decrypts PKB([S(pPKU,x),UID,x,KPr]$_{mSKU}$) using the user's bank's secret key. The signature verifying program verifies the validity of the signature for authentication with the master public key of the user mPKU. If the signature is valid, the amount of money x is withdrawn from the user account, and the signature generating program signs the encrypted user's pseudonym public key, the amount of digital cash S(pPKU,x), the key pointer KPr, and the withdrawn amount of money x using the bank's secret key SKB. The encryption program encrypts the information using the public key of the digital cash issuer PKI and sends (PKI([S(pPKU,x),KPr,x]$_{SKB}$) to the digital cash issuer via a communications path.

Referring to FIG. 33, the digital cash issuer receives PKI([(pPKU,x),KPr,x]$_{SKB}$), and the decryption program decrypts the information using the digital cash issuer's secret key SKI. The signature verifying program verifies the signature of the bank using the public key of the user's bank PKB. If the signature is valid, the digital cash issuer uses the key pointer KPr to search for the user-issuer shared secret key S. Once found the decryption program decrypts S(pPKU,x) using the user-issuer shared secret key S to authenticate the user by matching the user's pseudonym public key after the decryption. If the decrypted key matches the user's pseudonym key, the use is authenticated. The issuer verifies that the two amounts x are equal. If the amounts are not equal, the real identity of the user is revealed by sending pPKU to the certificate authority. If the amounts are equal, the digital cash issuer increments the user's virtual account by the amount of digital cash x. The encryption program encrypts the pseudonym public key pPKU and digital cash amount x using the user-issuer shared secret key S. The signature generating program signs the S(pPKU,x) using the digital cash issuer's secret key SKI. The encryption program encrypts [S(pPKU, x)]$_{SKI}$ using the public key of the bank PKB and sends PKB([S(pPKU,x)]$_{SKI}$) to the user's bank via a communications path.

Referring to FIG. 34, the user's bank receives the information PKB(S(pPKU,x)]$_{SKI}$), and the decryption program decrypts the information using the user's bank secret key SKB. The signature verifying program verifies the digital cash issuer signature using the public key of the digital cash issuer PKI. If the signature is valid, S(pPKU,x) is sent to the user via a communications path.

The user receives S(pPKU,x), and the decryption program decrypts the information using the user-issuer shared secret key S to authenticate the digital cash issuer by matching the user's pseudonym public key after the decryption. If the decrypted key matches the pseudonym public key, the digital cash issuer is authenticated, the cumulative amount of digital cash is incremented by the amount of digital cash x, and the new cumulative amount of digital cash is stored in the storage device by the user.

(3) Payment Procedure

The payment procedure is the same as that described above for FIGS. 9-12.

Fifth Embodiment

The previous embodiment employs a common key pointer between the digital cash issuer and the bank to provide an means to link the user's real identification and the user's pseudonym public key. In the following example, the digital cash issuer may use a cryptographic coprocessor to provide stronger protection of the user's privacy. In this implementation, the user encrypts the key pointer using the public key of cryptographic coprocessor. As a result, the bank may not obtain any data shared between the user's real identification and the user's pseudonym public key. In addition, the cryptographic coprocessor provides stronger encryption such that whenever the data is encrypted, the date may not be decrypted without the coprocessor.

(1) User Registration Procedure

The user registration procedure for this example is the same as described above for FIGS. 2, 3, and 4.

(2) Withdrawal Procedure (Electronic Cash Issuing Procedure)

Figure 35:
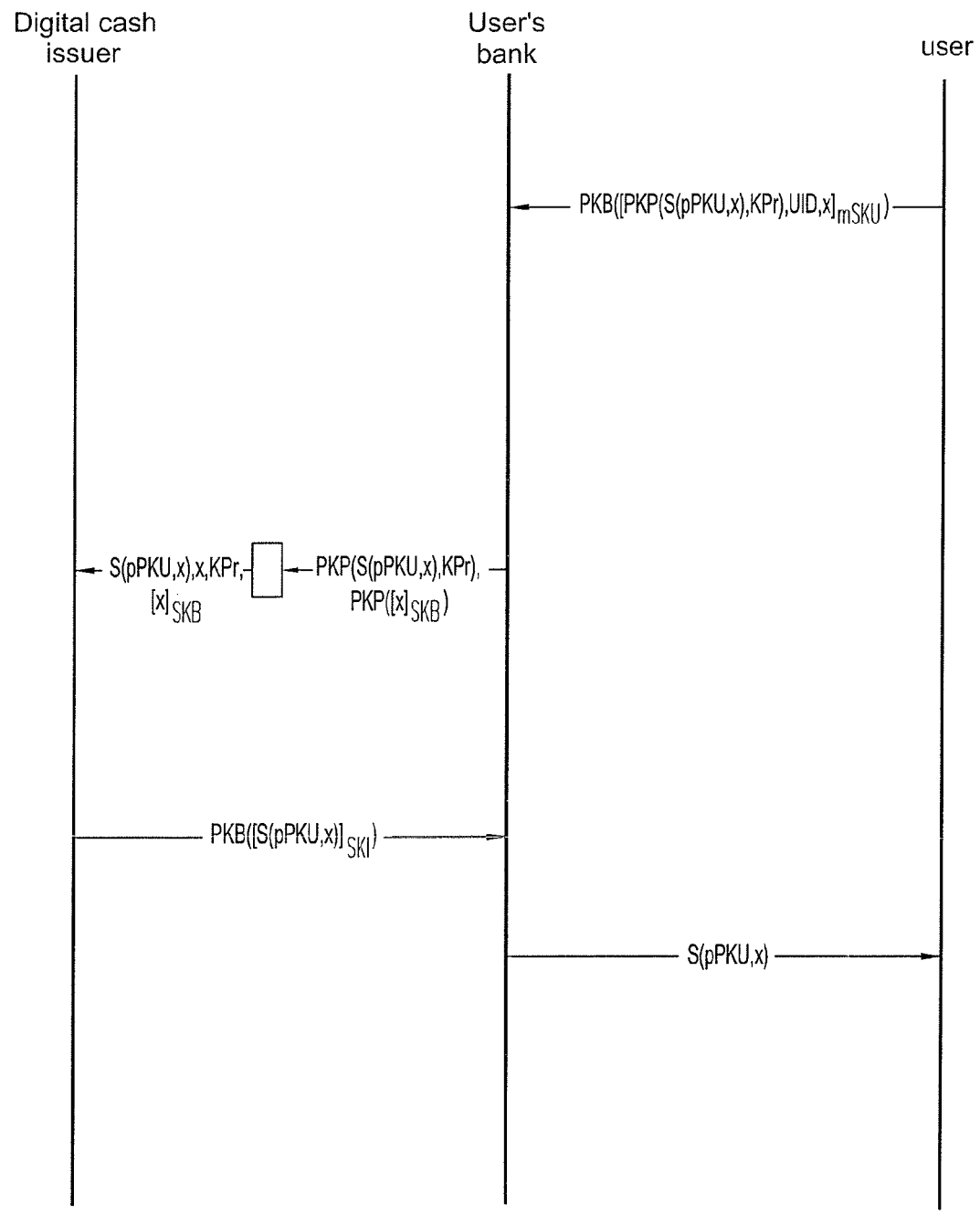
FIG. 35 is an exemplary withdrawal protocol according to the fifth embodiment.
Figure 36:
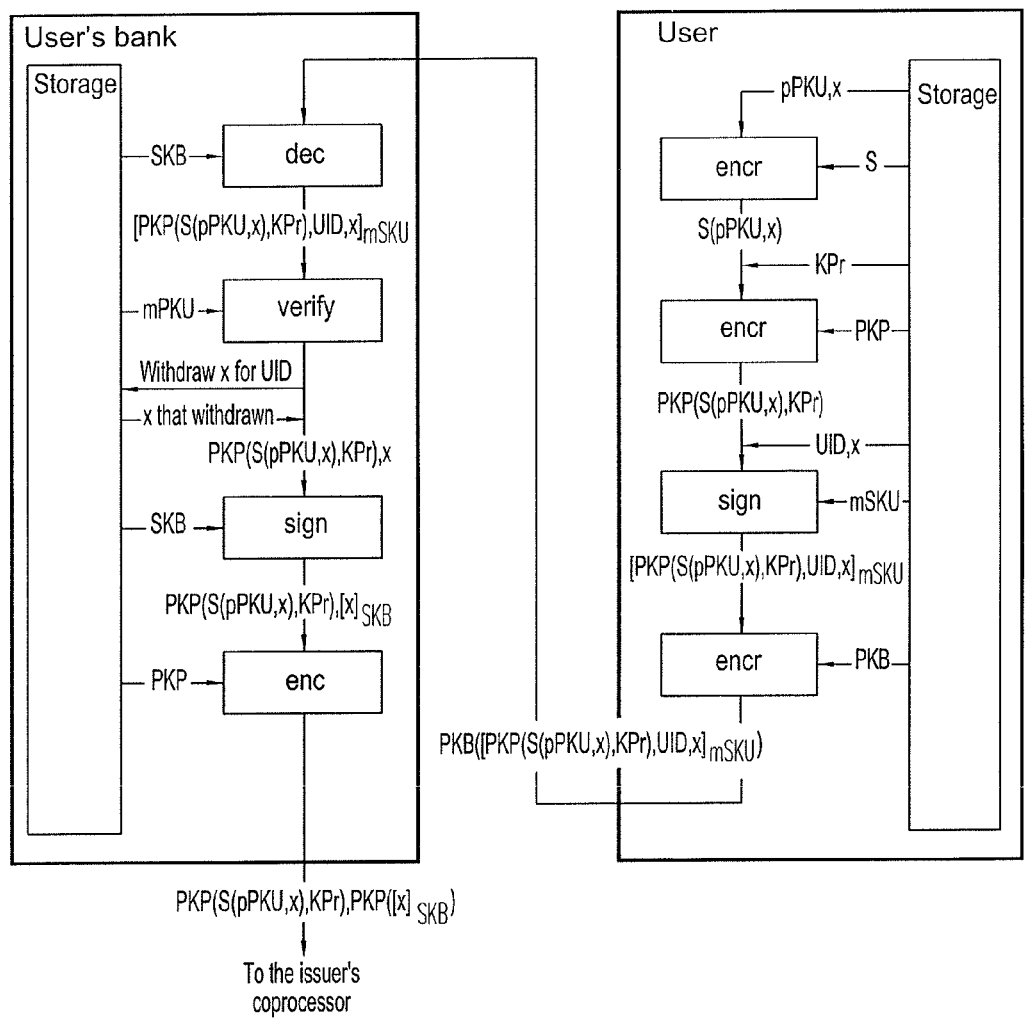
FIG. 36 is an exemplary withdrawal process part 1 according to the fifth embodiment.
Figure 37:
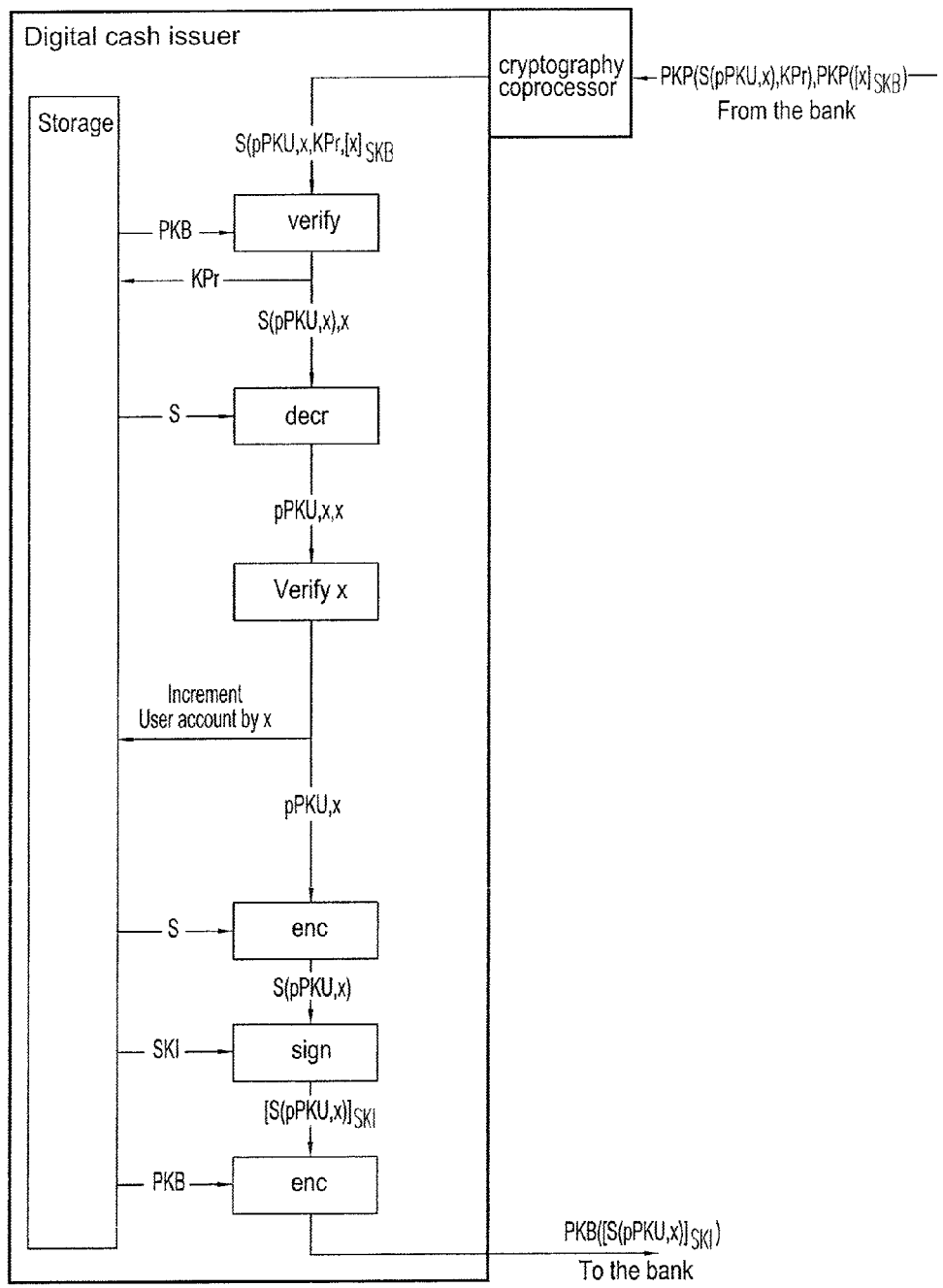
FIG. 37 is an exemplary withdrawal process part 2 according to the fifth embodiment.
Figure 38:
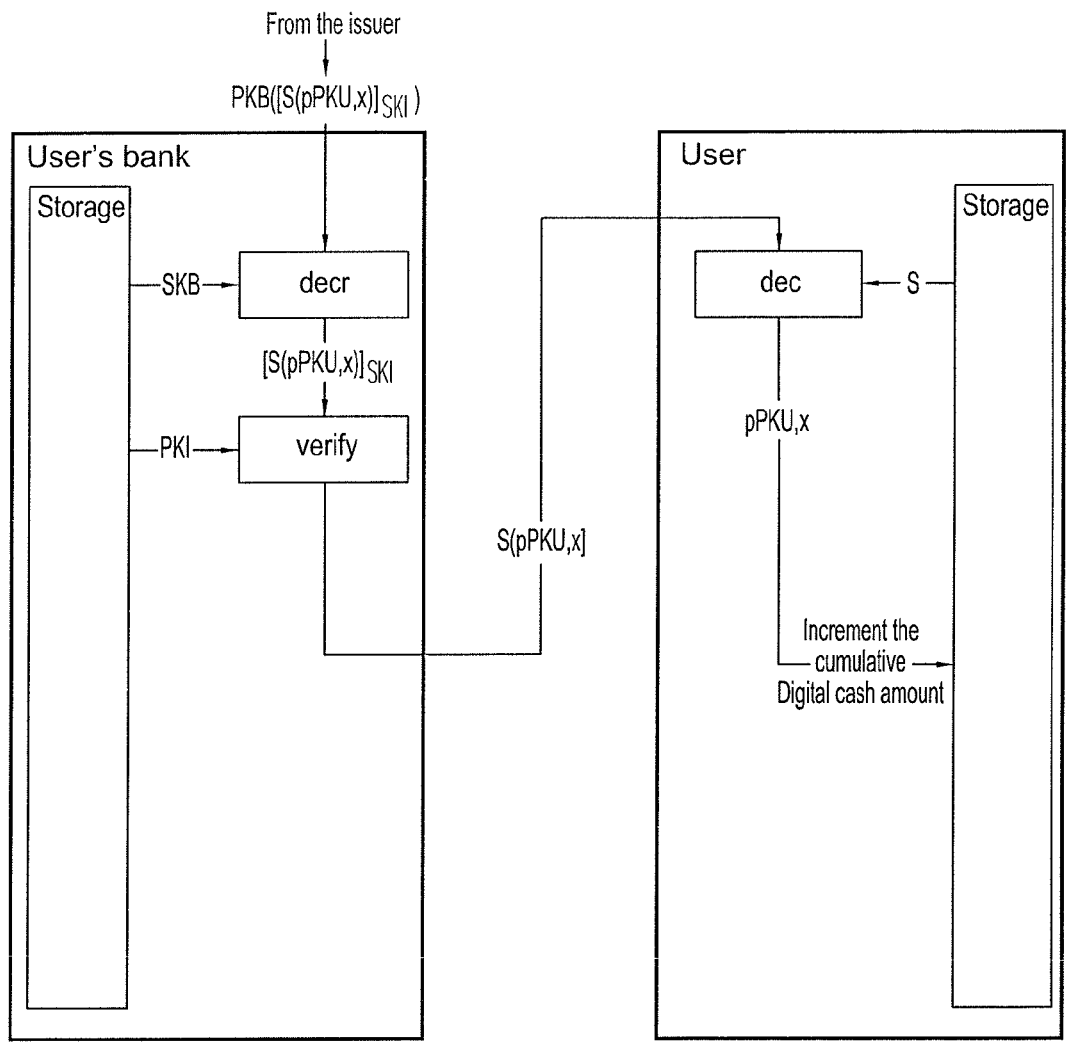
FIG. 38 is an exemplary withdrawal process part 3 according to the fifth embodiment.

FIG. 35 shows the diagrammatic representation of the withdrawal protocol, and FIGS. 36-38 show parts 1-3 of the withdrawal process. Referring to FIGS. 35 and 36, the user encryption program encrypts the user's pseudonym public key pPKU and the amount of digital cash x using the user-issuer shared secret key S. The encryption program encrypts the encrypted user's pseudonym public key, the amount of digital cash S(pPKU,x), and the key pointer KPr using the public key of a cryptographic coprocessor PKP. The signature generating program signs the user real identification UID, the amount of money to be withdrawn x, and PKP(S(pPKU,x), KPr) using the user's master secret key mSKU. The encryption program encrypts the information using the public key of the user's bank PKB and sends PKB([PKP(S(pPKU,x),KPr), UID,x]$_{mSKU}$) to the user's bank via a communications path.

The user's bank decryption program decrypts PKB([PKP(S(pPKU,x),KPr),UID,x]$_{mSKU}$) using the user's bank's secret key. The signature verifying program verifies the validity of the signature for authentication with the master public key of the user mPKU. If the signature is valid, the amount of money x is withdrawn from the user account. The signature generating program signs the amount x that is withdrawn from the user account by using the user's bank's secret key SKB. The encryption program encrypts $[x]_{SKB}$ using the public key of the cryptographic coprocessor PKP, and sends information PKP(S(pPKU,x),KPr) and PKP($[x]_{SKB}$) to the digital cash issuer via a communications path.

Referring to FIG. 37, the digital cash issuer receives PKP (S(pPKU,x),KPr) and PKP($[x]_{SKB}$), and decrypts the information using the secret key of the cryptographic coprocessor to obtain the encrypted user's pseudonym public key, the amount of digital cash S(pPKU,x), the key pointer KPr, and the signed amount of withdrawn money from the user account $[x]_{SKB}$. The signature verifying program verifies the signature of the bank using the public key of the user's bank PKB. If the signature is valid, the digital cash issuer searches for the user-issuer shared secret key S using the key pointer KPr. Once s is obtained, the decryption program decrypts S(pPKU,x) using the user-issuer shared secret key S to authenticate the user by matching decrypted key with the user's pseudonym public key. If the keys match, the user is authenticated, and the issuer verifies that the two amounts x are equal. If the amounts are not equal, the real identity of the user is revealed by sending pPKU to the certificate authority. If the amounts are equal, the digital cash issuer increments the user's virtual account by the amount of digital cash x. The encryption program encrypts the pseudonym public key pPKU, digital cash amount x using the user-issuer shared secret key S. The signature generating program signs S(pPKU,x) using the digital cash issuer's secret key SKI. The encryption program encrypts $[S(pPKU,x)]_{SKI}$ using the public key of the bank PKB and sends PKB($[S(pPKU,x)]_{SKI}$) to the user's bank via a communications path.

Referring to FIG. 38, the user's bank then receives the information PKB($[S(pPKU,x)]_{SKI}$) and the decryption program decrypts the information using the user's bank secret key SKB. The signature verifying program verifies the digital cash issuer signature using the public key of the digital cash issuer PKI. If the signature is valid, S(pPKU,x) is sent to the user via a communications path.

The user receives S(pPKU,x), and the decryption program decrypts the information using the user-issuer shared secret key S to authenticate the digital cash issuer by matching the decrypted key with the user's pseudonym public key. If the keys match, the digital cash issuer is authenticated, the cumulative amount of digital cash is incremented by the amount of digital cash x, and the new cumulative amount of digital cash is stored in the storage device by the user.

(3) Payment Procedure

The payment procedure is the same as that described above for FIGS. 9-12.

Sixth Embodiment

The following example provides the enhanced privacy and encryption of the previous example described above, in a mobile user device environment.

(1) User Registration Procedure

The user registration procedure is the same as that described above for FIGS. 28-30.

(2) Withdrawal Procedure (i.e., Electronic Cash Issuing Procedure)

Figure 39:
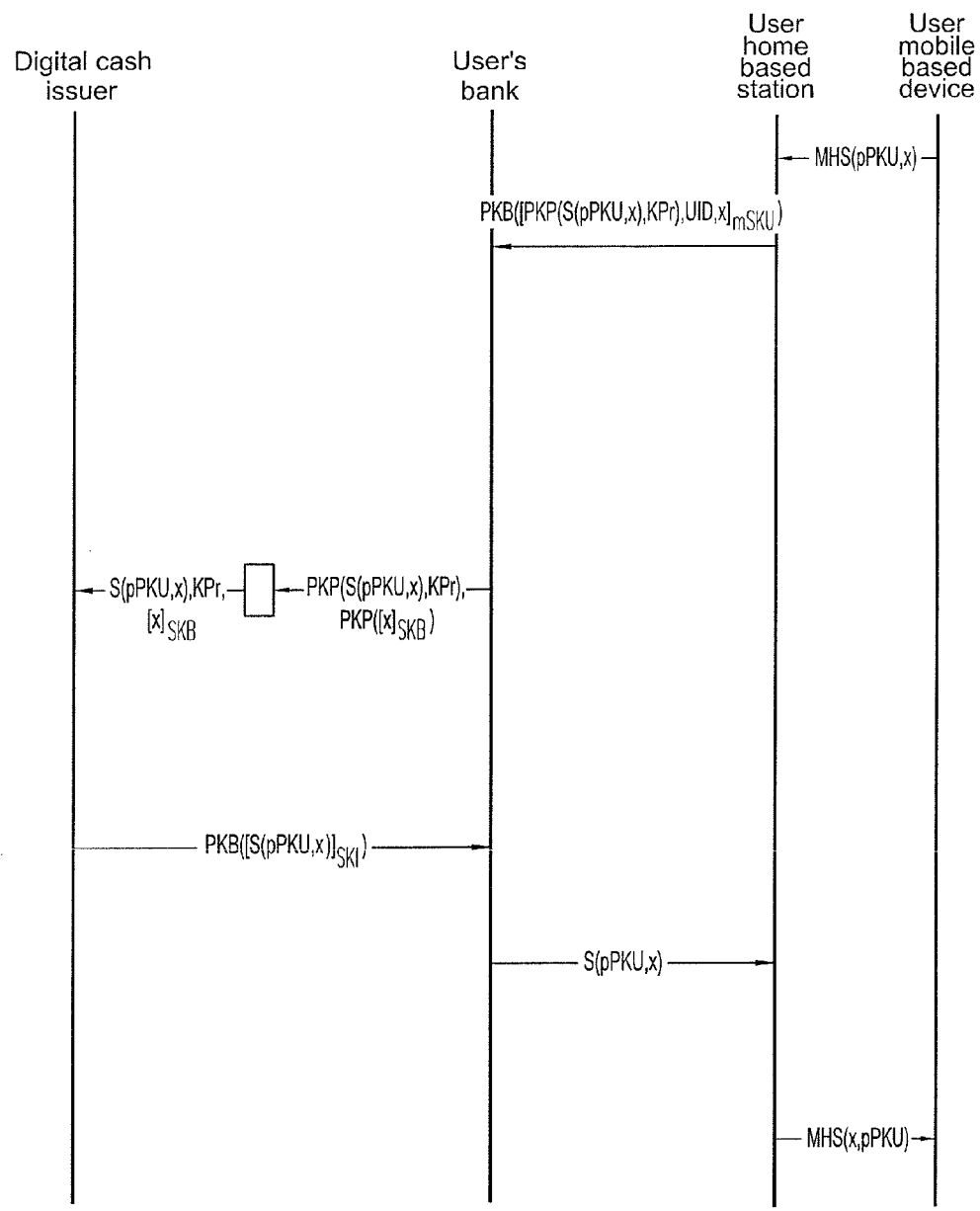
FIG. 39 is an exemplary withdrawal protocol according to the sixth embodiment.
Figure 40:
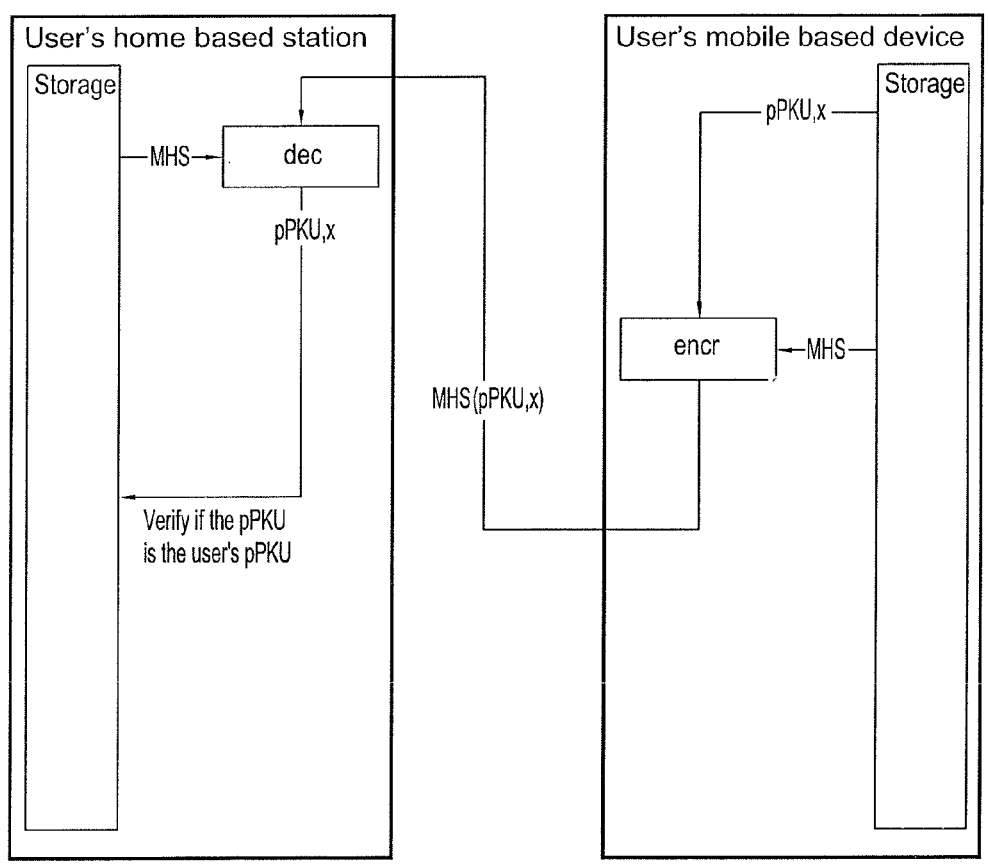
FIG. 40 is an exemplary withdrawal process part 1 according to the sixth embodiment.

FIG. 39 shows the diagrammatic representation of the withdrawal protocol, and FIGS. 40-44 show parts 1-5 of the withdrawal process. Referring to FIG. 40, the user's mobile device encryption program encrypts the user's pseudonym public key pPKU and the amount of digital cash x using the mobile/home shared secret key MHS and sends the information MHS(pPKU,x) to the user station via a communications path.

The user station receives the encrypted user's pseudonym public key and the amount of digital cash MHS(pPKU,x), and the decryption program decrypts the information using the mobile/home shared secret key MHS. The user station determines if the decrypted key matches the user's pseudonym public key. If the keys match, the user's mobile device is authenticated by the user station.

Figure 41:
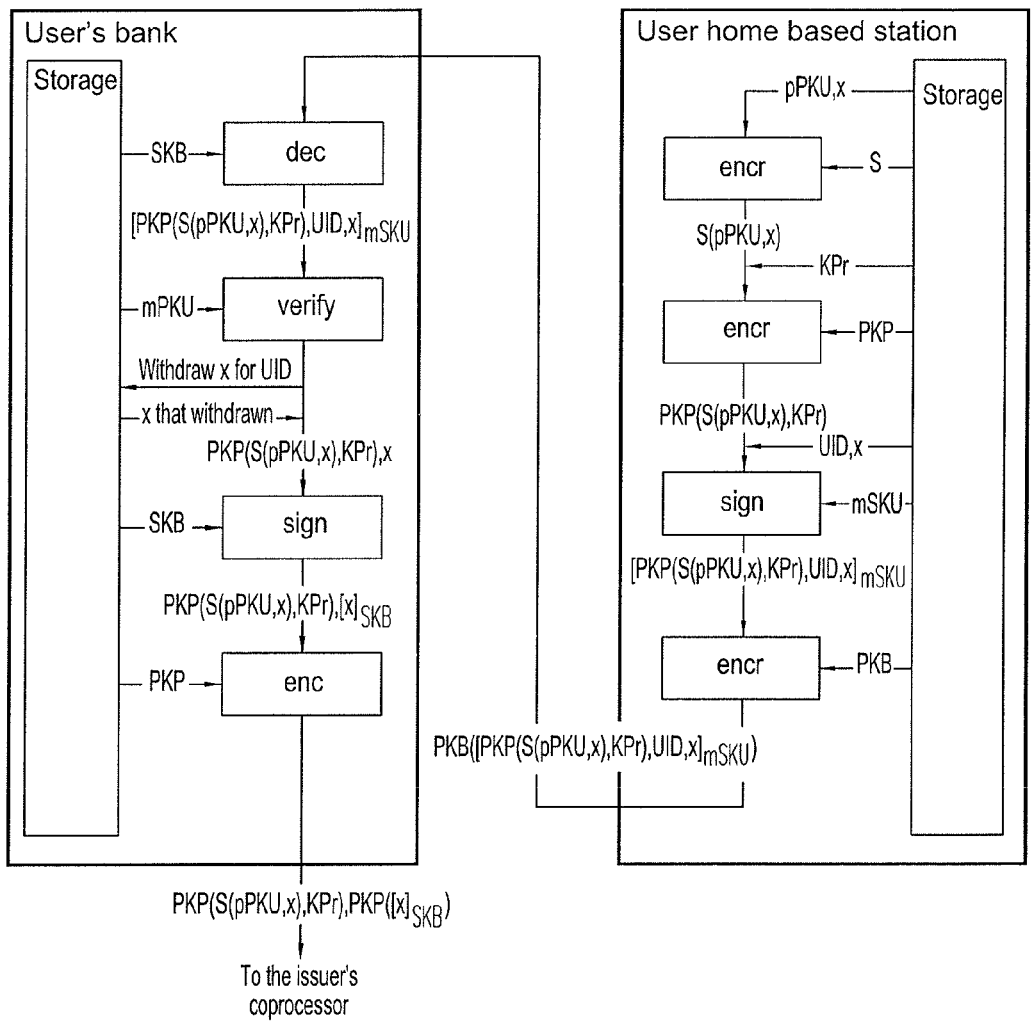
FIG. 41 is an exemplary withdrawal process part 2 according to the sixth embodiment.

Referring to FIG. 41, the user station encryption program encrypts the user's pseudonym public key pPKU and the amount of digital cash x using the user-issuer shared secret key S. The encryption program encrypts the encrypted user's pseudonym public key, the amount of digital cash S(pPKU,x), and the key pointer KPr using the public key of a cryptographic coprocessor PKP. The signature generating program signs the user real identification UID, the amount of money to be withdrawn x, and PKP(S(pPKU,x),KPr) using the user's master secret key mSKU. The encryption program encrypts the information using the public key of the user's bank PKB and sends PKB($[PKP(S(pPKU,x),KPr),UID,x]_{mSKU}$) to the user's bank via a communications path.

The user's bank decryption program decrypts PKB($[PKP(S(pPKU,x),KPr),UID,x]_{mSKU}$) by using the user's bank's secret key. The signature verifying program verifies the validity of the signature for authentication with the master public key of the user mPKU. If the signature is valid, the amount of money x is withdrawn from the user account, and the signature generating program signs the amount x that is withdrawn from the user account using the user's bank's secret key SKB. The encryption program encrypts $[x]_{SKB}$ using the public key of the cryptographic coprocessor PKP, and sends information PKP(S(pPKU,x),KPr) and PKP($[x]_{SKB}$) to the digital cash issuer via a communications path.

Figure 42:
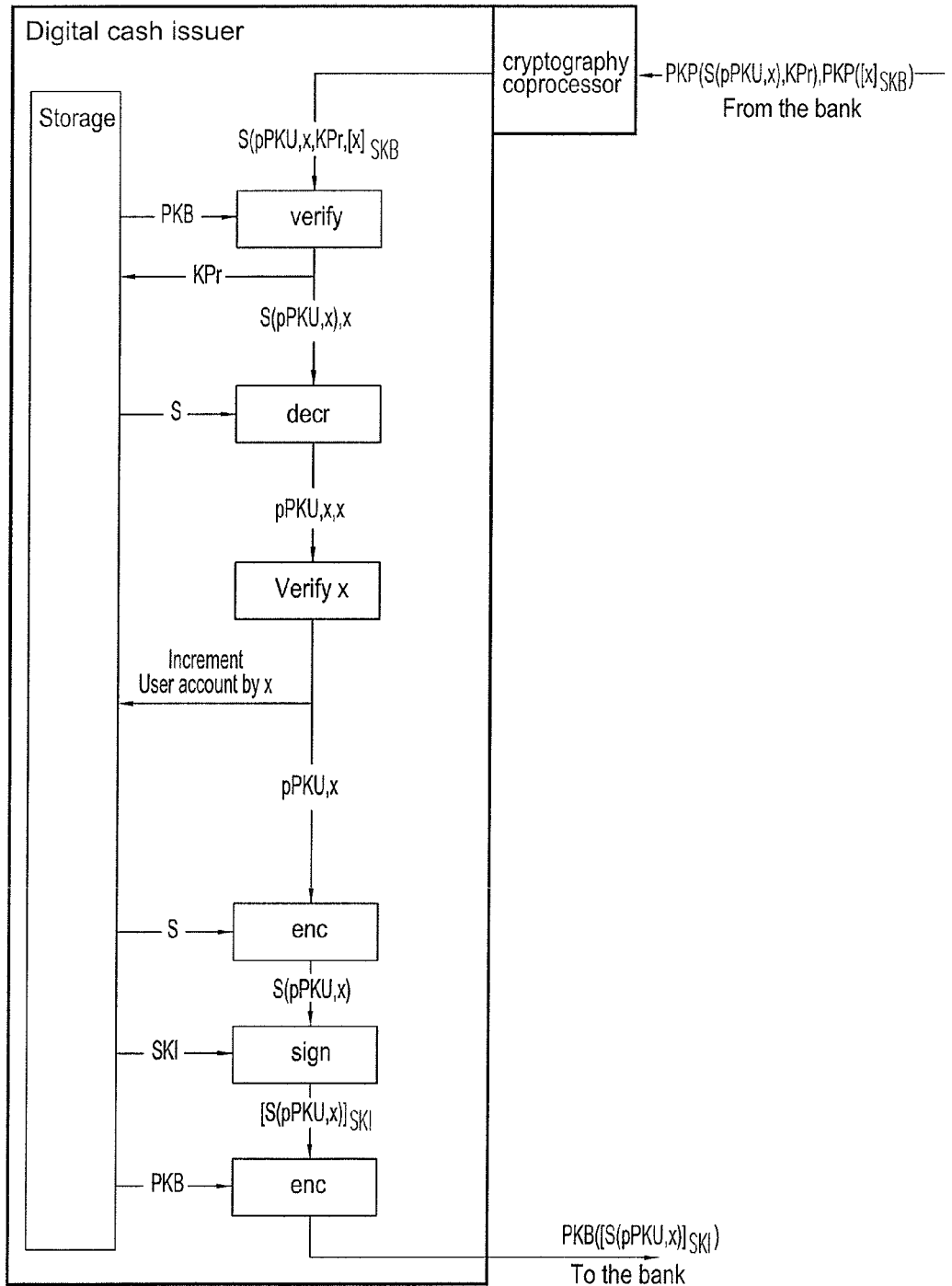
FIG. 42 is an exemplary withdrawal process part 3 according to the sixth embodiment.

Referring to FIG. 42, the digital cash issuer receives PKP (S(pPKU,x),KPr) and PKP($[x]_{SKB}$), and decrypts the information using the secret key of the cryptographic coprocessor to obtain the encrypted user's pseudonym public key, the amount of digital cash S(pPKU,x), the key pointer KPr, and the signed amount of withdrawn money from the user account $[x]_{SKB}$. The signature verifying program verifies the signature of the user's bank by using the public key of the bank PKB. If the signature is valid, the digital cash issuer searches for the user-issuer shared secret key S using the key pointer KPr. Once found, the decryption program decrypts S(pPKU,x) using the user-issuer shared secret key S to authenticate the user by matching the decrypted key with the user's pseudonym public key. If the keys match, the user is authenticated, and the issuer verifies that the two amounts x are equal. If the amounts are not equal, the real identity of the user is revealed by sending pPKU to the certificate authority. If the amounts are equal, the digital cash issuer increments the user's virtual account by the amount of digital cash x. The encryption program encrypts the pseudonym public key pPKU and digital cash amount x using the user-issuer shared secret key S. The signature generating program signs the S(pPKU,x) using the digital cash issuer's secret key SKI The encryption program encrypts $[S(pPKU,x)]_{SKI}$ using the public key of the bank PKB and sends PKB($[S(pPKU,x)]_{SKI}$) to the user's bank via a communications path.

Figure 43:
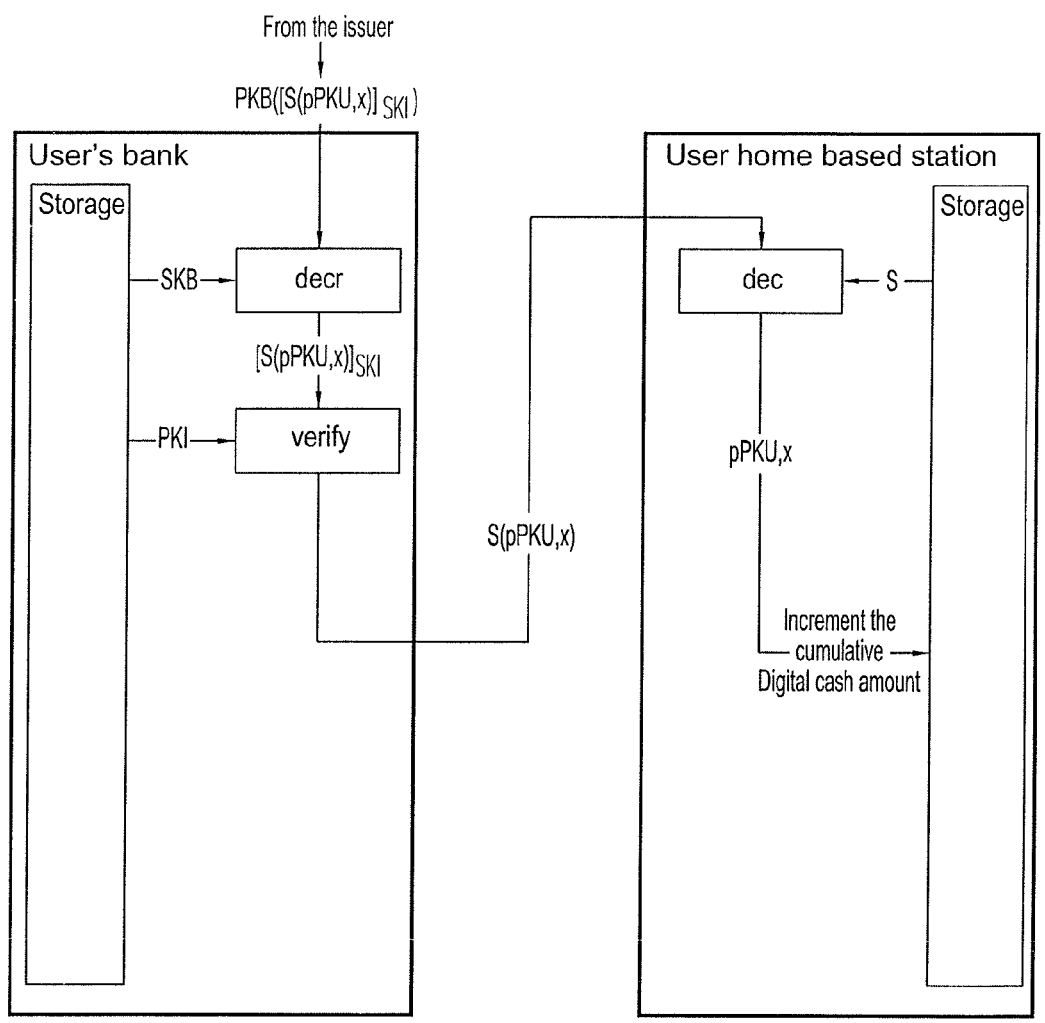
FIG. 43 is an exemplary withdrawal process part 4 according to the sixth embodiment.

Referring to FIG. 43, the user's bank then receives the information PKB($[S(pPKU,x)]_{SKI}$), and the decryption program decrypts the information using the user's bank secret key SKB. The signature verifying program verifies the digital cash issuer signature using the public key of the digital cash issuer PKI. If the signature is valid, S(pPKU,x) is sent to the user station.

The user station receives S(pPKU,x), and the decryption program decrypts the information using the user-issuer shared secret key S to authenticate the digital cash issuer by matching the decrypted key to the user's pseudonym public key. If the keys match, the digital cash issuer is authenticated, the cumulative amount of digital cash is incremented by the amount of digital cash x, and the new cumulative amount of digital cash is stored in the storage device of the user station.

Figure 44:
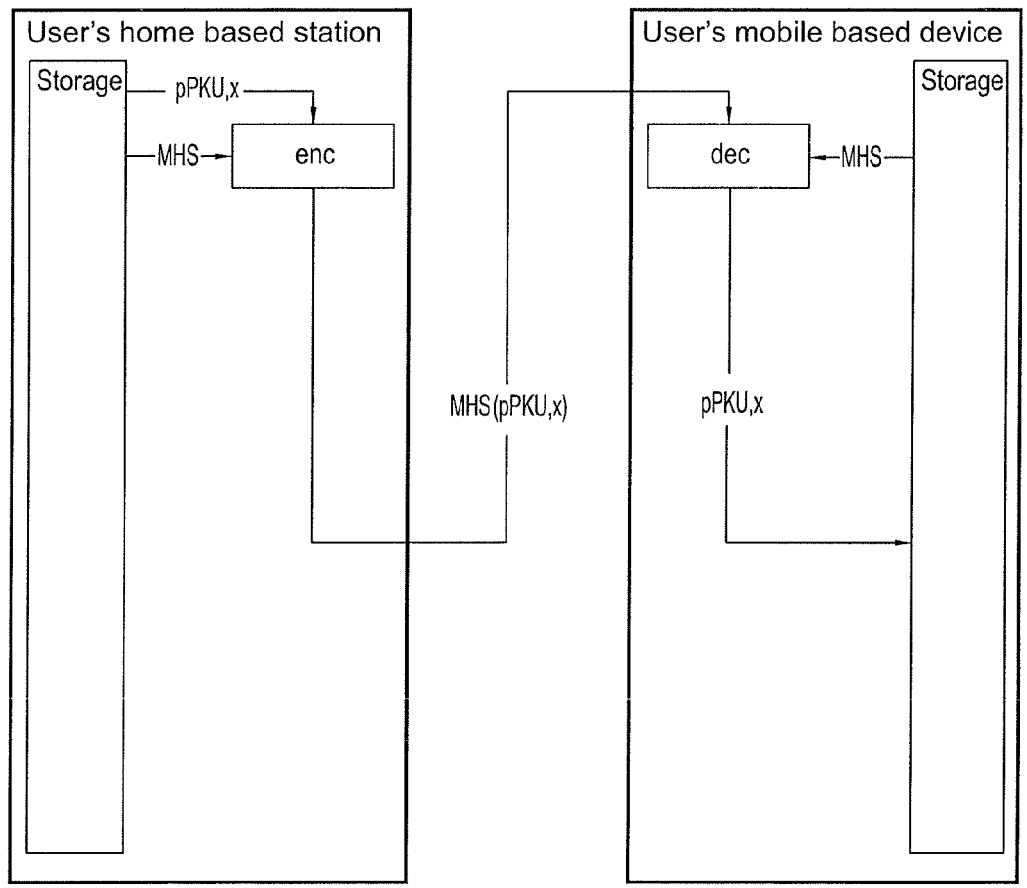
FIG. 44 is an exemplary withdrawal process part 5 according to the sixth embodiment.

Referring to FIG. 44, the user station encryption program encrypts the value of the new cumulative amount of digital cash x and the user's pseudonym public key pPKU using the mobile/home shared secret key MHS, and sends MHS(pPKU,x) to the user's mobile device via a communications path.

The user's mobile device receives the encrypted value of the new cumulative amount of digital cash and the user's pseudonym public key MHS(pPKU,x), and the decryption program decrypts the information by using the mobile/home shared secret key MHS. The mobile device determines if the decrypted key matches the user's pseudonym public key to authenticate the user's home station. If the user's pseudonym public key matches, the user stores the new cumulative amount of digital cash in the storage device of the user's mobile device.

(3) Payment Procedure

The payment protocol is the same as that described above for FIGS. 23-27.

Seventh Embodiment

The previous embodiments described above are implemented as off-line protocols. However, these protocols may be modified for on-line operation. One possible example follows.

(1) User Registration Procedure

The user registration protocol is the same as described above for FIGS. 2-4.

(2) Withdrawal Procedure (Electronic Cash Issuing Procedure) The withdrawal procedure is the same as that described above for FIGS. 5-8.

(3) Payment Procedure

Figure 45:
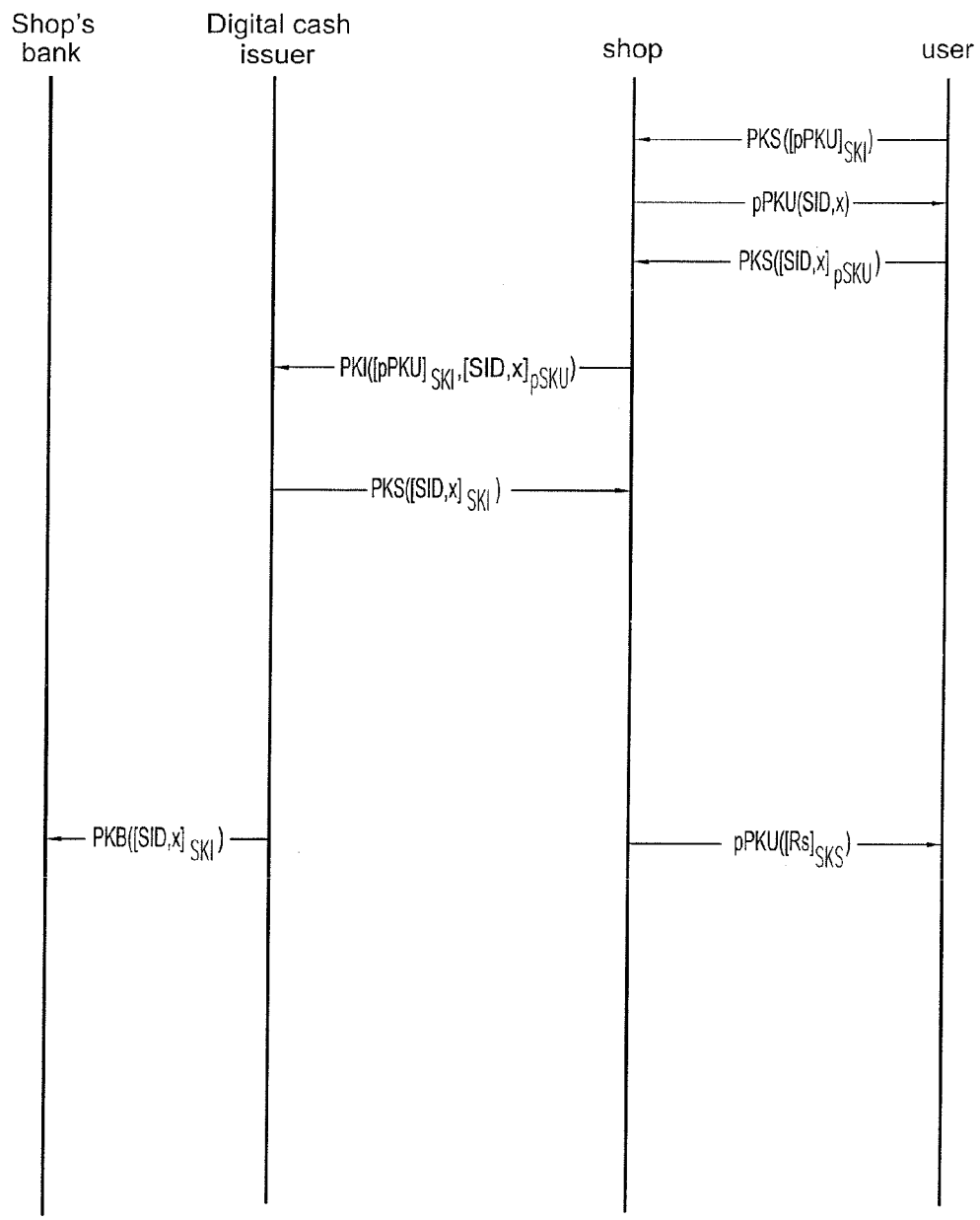
FIG. 45 is an exemplary payment protocol according to the seventh and eighth embodiment.
Figure 46:
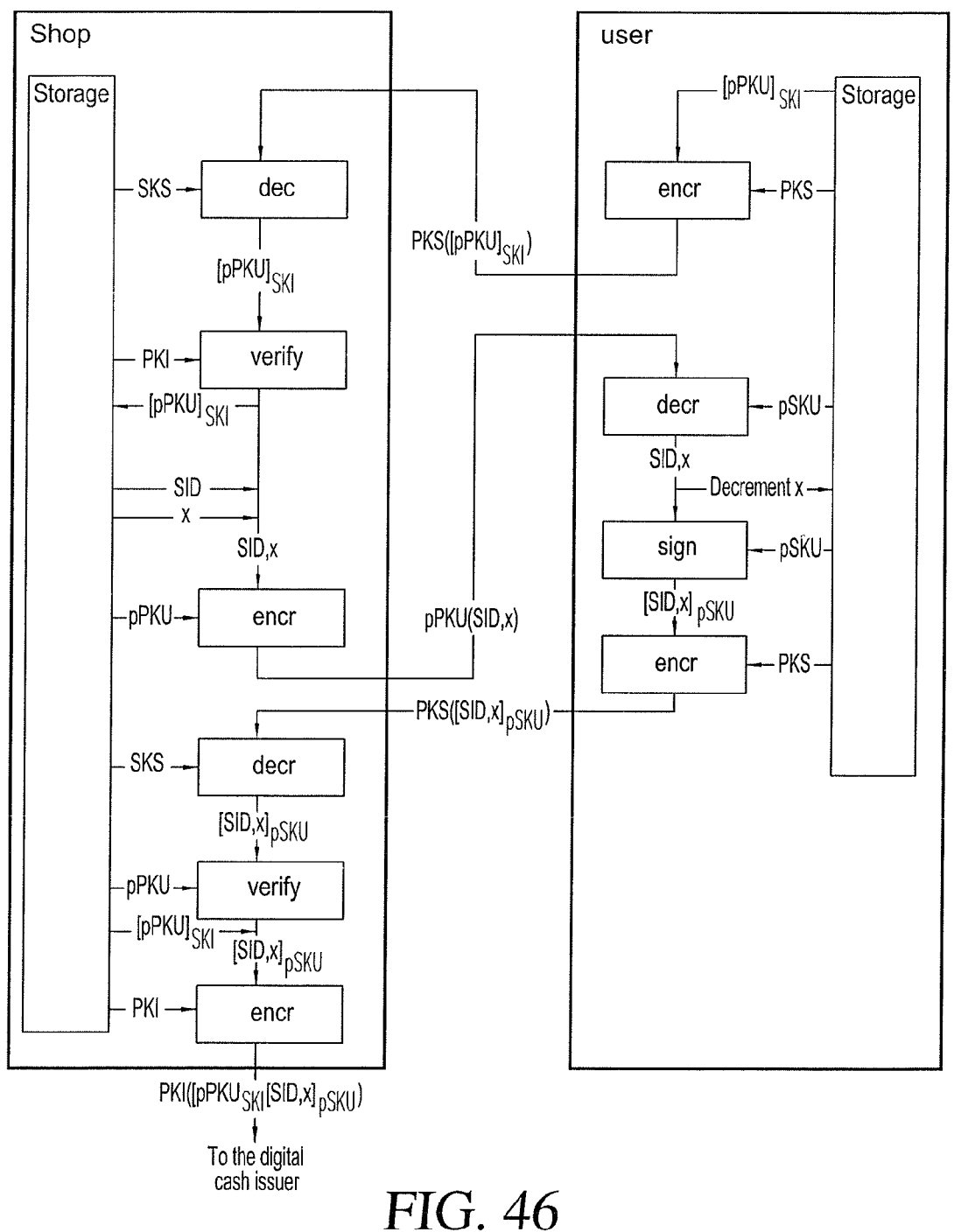
FIG. 46 is an exemplary payment process part 1 according to the seventh and eighth embodiment.

FIG. 45 shows the diagrammatic representation of the payment protocol, and FIGS. 46-49 show parts 1-4 of the payment process. Referring to FIG. 46, the user encryption program encrypts the digital cash issuer license $[pPKU]_{SKI}$ using the public key of the shop PKS and sends the license to the shop as request for payment.

The shop decryption program decrypts the encrypted digital cash issuer license $PKS([pPKU]_{SKI})$ using the shop's secret key SKS, and the signature verifying program verifies the signature of the issuer with the digital cash issuer public key PKI. If the signature is valid, the shop stores the user's digital cash issuer license. The encryption program encrypts the shop identification SID and the price of payment x using the user's pseudonym public key pPKU and sends pPKU(SID,x) to the user via a communications path.

The user receives pPKU(SID,x) and the decryption program decrypts the information using the user's pseudonym secret key pSKU and decrements the cumulative amount of digital cash in the user's storage device by x. The signature generating program signs the shop identification SID and the price of payment x using the user's pseudonym secret key pSKU. The encryption program encrypts the information using the public key of the shop PKS and sends PKS([SID,x]$_{pSKU}$) to the shop via a communications path.

The shop receives the information PKS([SID,x]$_{pSKU}$) and the decryption program decrypts the information using the shop's secret key SKS. The signature verifying program verifies the signature using the user's pseudonym public key pPKU. If the signature valid, the shop encryption program encrypts the user's digital cash issuer license $[pPKU]_{SKI}$ and [SID,x]$_{pSKU}$ using the public key of the digital cash issuer PKI and sends PKI([pPKU]$_{SKI}$, [SID,x]$_{pSKU}$) to the digital cash issuer via a communications path.

Figure 47:
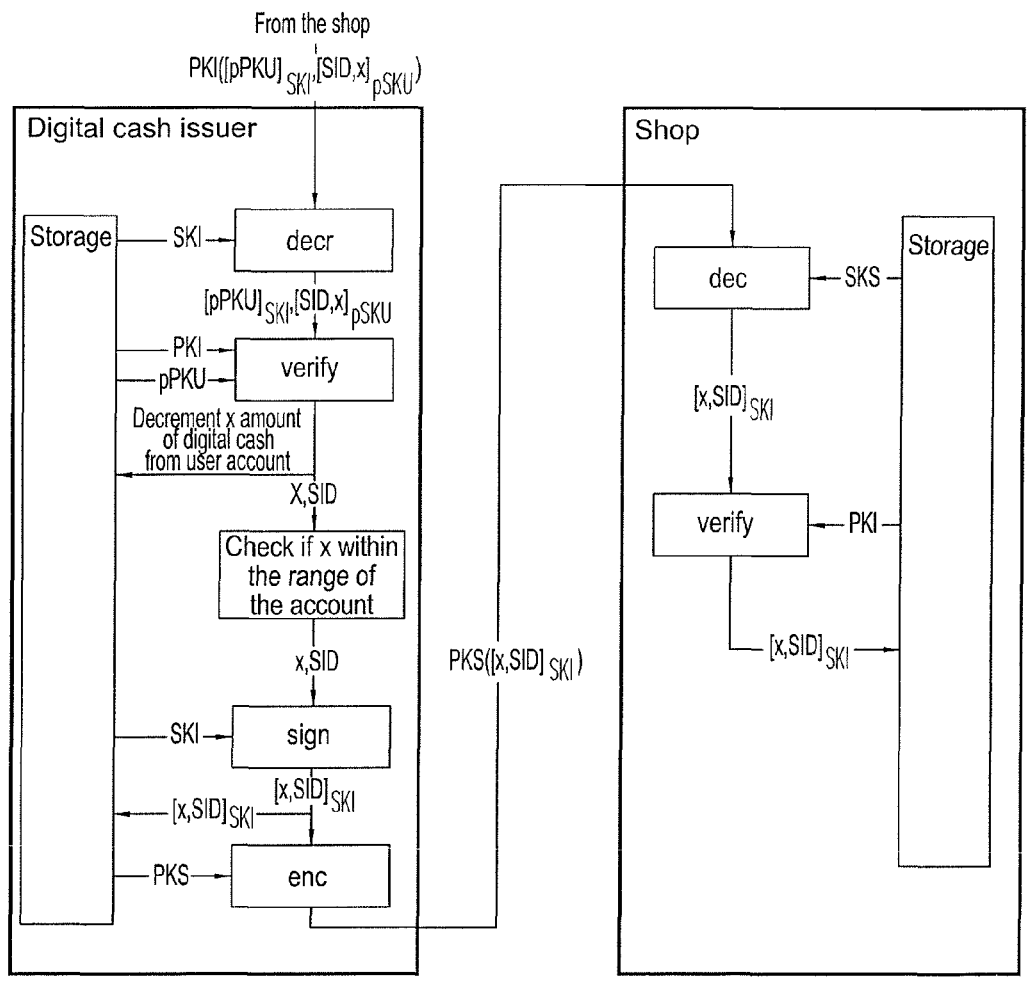
FIG. 47 is an exemplary payment process part 2 according to the seventh and eighth embodiment.

Referring to FIG. 47, the digital cash issuer decryption program decrypts PKI([pPKU]$_{SKI}$, [SID,x]$_{pSKU}$) using the secret key of the digital cash issuer SKI. The signature verifying program verifies the validity of the signatures using the digital cash issuer's public key PKI and the user's pseudonym public key pPKU. If the signatures are valid, the digital cash issuer decrements the user virtual account by the amount of the payment x. If the digital cash issuer determines that the user has spent more than is available in the virtual account, the real identity of the user is revealed by sending the user's pseudonym public key pPKU to the certificate authority. If not, the digital cash issuer signature generating program signs the shop identification SID and the amount of digital cash x with the digital cash issuer's secret key SKI. [SID,x]$_{SKI}$ is temporarily stored to be sent to the shop's bank. The encryption program encrypts the information using the public key of the shop PKS and sends PKS([SID,x]$_{SKI}$) to the shop via a communications path.

Figure 48:
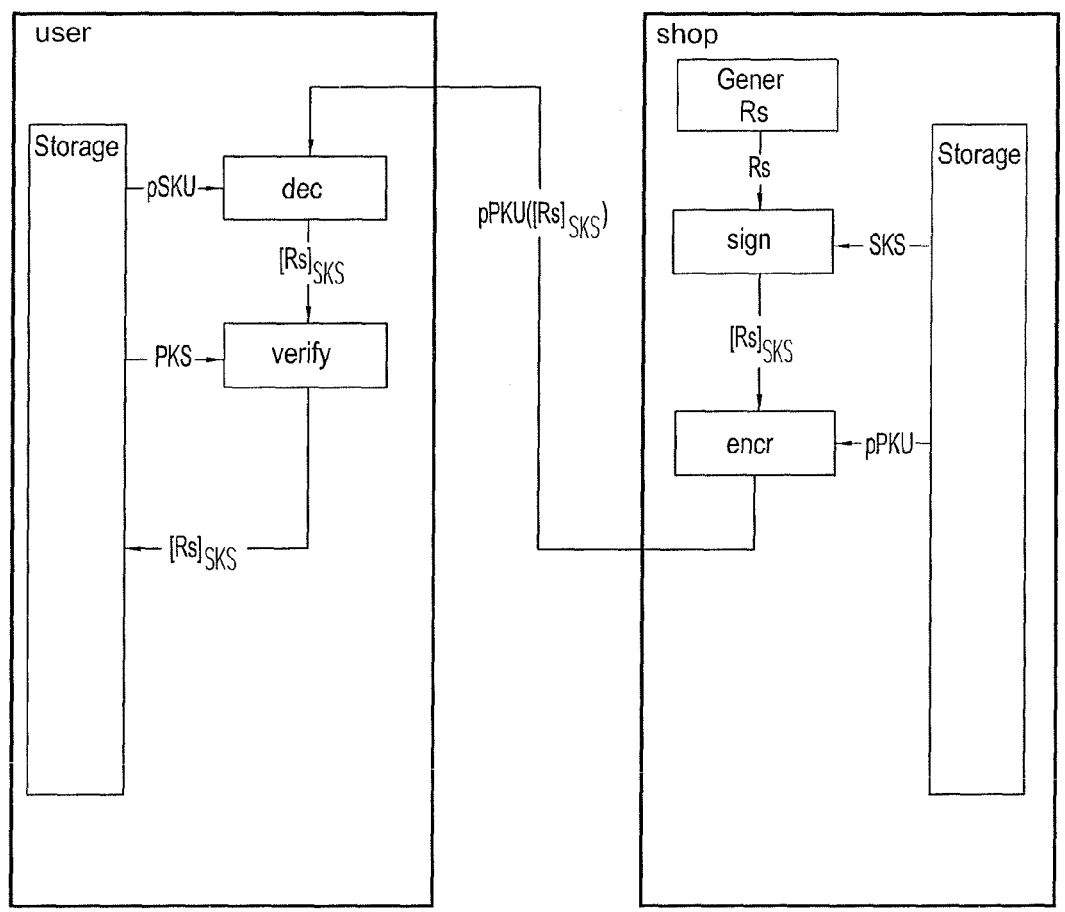
FIG. 48 is an exemplary payment process part 3 according to the seventh and eighth embodiment.

The shop receives PKS([SID,x]$_{SKI}$) and the decryption program decrypts the information using the secret key SKS. The signature verifying program verifies the signature with the public key of the issuer PKI. Referring to FIG. 48, if the signature is valid, the shop random number generating program generates a random number Rs then the signature generating program signs Rs with the shop's secret key SKS. The encryption program encrypts the signed random number [Rs]$_{SKS}$ using the user's pseudonym public key pPKU and sends pPKU([Rs]$_{SKS}$) to the user.

The user receives pPKU([Rs]$_{SKS}$) and the decryption program decrypts it using the user's pseudonym secret key pSKU and stores [Rs]$_{SKS}$ in the storage device.

Figure 49:
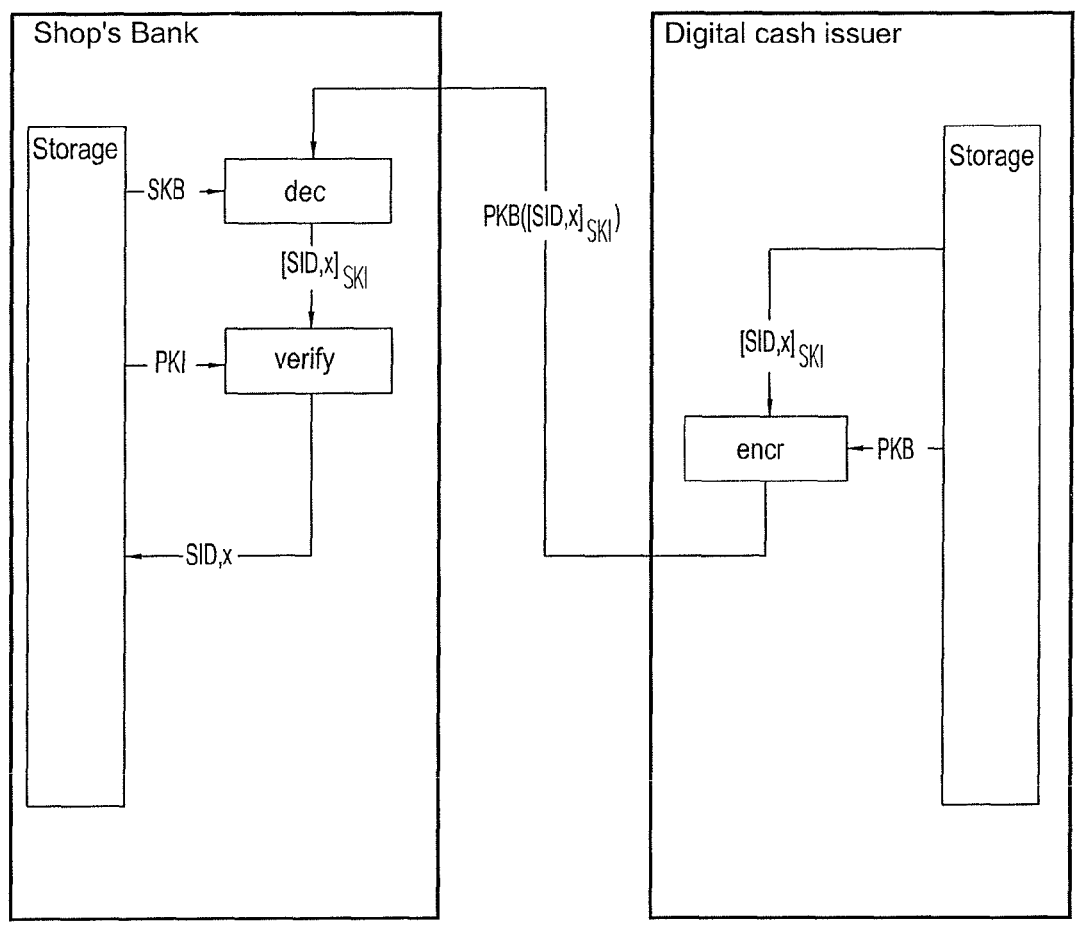
FIG. 49 is an exemplary payment process part 4 according to the seventh and eighth embodiment.

Referring to FIG. 49 the digital cash issuer retrieves the signed shop identification SID and the signed amount x to be deposited for the shop [SID,x]$_{SKI}$, and the encryption program encrypts the information by using the public key of the shop's bank PKB before it sends PKB([SID,x]$_{SKI}$) to the shop's bank via a communications path.

The shop's bank receives PKB([SID,x]$_{SKI}$), and the decryption program decrypts the information using the secret key SKB. The signature verifying program verifies the signature with the public key of the issuer PKI. If the signature is valid, the shop's bank adds the amount of money x to the shop account.

Eighth Embodiment

This is an on-line protocol with the use of a cryptographic coprocessor.

(1) User Registration Procedure

The user registration procedure for this example is the same as described above for FIGS. 2-4.

(2) Withdrawal Procedure (Electronic Cash Issuing Procedure)

The withdrawal procedure for this example is the same as described above for FIGS. 13-16.

(3) Payment Procedure

The payment procedure for this example is the same as described above for FIGS. 45-49.

Ninth Example

This is an online protocol with a mobile device.
(1) User Registration Procedure The user registration procedure for this example is the same as described above for FIGS. 2-4.
(2) Withdrawal Procedure (Electronic Cash Issuing Procedure)

Figure 50:
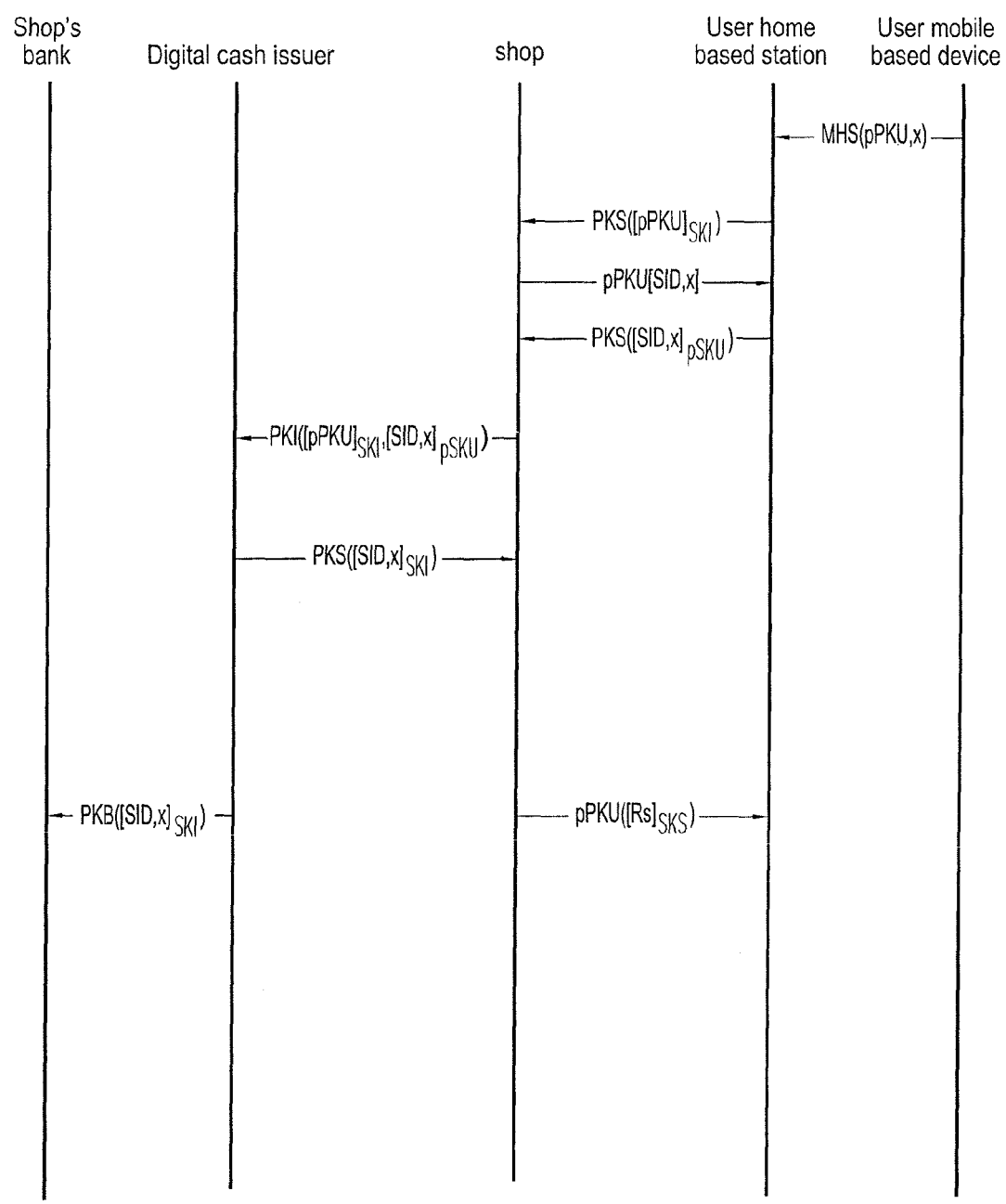
FIG. 50 is an exemplary payment protocol according to the ninth embodiment.
Figure 51:
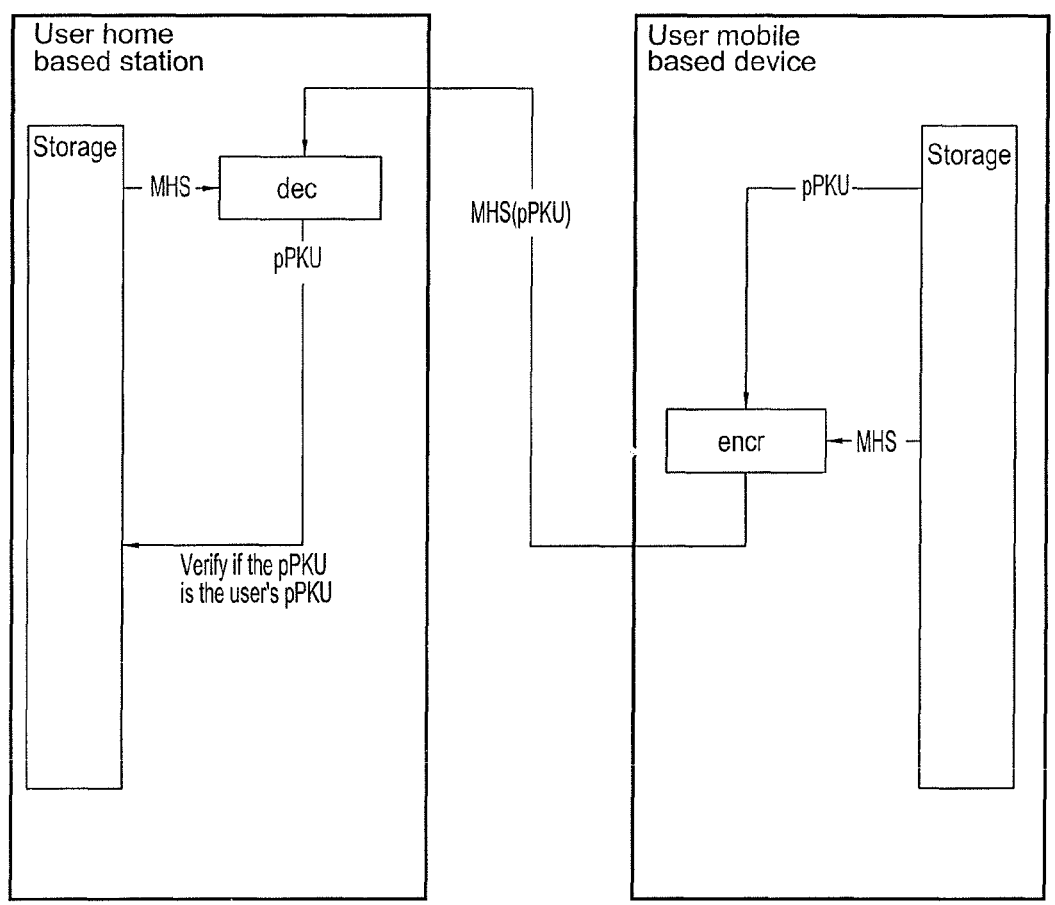
FIG. 51 is an exemplary payment process part 1 according to the ninth embodiment.

The withdrawal procedure for this example is the same as described above for FIGS. 17-22.
(3) Payment Procedure FIG. 50 shows the diagrammatic representation of the payment protocol, and FIGS. 51-55 show parts 1-5 of the payment process. Referring to FIG. 51, the user's mobile device encryption program encrypts the user's pseudonym public key pPKU using the mobile/home shared secret key MHS and sends MHS(pPKU) to the user station via a communications path.

The user station receives MHS(pPKU) and the decryption program decrypts the information using the mobile/home shared secret key MHS, and matches the decrypted key with the user's pseudonym public key to authenticate the user's mobile device.

Figure 52:
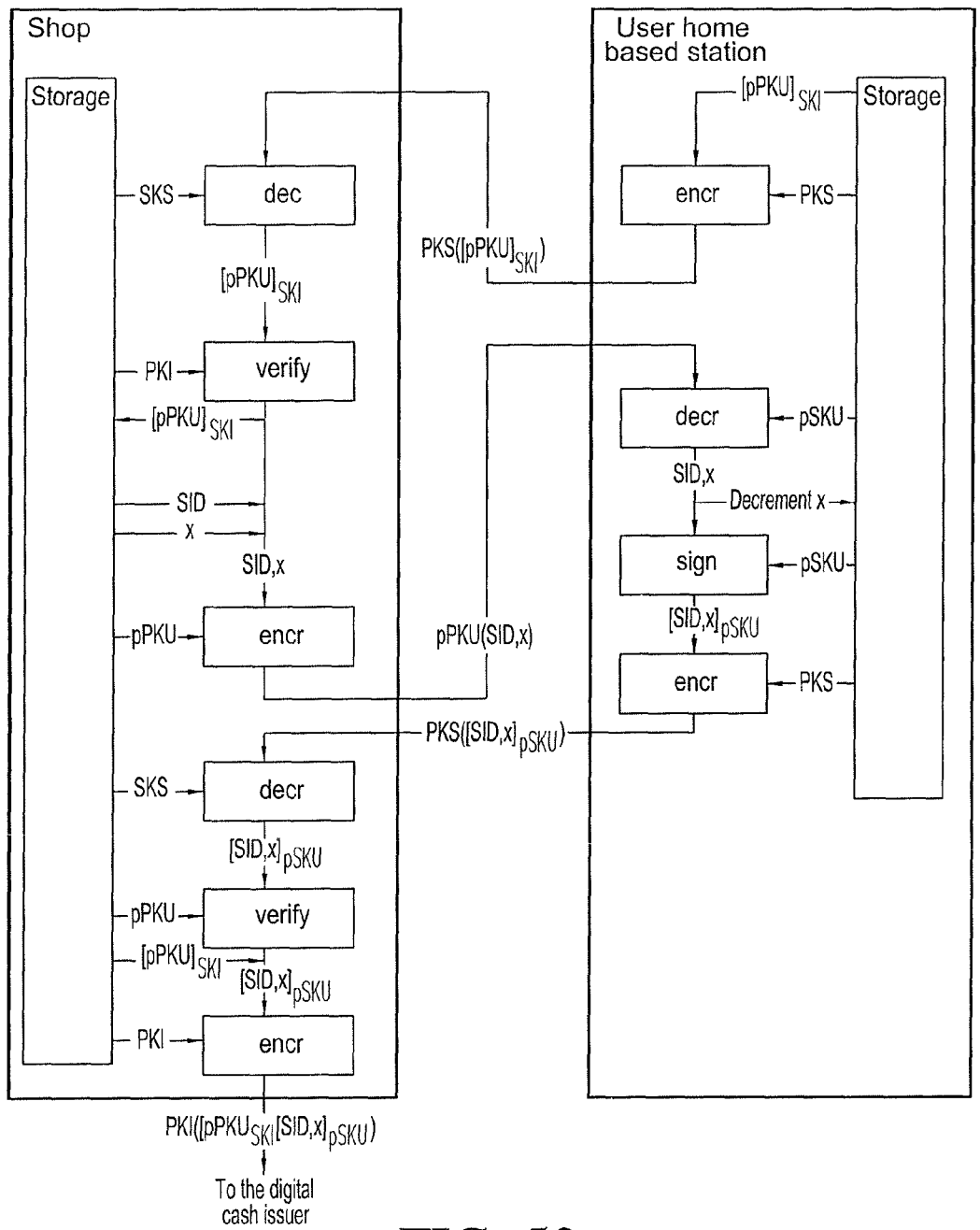
FIG. 52 is an exemplary payment process part 2 according to the ninth embodiment.

Referring to FIG. 52, the user station encryption program encrypts the digital cash issuer license [pPKU]$_{SKI}$ using the public key of the shop PKS and sends it to the shop as request for payment via a communications path. The shop decryption program decrypts the encrypted digital cash issuer license PKS([pPKU]$_{SKI}$) using the shop's secret key SKS. The signature verifying program verifies the signature of the issuer with the digital cash issuer public key PKI. If the signature is valid, the shop stores the user's digital cash issuer license, and the encryption program encrypts the shop identification SID and the price of the payment x using the user's pseudonym public key pPKU and sends pPKU(SID,x) to the user station via a communications path.

The user station receives pPKU(SID,x). The decryption program decrypts the information using the user's pseudonym secret key pSKU and decrements the cumulative amount of digital cash in the user's storage device by x. The signature generating program signs the shop identification SID and the price of payment x using the user's pseudonym secret key pSKU. The encryption program encrypts the information using the public key of the shop PKS and sends PKS([SID,x]$_{pSKU}$) to the shop via a communications path.

The shop receives the information PKS([SID,x]$_{pSKU}$), and the decryption program decrypts the information using the shop's secret key SKS. The signature verifying program verifies the signature using the user's pseudonym public key pPKU. If the signature is valid, the shop encryption program encrypts the user's digital cash issuer license [pPKU]$_{SKI}$ and [SID,x]$_{pSKU}$ using the public key of the digital cash issuer PKI and sends PKI([pFKU]$_{SKI}$, [SID,x]$_{pSKU}$) to the digital cash issuer via a communications path.

Figure 53:
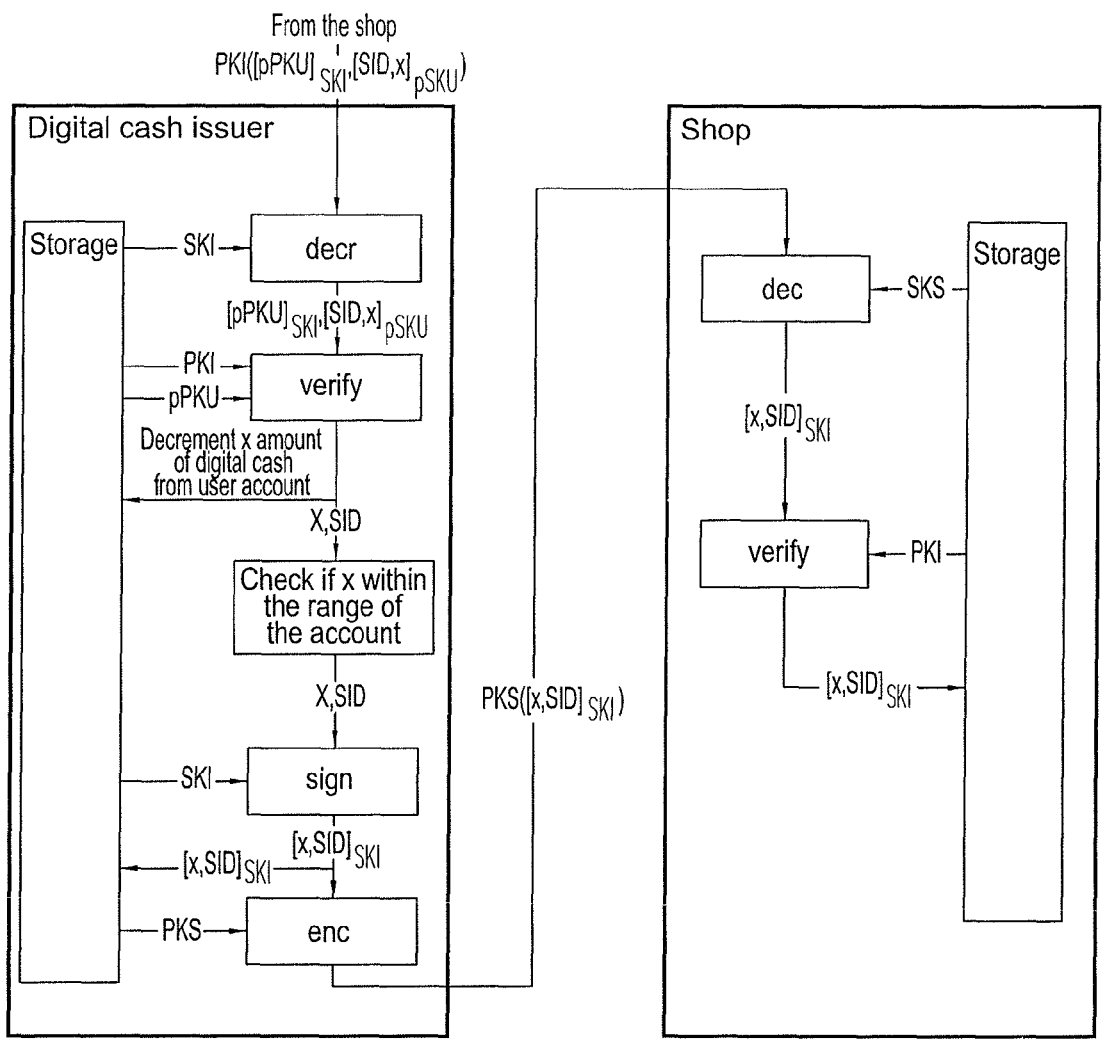
FIG. 53 is an exemplary payment process part 3 according to the ninth embodiment.

Referring to FIG. 53, the digital cash issuer decryption program decrypts PKI([pPKU]$_{SKI}$, [SID,x]$_{pSKU}$) using the secret key of the digital cash issuer SKI, and the signature verifying program verifies the validity of the signatures using the digital cash issuer's public key PKI and the user's pseudonym public key pPKU. If the signatures are valid, the digital cash issuer decrements the user virtual account by the amount of the payment x. If the digital cash issuer determines that the user spends more than is available in the virtual account, the real identity of the user is revealed by sending the user's pseudonym public key pPKU to the certificate authority. If not, the digital cash issuer signature generating program signs the shop identification SID and the amount of digital cash x with the digital cash issuer's secret key SKI and stores [SID, x]$_{SKI}$ temporarily to send it to the shop's bank. The encryption program encrypts the information using the public key of the shop PKS then sends PKS([SID,x]$_{SKI}$) to the shop via a communications path.

Figure 54:
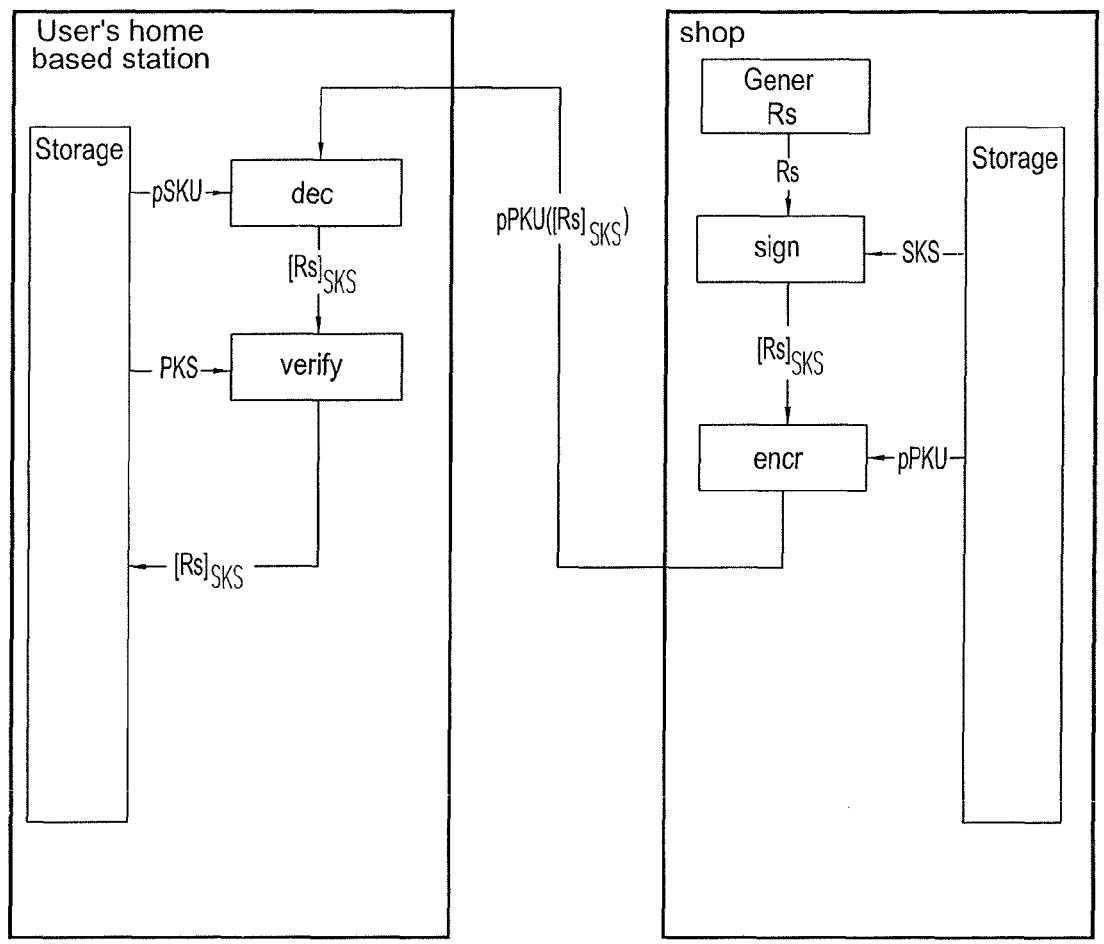
FIG. 54 is an exemplary payment process part 4 according to the ninth embodiment.

The shop receives PKS([SID,x]$_{SKI}$), and the decryption program decrypts the information using the secret key SKS. The signature verifying program verifies the signature with the public key of the issuer PKI. Referring to FIG. 54, if the signature is valid, the shop random number generating program generates a random number Rs and the signature generating program signs Rs with the shop's secret key SKS. The encryption program encrypts the signed random number [Rs]$_{SKS}$ using the user's pseudonym public key pPKU and sends pPKU([Rs]$_{SKS}$) to the user station via a communications path.

The user station receives pPKU([Rs]$_{SKS}$). The decryption program decrypts the information using the user's pseudonym secret key pSKU and stores [Rs]$_{SKS}$ in the storage device.

Figure 55:
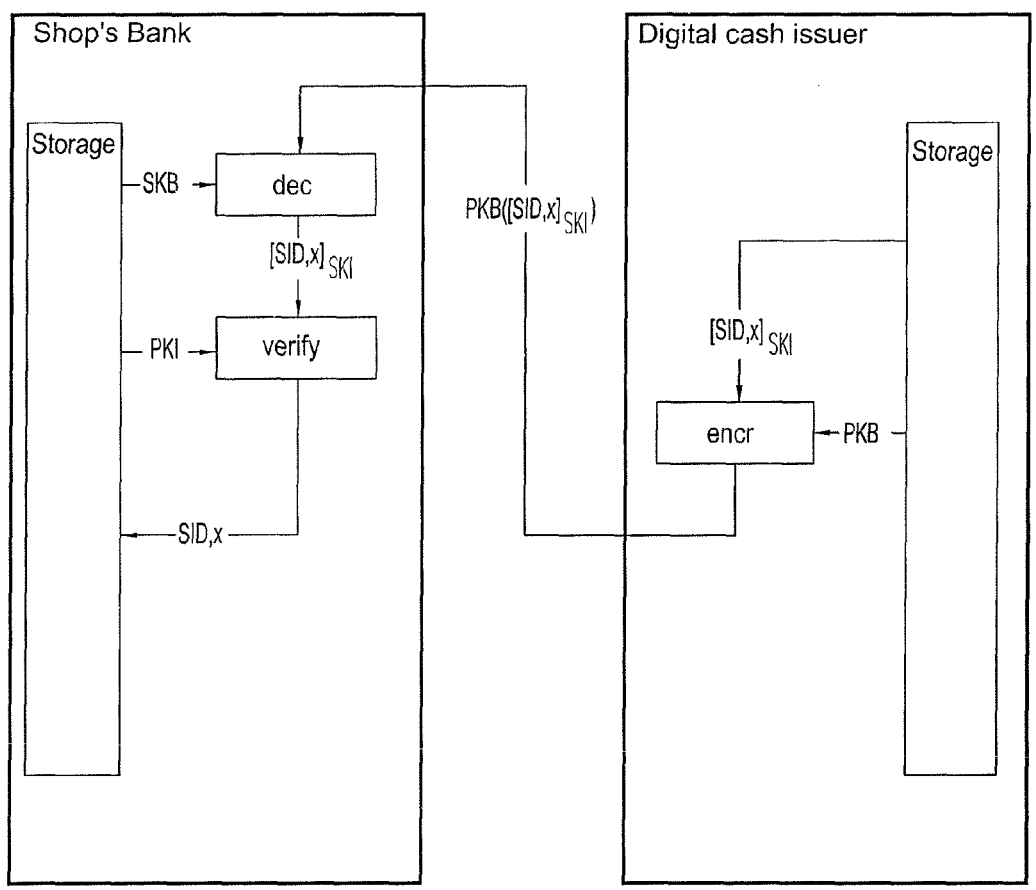
FIG. 55 is an exemplary payment process part 5 according to the ninth embodiment.

Referring to FIG. 55, the digital cash issuer retrieves the signed shop identification SID and the signed amount x to be deposited for the shop [SID,x]$_{SKI}$. The encryption program encrypts the information using the public key of the shop's bank PKB and sends PKB([SID,x]$_{SKI}$) to the shop's bank via a communications path.

The shop's bank receives PKB([SID,x]$_{SKI}$), and the decryption program decrypts the information by using the secret key SKB. The signature verifying program verifies the signature with the public key of the issuer PKI. If the signature is valid, the shop's bank adds the amount of money x to the shop account.

As mentioned, most of the conventional virtual account based digital cash protocols use blind signature to protect the privacy of the user which is not efficient and is vulnerable to fraud. In addition, some offline protocols do not use blind signature but still have deficiency in privacy protection and deficiency in authentications. The protocol provided herein may be implemented in a virtual account based digital cash system that provides: (i) strong protection of user's privacy (ii) authenticated protocol, (iii) traceability, and (iv) achieving all of these without using blind signature schemes.

The protocols described above provide strong protection of privacy for the user by separating information about the user's bank accounts (identified with the real identity of the user) from the information about digital cash virtual accounts of the same user under a pseudonym by using two pair of keys where one pair is linked to the real identity of the user, while the other pair is linked to the pseudonym identity of the user. The use of the two pair of keys allows the users to use one pair of keys for authenticating the user with an entity that holds information that is linked to the user's real identity such as a bank, and for encrypting information sent to the user by such entities. At the same time, the user can use another pair of keys to authenticate the user with an entity that holds information that is linked to the user's pseudonym identity such as an issuer of digital cash virtual accounts, and for encrypting information sent to the user by such entities.

Because there is no link between the master public key of the user with the pseudonym public key of the same user, there is no link between the real identity of the user and the user's pseudonym. The only exception to this is a certificate authority which certifies the pseudonym public key of a user given a user's master public key and id. There is no shared information about the user between the user's bank and the issuer of digital cash virtual accounts. The bank stores the user id and the amount of money, and the user's master pubic key as the user account information. The issuer of digital cash virtual accounts can store the user's pseudonym public key and the digital cash virtual accounts issued to the user. This separation makes it very difficult to link the real identity of the user with the user's pseudonym pubic key. Any leak of the private key of the bank or the issuer of digital cash virtual accounts is useless to break the privacy of the user. Since the user's master public key is not linked to digital cash virtual accounts and is not used for payments, the user's privacy is maintained. Therefore, strong protection is provided to maintain the user privacy without involving any blind signature scheme.

In the protocols described above, the user has two pair of keys wherein one pair represents master keys while the other pair represents pseudonym keys and wherein each public key is certified by a certifying authority using a separate certificate. Digital signatures with master keys are used for authentication with the certificate authority and the bank, wherein digital signatures with pseudonym keys are used for authentication with the issuer of digital cash virtual accounts and the shop. Since all transactions are authenticated using digital signatures, this prevents anyone from pretending to be someone else by providing information related to the real user.

Traceability is ensured since (i) all transactions are made with certified public keys, (ii) a certifying authority can link the master public key with a pseudonym public key, and (iii) by keeping records of digital cash virtual accounts issued to/spent by user's pseudonym public key.

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. A method for electronic cash issuing for a digital cash protocol to protect user privacy having two pairs of user keys, one pair linked to the real identity of the user including a master public key (mPKU) and a master secret key (mSKU), and a second pair linked to the pseudonym identity of the user including a pseudonym public key (pPKU) and a pseudonym secret key (pSKU), the method comprising:
signing pPKU and an amount of digital cash (x) using pSKU;
encrypting $[pPKU,x]_{pSKU}$ using a public key (PKI) of a digital cash issuer;
signing a user real identification UID, the amount of money to be withdrawn x, and $PKI([pPKU,x]_{pSKU})$ using mSKU
encrypting $[PKI([pPKU,x]_{pSKU}),UID,x]_{mSKU}$ using the public key of the bank (PKB);
sending $PKB([PKI([pPKU,x]_{pSKU}),UID,x]_{mSKU})$ to the bank via a communications path;
decrypting $PKB([PKI([pPKU,x]_{pSKU}),UID,x]_{mSKU})$ using a bank secret key (SKB);
verifying the validity of the signature for authentication with mPKU,
determining if the signature is valid;
withdrawing the amount of money x from the user account;
signing $PKI([pPKU,x]_{pSKU}$ and the withdrawn amount of money x using SKB;
encrypting $[PKI([pPKU,x]_{pSKU}),x]_{SKB}$ using PKI; and
sending $PKI([PKI([pPKU,x]_{pSKU}),x]_{SKB})$ to the digital cash issuer via a communications path.

2. The method of claim 1 further comprising:
receiving $PKI([PKI([pPKU,x]_{pSKU}),x]_{SKB})$;
decrypting $PKI([PKI([pPKU,x]_{pSKU}),x]_{SKB})$ using a digital cash issuer secret key (SKI);
verifying the signature of the bank using PKB;
determining whether the signature is valid;
decrypting $PKI([pPKU,x]_{pSKU})$ using SKI
verifying the signature of the user using pPKU to authenticate the user; and
determining the equality of the two amounts x, wherein the real identity of the user is revealed by sending pPKU to the certificate authority if the amounts are not equal and incrementing the user virtual account by the amount x of digital cash if the amounts are equal.

3. The method of claim 2 further comprising:
signing pPKU and digital cash amount x using SKI;
encrypting $[pPKU,x]_{SKI}$ using pPKU;
signing $pPKU([pPKU,x]_{SKI})$ using SKI;
encrypting $[pPKU([pPKU,x]_{SKI})]_{SKI}$ using PKB; and
sending $PKB([pPKU([pPKU,x]_{SKI})]_{SKI})$ to the user's bank via a communications path.

4. The method of claim 3 further comprising:
receiving $PKB([pPKU([pPKU,x]_{SKI})]_{SKI})$
decrypting $PKB([pPKU([pPKU,x]_{SKI})]_{SKI})$ using the SKB;
verifying program the digital cash issuer signature using PKI
determining the signature is valid;
sending $pPKU([pPKU,x]_{SKI})$;
receiving $pPKU([pPKU,x]_{SKI})$;
decrypting $pPKU([pPKU,x]_{SKI})$ using pSKU;
verifying the validity of the digital cash issuer signature with PKI;
incrementing the cumulative amount of digital cash by the amount of digital cash x; and
storing the new cumulative amount of digital cash.

5. A method electronic cash payment for a digital cash protocol to protect user privacy having two pairs of user keys, one pair linked to the real identity of the user including a master public key (mPKU) and a master secret key (mSKU), and a second pair linked to the pseudonym identity of the user including a pseudonym public key (pPKU) and a pseudonym secret key (pSKU), the method comprising:
encrypting a digital cash issuer license $[pPKU]_{SKI}$ using a public key of the shop (PKS) sending $PKS([pPKU]_{SKI})$ to the shop as request for payment;
decrypting $PKS([pPKU]_{SKI})$ using a shop secret key (SKS)
verifying the signature of the issuer with a digital cash issuer public key (PKI)
storing the user's digital cash issuer license;
generating a random number Rs;
generating a time Ts;
encrypting a shop identification SID, Rs, Ts, and the price of payment x using pPKU; and
sending pPKU(SID,Rs,Ts,x) to the user; and
receiving pPKU(SID,Rs,Ts,x);
decrypting pPKU(SID,Rs,Ts,x) using pSKU
decrementing a cumulative amount of digital cash in the user's storage device by x;
signing SID, Rs, Ts, and the price of payment x using pSKU;
encrypting $[SID,Rs,Ts,x]_{pSKU}$ using PKS; and
sending $PKS([SID,Rs,Ts,x]_{pSKU})$ to the shop.

6. The method of claim 5 further comprising:
receiving $PKS([SID,Rs,Ts,x]_{pSKU})$;
decrypting $PKS([SID,Rs,Ts,x]_{pSKU})$ using SKS; and
verifying the signature using public key pPKU, wherein if the signature is valid, the shop stores the challenge and the shop regards the payment as valid.

7. The method of claim 6 further comprising:
encrypting $[SID,Rs,Ts,x]_{pSKU}$ and $[pPKU]_{SKI}$ using PKI; and
sending the information to the digital cash issuer.

8. The method of claim 7 further comprising:
decrypting $PKI([SID,Rs,Ts,x]_{pSKU}, [pPKU]_{SKI})$ using a digital cash issuer secret key (SKI);
verifying the signature using PKI and pPKU; and
decrementing the user virtual account by the amount of the payment x, wherein
if the digital cash issuer determines that the user spends more than the amount in the virtual account, the real user identity is revealed by sending the user's pseudonym public key pPKU to a certificate authority and if the user spends less than the amount in the virtual account, the digital cash issuer stores the challenge $[SID,Rs,Ts,x]_{pSKU}$ in the storage device.

9. The method of claim 8 further comprising:
signing SID and the amount x to be deposited for the shop with SKI;
encrypting $[SID,x]_{SKI}$ using PKB sending $PKB([SID,x]_{SKI})$ to the shop's bank;
receiving $PKB([SID,x]_{SKI})$;
decrypting $PKB([SID,x]_{SKI})$ using SKB;
verifying the signature with PKI; and
adding adds the amount of money x to the shop account.

\* \* \* \* \*